United States Patent
Hayashida et al.

(10) Patent No.: US 6,461,583 B1
(45) Date of Patent: Oct. 8, 2002

(54) METHOD FOR ENRICHMENT OF HEAVY COMPONENT OF OXYGEN ISOTOPES

(75) Inventors: Shigeru Hayashida; Nobuaki Egoshi; Hitoshi Kihara; Hiroshi Kawakami, all of Tokyo (JP)

(73) Assignee: Nippon Sanso Corporation, Tokyo (JP)

(*) Notice: Subject to any disclaimer, the term of this patent is extended or adjusted under 35 U.S.C. 154(b) by 0 days.

(21) Appl. No.: 09/581,538

(22) PCT Filed: Nov. 8, 1999

(86) PCT No.: PCT/JP99/06198

§ 371 (c)(1),
(2), (4) Date: Jul. 10, 2000

(87) PCT Pub. No.: WO00/27509

PCT Pub. Date: May 18, 2000

(30) Foreign Application Priority Data

Nov. 9, 1998 (JP) .......................... 10-318209
Jan. 29, 1999 (JP) .......................... 11-023255
May 28, 1999 (JP) .......................... 11-150733

(51) Int. Cl.[7] .............................. B01D 59/04; F25J 3/02
(52) U.S. Cl. .................. 423/579; 423/DIG. 7; 62/919; 203/5; 203/71; 202/158; 202/172; 422/188
(58) Field of Search ............... 423/579, 580.2, 423/581, DIG. 7; 62/919; 203/5, 71; 422/188; 202/158, 172

(56) References Cited

U.S. PATENT DOCUMENTS

| | | | |
|---|---|---|---|
| 4,455,339 A | 6/1984 | Meier ........................ | 428/185 |
| 5,282,365 A | * 2/1994 | Victor et al. ................ | 64/22 |
| 6,321,565 B1 | * 11/2001 | Kihara et al. ............... | 62/643 |

FOREIGN PATENT DOCUMENTS

| | | | | |
|---|---|---|---|---|
| GB | 1 569 828 | 6/1980 | | |
| GB | 1 604 354 | 12/1981 | | |
| GB | 1 604 361 | 12/1981 | | |
| JP | 51-45935 | 4/1976 | | |
| JP | 54-15554 | 2/1979 | | |
| JP | 54-16761 | 2/1979 | | |
| JP | 56-20624 | 2/1981 | | |
| JP | 57-36009 | 8/1982 | | |
| JP | 58-26997 | 2/1983 | | |
| JP | 63-232825 | * 9/1988 | ........... | B01D/59/04 |
| JP | 64-41748 | 2/1989 | | |
| JP | 64-46563 | 2/1989 | | |
| JP | 3-17488 | 1/1991 | | |
| JP | 4-13628 | 3/1992 | | |
| JP | 6-72740 | 9/1994 | | |
| JP | 07-148419 | * 6/1995 | ........... | B01D/59/04 |

OTHER PUBLICATIONS

J. A. Wesselingh, et al., IchemE Distillation and Absorption, vol. 1, pp. 1–21, "Non–Equilibrium Modelling Of Distillation", 1977.

I. Dostrovsky, et al., Stable Isotopes, pp. 693–702, "The Production of Stable Isotopes of Oxygen", 1982.

* cited by examiner

*Primary Examiner*—Wayne A. Langel
*Assistant Examiner*—Manbel Medina
(74) *Attorney, Agent, or Firm*—Oblon, Spivak, McClelland, Maier & Neustadt, P.C.

(57) ABSTRACT

A method and apparatus for enrichment of heavy oxygen isotopes is provided wherein an oxygen starting material which contains heavy oxygen isotopes is enriched in at least one of oxygen molecule $^{16}O^{17}O$, $^{16}O^{18}O$, $^{17}O^{17}O$, $^{17}O^{18}O$ and $^{18}O^{18}O$, by means of cryogenic distillation of the oxygen starting material containing heavy oxygen isotopes. In addition, a method and apparatus are provided for further increasing the concentration of at least one of the heavy isotope oxygen molecules by means of conducting isotope scrambling on the above-mentioned plurality of oxygen molecules enriched by means of the above mentioned cryogenic distillation.

25 Claims, 24 Drawing Sheets

SECOND DISTILLATION COLUMN (SECOND DISTILLATION COLUMN 202 OF THE ENRICHMENT APPARATUS SHOWN IN FIGURE 17)

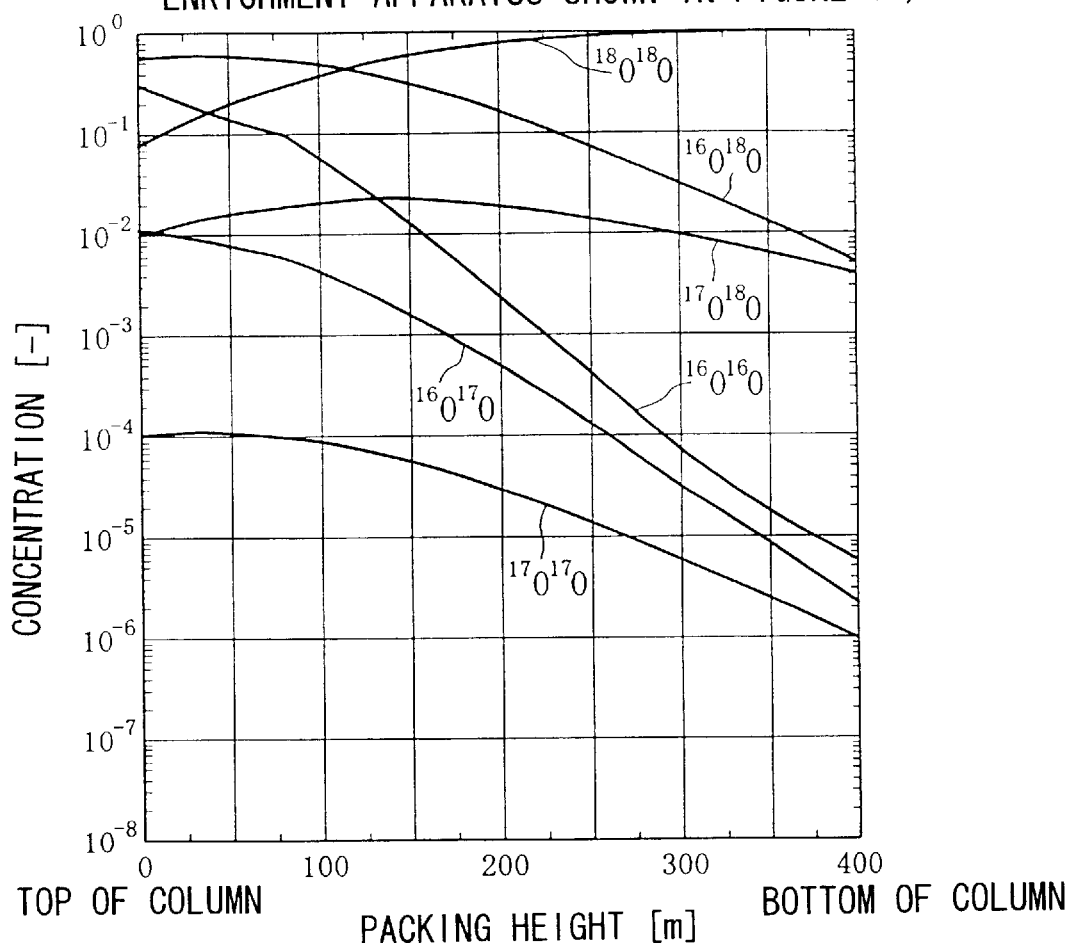

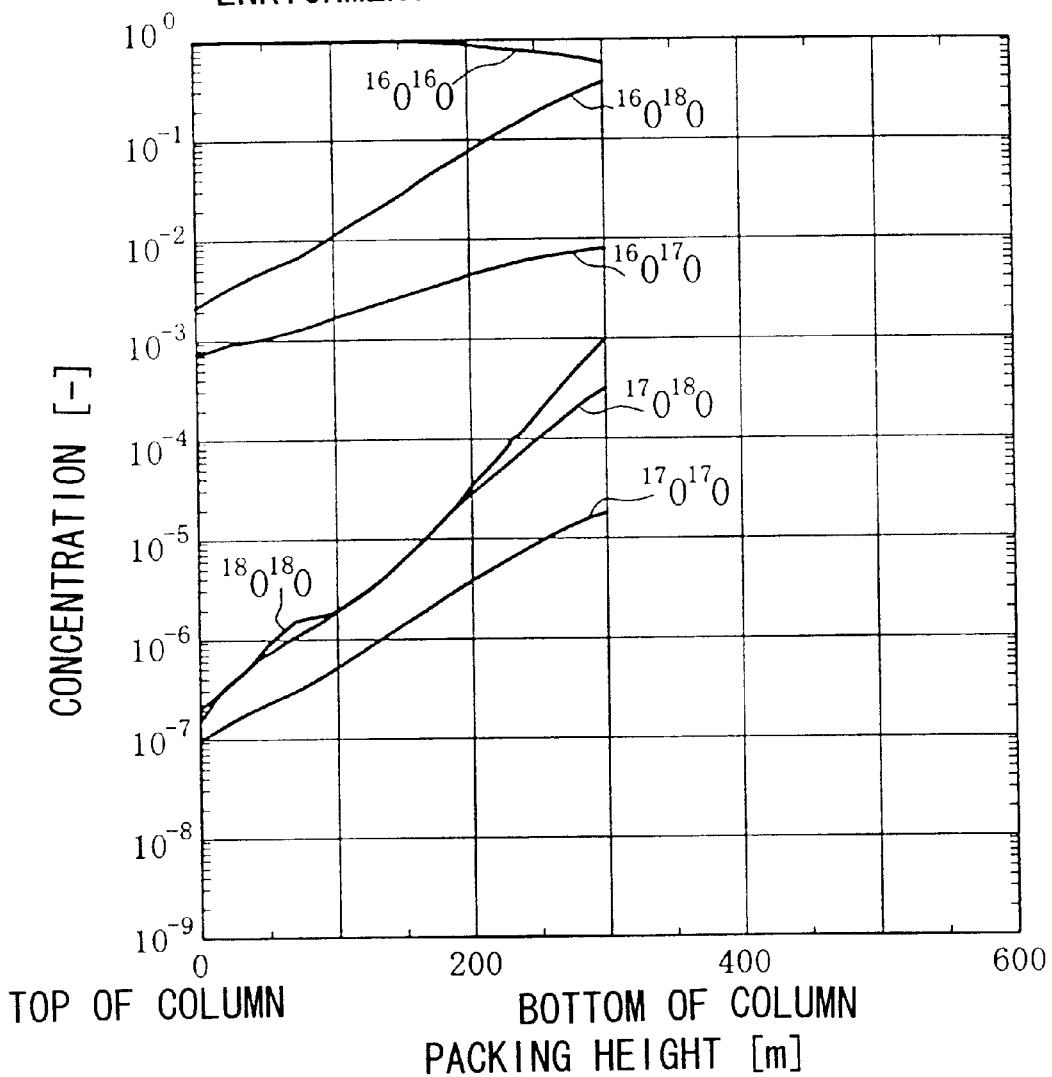

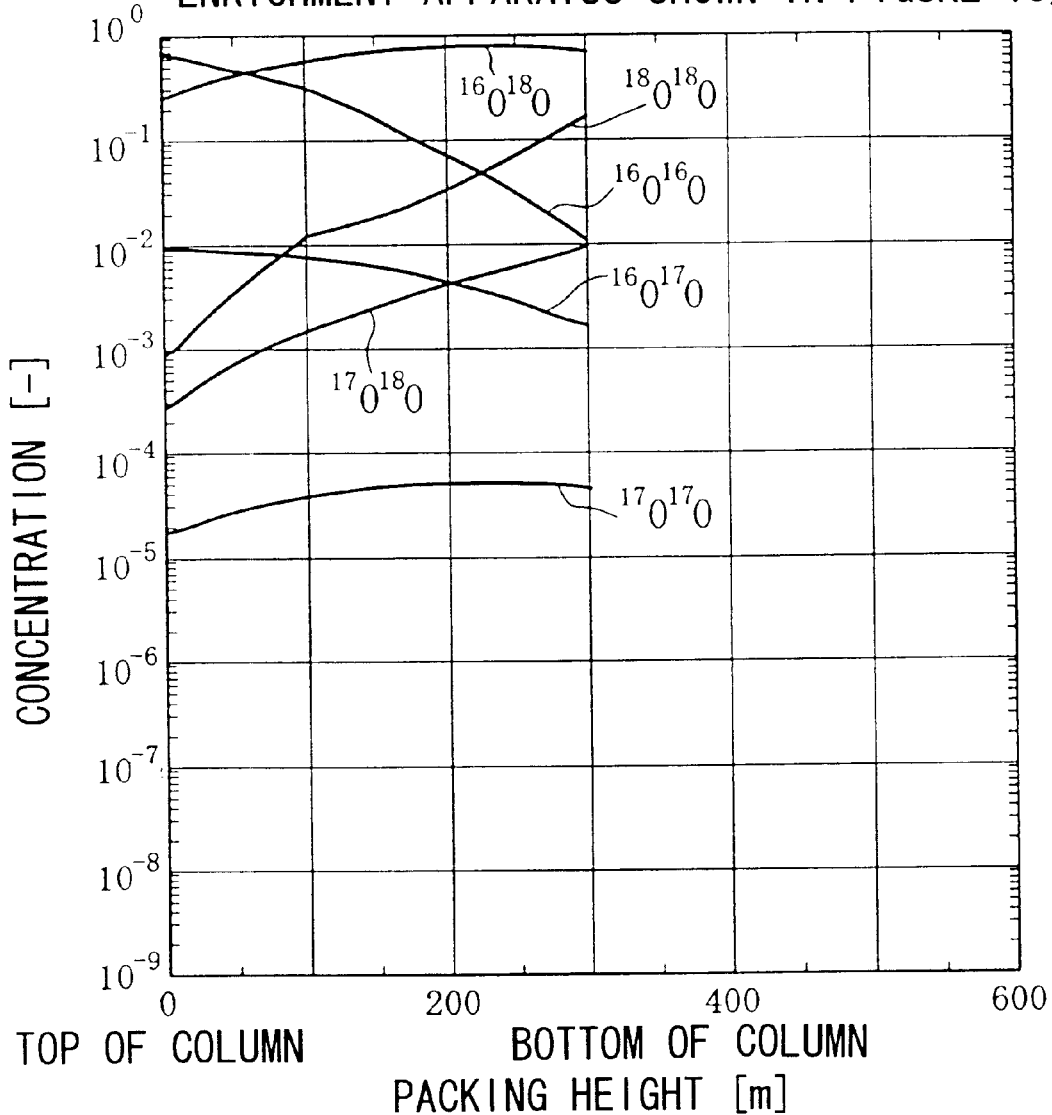

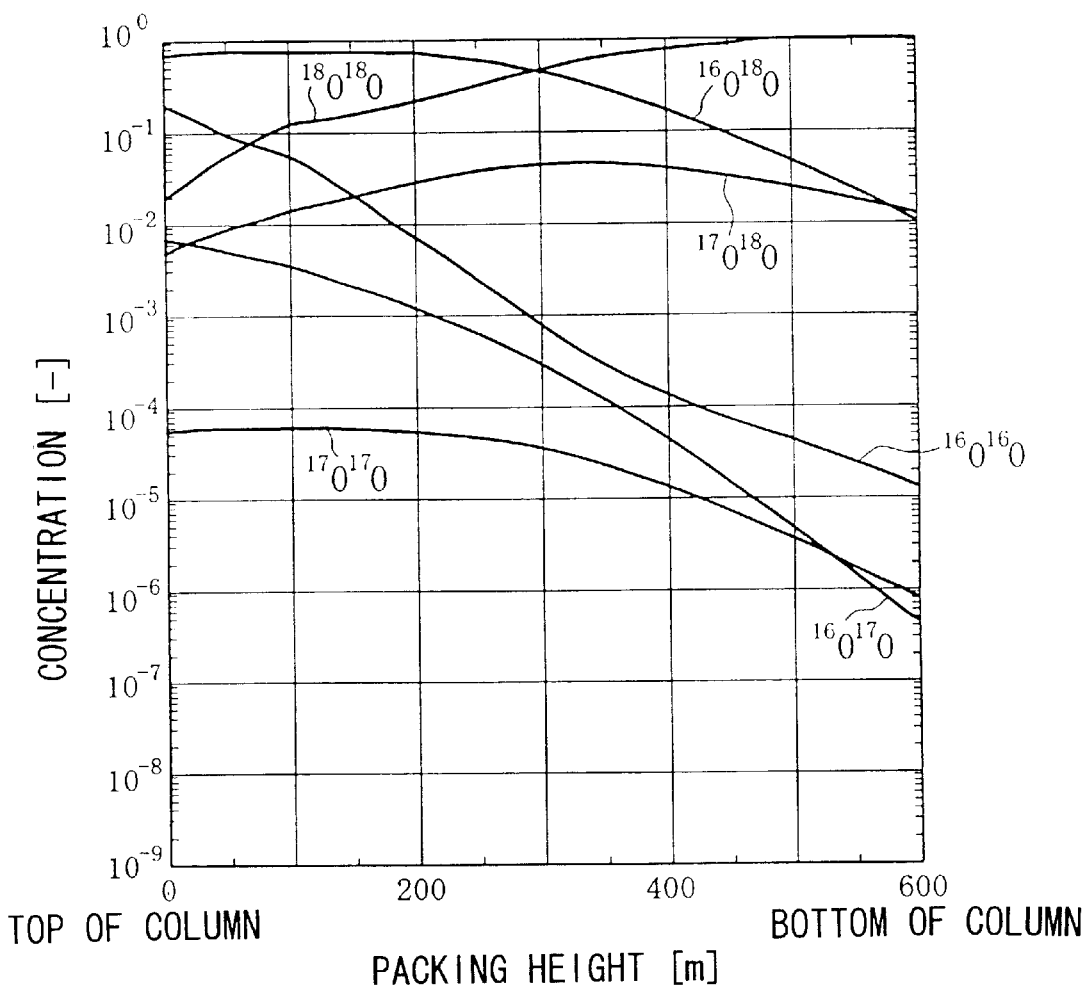

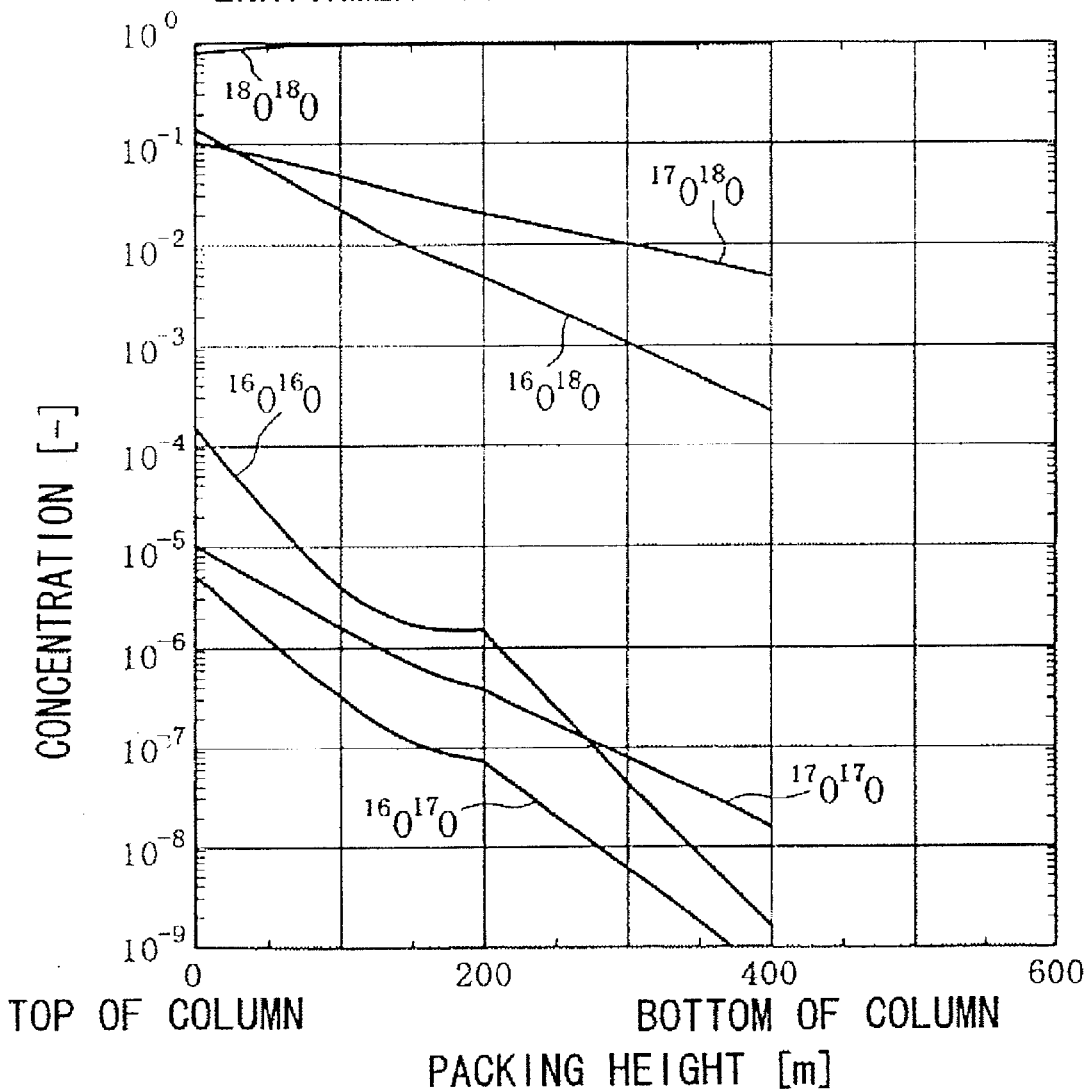

METHOD FOR ENRICHMENT OF HEAVY COMPONENT OF OXYGEN ISOTOPES

BACKGROUND OF THE INVENTION

1. Field of the Invention

The present invention relates to a method and apparatus for enriching oxygen in the heavy oxygen isotopes, $^{17}$O and $^{18}$O; and in particular, the present invention relates to a method and apparatus for enriching oxygen in these heavy oxygen isotopes by means of cryogenic distillation.

In addition, the present invention relates to a method and apparatus for further concentrating heavy oxygen isotopes by means of conducting isotope scrambling following the cryogenic distillation.

This application is based on patent application No. Hei 11-150733 filed in Japan, the content of which is incorporated herein by reference.

2. Background Art

Naturally abundant oxygen comprises 99.759% (atomic %, used in this way hereinafter) of $^{16}$O, 0.037% of $^{17}$O, and 0.204% of $^{18}$O.

Among these, the heavy isotope $^{18}$O is used as a tracer in fields such as agriculture, biology, and medicine.

In addition, in the same way, since the heavy isotope $^{17}$O has nuclear magnetic moment, it is used in the research of oxygen compounds using nuclear magnetic resonance and the like.

As enrichment methods for these heavy oxygen isotopes, there are distillation, thermal diffusion, chemical exchange (reactions), and the like. However, as a method of production with low cost and high volume, distillation is generally used. As the distillation method, there are methods which use water, NO, or CO as the starting material.

Among these method, as those methods whose success has been proven, water distillation methods using water as the starting material, and NO distillation methods using NO as the starting material can be mentioned.

As a water distillation method; the method practiced by Dostrovsky et al is known, and they reported that using this method it was possible to produce approximately 6 kg of $^{18}$O of a concentration of 98 to 99% in a year, and 1.5 kg of $^{17}$O of a concentration of 25% in a year. In addition, there are attempts to obtain high concentrations of $^{17}$O by means of further enrichment of $^{17}$O obtained by means of this method using a thermal diffusion method.

Since NO has a higher relative volatility compared with other starting materials, the enrichment efficiency for the above-mentioned isotopes in NO distillation methods is highly advantageous.

This method is used widely for enrichment of the isotopes of nitrogen and, normally, the above-mentioned heavy oxygen isotopes are obtained as bi-products of enrichment of the isotopes of nitrogen.

However, the above-mentioned conventional techniques have the following problems.

As shown in Table 1 and Table 2, since heavy isotopes are present in hydrogen and in nitrogen, there is the problem that in the above-mentioned water distillation methods, enrichment of water comprising the light isotope of oxygen ($^{16}$O) and the heavy isotope of hydrogen occurs, and in NO distillation methods, enrichment of NO comprising the light isotope of oxygen ($^{16}$O) and the heavy isotope of nitrogen occurs.

More specifically, in water distillation methods, it is easy for water containing the light isotope of oxygen ($^{16}$O) and deuterium (HD$^{16}$O, etc.) to become mixed into the obtained heavy isotope enriched product. This hinders enrichment of the H$_2$$^{17}$O and H$_2$$^{18}$O which contain the heavy isotopes of oxygen, and it is difficult to industrially obtain product which is highly enriched in the heavy isotopes of oxygen, such as H$_2$$^{18}$O having a purity of 99% or greater. The purity of commercially available H$_2$$^{18}$O is approximately 97%.

TABLE 1

| Mass number | Water molecule | Abundance ratio |
| --- | --- | --- |
| 18 | H$_2$$^{16}$O | 0.99728 |
| 19 | H$_2$$^{17}$O | 0.00037 |
| 19 | HD$^{16}$O | 0.00031 |
| 20 | H$_2$$^{18}$O | 0.00204 |
| 20 | HD$^{17}$O | 1.15 × 10$^{-7}$ |
| 20 | D$_2$$^{16}$O | 2.43 × 10$^{-8}$ |
| 21 | HD$^{18}$O | 6.36 × 10$^{-7}$ |
| 21 | D$_2$$^{17}$O | 9.00 × 10$^{-12}$ |
| 22 | D$_2$$^{18}$O | 4.96 × 10$^{-11}$ |

TABLE 2

| Mass number | NO molecule | Abundance ratio |
| --- | --- | --- |
| 30 | $^{14}$N$^{16}$O | 0.99390 |
| 31 | $^{14}$N$^{17}$O | 0.00037 |
| 31 | $^{15}$N$^{16}$O | 0.00369 |
| 32 | $^{14}$N$^{18}$O | 0.00203 |
| 32 | $^{15}$N$^{17}$O | 1.37 × 10$^{-6}$ |
| 33 | $^{15}$N$^{18}$O | 7.55 × 10$^{-8}$ |

In addition, since the latent heat of vaporization of water is comparatively high (e.g., approximately six times that of the latent heat of vaporization of oxygen), the water distillation apparatus is comparatively large and energy consumption is great. For this reason, there is a tendency for water distillation methods to have increased apparatus and operational costs.

In addition, in NO distillation methods, it is easy for NO ($^{15}$N$^{16}$O) containing the heavy isotope of nitrogen and oxygen ($^{16}$O) to become mixed into the obtained heavy isotope enriched product, and there is the problem that it is difficult to obtain an enriched product which is highly enriched in heavy oxygen isotopes.

In addition, due to reasons such as NO being a corrosive and poisonous gas, there is the problem that the above-mentioned NO distillation methods require a great deal of expense to put into practice.

SUMMARY OF THE INVENTION

In order to solve the above-mentioned problems, the method of the present invention provides a method of enrichment of heavy oxygen isotopes comprising enriching an oxygen starting material which contains heavy oxygen isotopes in at least one type of oxygen molecule selected from $^{16}$O$^{17}$O, $^{16}$O$^{18}$O, $^{17}$O$^{17}$O, $^{17}$O$^{18}$O and $^{18}$O$^{18}$O, which contain heavy oxygen isotopes, by means of cryogenic distillation of the oxygen starting material which contains heavy oxygen isotopes.

Additionally, the present invention provides a method of enrichment of heavy oxygen isotopes comprising enriching an oxygen starting material which contains heavy oxygen isotopes in at least one type of oxygen molecule selected from $^{16}$O$^{17}$O, $^{16}$O$^{18}$O, $^{17}$O$^{17}$O, $^{17}$O$^{18}$O and $^{18}$O$^{18}$O, which contain heavy oxygen isotopes, by means of cryogenic distillation in which the oxygen starting material which contains heavy oxygen isotopes is supplied to a distillation column packed with structured packing.

In addition, in the method of enrichment of heavy oxygen isotopes of the present invention, as the method for the above-mentioned cryogenic distillation, a distillation method is used which comprises supplying an oxygen starting material to a distillation column which has been packed with structured packing; bringing about vapor-liquid contact between a descending liquid and an ascending vapor mainly on the surface of the above-mentioned structured packing within the above-mentioned distillation column; at which time, the liquid and the vapor flow in mutually opposite directions over the surface of the above-mentioned structured packing along the main flow direction, which is along the direction of the column axis, and at the same time mixing of the liquid and/or the vapor in a direction at right angles to the above-mentioned main flow direction is promoted and mass transfer occurs.

In addition, according to the present invention, it is preferable to perform the aforementioned cryogenic distillation of oxygen such that the density corrected superficial velocity (the superficial F factor) is at least $0.5 \text{ m/s(kg/m}^3)^{1/2}$ and no greater than $2.0 \text{ m/s(kg/m}^3)^{1/2}$ and more preferably, at least $0.8 \text{ m/s(kg/m}^3)^{1/2}$ and no greater than $1.8 \text{ m/s(kg/m}^3)^{1/2}$.

In addition, according to the present invention, it is preferable to perform the aforementioned cryogenic distillation of oxygen such that the distillation pressure is in the range of 0.5 bar to 5 bar, and more preferably, 1.1 bar to 2.5 bar.

As the oxygen starting material, it is preferable to use highly pure oxygen having a purity of 99.999% or greater. In particular, it is preferable to use cryogenically manufactured high purity oxygen obtained from a high purity oxygen preparation device using cryogenic distillation.

In addition, the method of the present invention is a method for enrichment of heavy oxygen isotopes comprising using a distillation column comprising three distillation columns, a first column, a second column and a third column, as the above-mentioned distillation column; supplying an oxygen starting material from a feed section to the first column; supplying at least a part of the liquid or vapor output from the bottom of the first column to the second column; supplying at least a part of the liquid or vapor output from the second column to the third column; and extracting an enriched vapor having a concentration of $^{16}O^{17}O$ of 10% or greater from the top of the third column.

In addition, the method of the present invention is a method of enrichment of heavy oxygen isotopes comprising carrying out the distillation in such a way that in the second column a concentration peak of $^{16}O^{17}O$ is created at the middle of the column, and that a mixture of heavy oxygen isotopes comprising $^{16}O^{17}O$ at a concentration of 1% or greater, $^{16}O^{18}O$ at a concentration of 90% or greater, and the remainder being mostly $^{16}O^{16}O$ is separated at the bottom of the second column.

In addition, the method of the present invention is a method of enrichment of heavy oxygen isotopes comprising carrying out the distillation such that enriched liquid or vapor having a concentration of $^{16}O^{18}O$ of 90% or greater is separated at the bottom of the third column.

In addition, the method of the present invention is a method in which the distillation column is equipped with a condenser for cooling and liquefying vapor output from the distillation column, and a reboiler for heating and vaporizing the liquid output from the distillation column, and a medium for heat exchange for exchanging heat with the output vapor and the output liquid in the condenser and the reboiler, wherein at least one gas selected from nitrogen, oxygen, air, and the exhaust gas of an air separation unit is used as the medium for heat exchange.

In addition, it is preferable if a structure comprising a plurality of distillations columns is used as the above-mentioned distillation column.

Additionally, the present invention provides a method of enrichment of heavy oxygen isotopes comprising enrichment of at least one type of oxygen molecule selected from among $^{16}O^{17}O$, $^{16}O^{18}O$, $^{17}O^{17}O$, $^{17}O^{18}O$ and $^{18}O^{18}O$, which contain heavy oxygen isotopes, by means of performing cryogenic distillation of an oxygen starting material containing heavy oxygen isotopes; subsequently conducting isotope scrambling; and obtaining an enriched product comprising a high concentration of at least one type of oxygen molecule containing the above-mentioned heavy oxygen isotopes.

The above-mentioned "isotope scrambling" is a general term describing the phenomena where in the presence of a plurality of molecular isotopes, each molecule randomly exchanges atoms with the other molecules. The "isotope exchange" using a catalyst described below is a typical example of this.

Additionally, the present invention provides a method of enrichment of heavy oxygen isotopes wherein an enriched product comprising an even higher concentration of at least one type of oxygen molecule containing said heavy oxygen isotopes is obtained by means of performing repeat cryogenic distillation on a heavy oxygen isotope enriched material obtained by means of the above-mentioned isotope scrambling.

Additionally, the present invention provides a method of enrichment of heavy oxygen isotopes wherein the concentration of: at least one component of a heavy oxygen isotope enriched material, obtained by means of the aforementioned method of enrichment of heavy oxygen isotopes, is increased by means of conducting additional isotope scrambling.

Additionally, the present invention provides a method of enrichment of heavy oxygen isotopes wherein the concentration of at least the heavy isotope oxygen $^{18}O^{18}O$ is further increased by means of performing repeat cryogenic distillation on the heavy oxygen isotope enriched material obtained by means of the aforementioned method.

Additionally, the present invention provides a method of enrichment of heavy oxygen isotopes wherein a heavy oxygen isotope enriched material containing an increased concentration of the heavy isotope oxygen $^{18}O^{18}O$, and an enriched product containing an increased concentration of the heavy oxygen isotope $^{17}O$ are obtained by means of performing further cryogenic distillation on a heavy oxygen isotope enriched material obtained by means of the aforementioned method.

In addition, the present invention provides a method of enrichment of heavy oxygen isotopes wherein a plurality of distillation columns are used and operated such that the maximum concentration of $^{17}O^{18}O$ appears in the middle section within the penultimate (next-to-last) distillation column, at the time of carrying out the enrichment of oxygen molecules containing heavy oxygen isotopes by means of performing the aforementioned cryogenic distillation.

Additionally, the present invention provides a method of enrichment of heavy oxygen isotopes wherein the aforementioned isotope scrambling for concentrating the above-mentioned heavy oxygen isotopes comprises isotope exchange using a catalytic reaction.

Additionally, the present invention provides a method of enrichment of heavy oxygen isotopes wherein the aforementioned: isotope scrambling for concentrating the above-mentioned heavy oxygen isotopes comprises adding hydrogen to and reacting it with the above-mentioned heavy oxygen isotope enriched material to produce water containing a high concentration of the above-mentioned heavy oxygen isotopes; and subsequently conducting electrolysis of said produced water to separate it into oxygen containing heavy oxygen isotopes and hydrogen.

Additionally, the present invention provides a method of enrichment of heavy oxygen isotopes wherein the aforementioned isotope scrambling for concentrating the heavy oxygen isotopes comprises passing the above-mentioned heavy oxygen isotope enriched material through plasma by means of silent discharge, high-frequency discharge, or electromagnetic induction.

Additionally, the present invention provides a method of enrichment of heavy oxygen isotopes wherein the aforementioned isotope scrambling for concentrating the heavy oxygen isotopes comprises irradiating the above-mentioned heavy oxygen isotope enriched material with ultraviolet rays to form ozone from said enriched material, and then decomposing the ozone.

Additionally, the present invention provides a method of enrichment of heavy oxygen isotopes wherein the aforementioned isotope scrambling for concentrating the heavy oxygen isotopes is carded out by means of an oxidation-reduction reaction of the above-mentioned heavy oxygen isotope enriched material with $BaO$, $SrO$, $CaO$, $Cu_2O$, $FeO$, $CO$, $Mn_3O_4$, $Ag$, $Au$, and/or a mixture thereof.

Additionally, the present invention provides a method of enrichment of heavy oxygen isotopes wherein the aforementioned isotope scrambling for concentrating the heavy oxygen isotopes comprises isotope exchange in which the above-mentioned heavy oxygen isotope enriched material is thermally treated at a temperature of 1000° C. or higher.

Additionally, the present invention provides a method of enrichment of heavy oxygen isotopes wherein the above-mentioned reaction between the above-mentioned enriched material and hydrogen is conducted by means of combustion using a combustion chamber.

Additionally, the present invention provides a method of enrichment of heavy oxygen isotopes wherein the above-mentioned reaction between the above-mentioned enriched material and hydrogen is a catalytic reaction in which an inert gas such as Ar is supplied to said reaction system as a diluent gas to dilute the above-mentioned enriched material and hydrogen.

In addition, according to the present invention, examples of the catalyst used for catalytic reaction of the above-mentioned enriched material and the above-mentioned hydrogen may include a catalyst containing at least one component selected from the group comprising Pd, Pt, Rh, Ru, Ni, Cu, Au, Mn and metal oxides thereof Furthermore, it is possible to use at least one type of catalyst in which these metals or metal oxides (Pt, Pd, Rh, etc.) are carried by Al-oxide, Si-oxide, Ti-oxide, Zr-oxide, Cr-oxide, V-oxide, Co-oxide, Mn-oxide, and the like.

Additionally, the present invention provides a method of enrichment of heavy oxygen isotopes wherein water produced by means of reacting the above-mentioned enriched material with hydrogen is cooled and condensed; said condensed water is separated from the diluent gas; and the diluent gas separated from the condensed water is returned to the above-mentioned reaction system for recirculation and reuse.

Additionally, the present invention provides a method of enrichment of heavy oxygen isotopes wherein hydrogen produced by means of the above-mentioned electrolysis is recycled and reused as hydrogen for addition to the above-mentioned enriched material.

Additionally, the present invention provides a method of enrichment of heavy oxygen isotopes wherein impurities in oxygen produced by means of the above-mentioned electrolysis are removed through oxidization by means of a catalytic reaction.

As the catalyst used for said catalytic reaction, a catalyst comprising at least one component selected from among the group comprising Pt, Pd, Rh, Ru, Au, Ni, Cu, and Ag—Pd is suitable.

Further, more preferred examples include at least one type of catalyst wherein these metals (Pt, Pd, Rh, etc.) are carried by one of the aforementioned metallic oxides (Al-oxide, Si-oxide, etc.).

The apparatus used in the present invention is an apparatus for the enrichment of heavy oxygen isotopes which comprises a distillation column packed with structured packing and is an apparatus for enriching at least one type of oxygen molecule selected from among $^{16}O^{17}O$, $^{16}O^{18}O$, $^{17}O^{17}O$, $^{17}O^{18}O$ and $^{18}O^{18}O$ which contain heavy oxygen isotopes by means of cryogenic distillation of oxygen.

In the same way, in the apparatus for the enrichment of heavy oxygen isotopes of the present invention, the above-mentioned structured packing is promoting-fluid-dispersion type structured packing which has a structure such that when a liquid descending in the distillation column and a vapor ascending in the distillation column make contact, the liquid and the vapor flow in mutually opposite directions over the surface of the above-mentioned structured packing along the main flow direction, which is along the direction of the column axis, and at the same time mixing of the liquid and/or the vapor in a direction at right angles to the above-mentioned main flow direction is promoted and mass transfer occurs.

In addition, in the apparatus for the enrichment of heavy oxygen isotopes of the present invention, the specific surface area of the packing in the above-mentioned distillation column is in the range of 350 $m^2/m^3$ to 1200 $m^2/m^3$, and preferably 500 $m^2/m^3$ to 750 $m^2/m^3$.

The apparatus for the enrichment of heavy oxygen isotopes of the present invention comprises at least one distillation column for enriching at least one type of oxygen molecule selected from among $^{16}O^{17}O$, $^{16}O^{18}O$, $^{17}O^{17}O$, $^{17}O^{18}O$ and $^{18}O^{18}O$, which contain heavy oxygen isotopes, by means of cryogenic distillation of an oxygen starting material containing heavy oxygen isotopes; and at least one isotope scrambler for increasing the concentration of at least one type of oxygen molecule selected from among $^{16}O^{17}O$, $^{16}O^{18}O$, $^{17}O^{17}O$, $^{17}O^{18}O$ and $^{18}O^{18}O$, which contain heavy oxygen isotopes, in the heavy oxygen isotope enriched material obtained from the above-mentioned distillation column, by means of isotope scrambling.

Additionally, in the apparatus for the enrichment of heavy oxygen isotopes of the present invention, the above-mentioned isotope scrambler is provided with an isotope exchange catalyst for the promotion of isotope exchange in the above-mentioned enriched material, and this isotope exchange catalyst includes at least one constituent selected from among the group comprising W, Ta, Pd, Rh, Pt and Au.

Additionally, in the apparatus for the enrichment of heavy oxygen isotopes of the present invention, the above-mentioned isotope scrambler is provided with an isotope exchange catalyst for the promotion of isotope exchange in the above-mentioned enriched material, and this isotope exchange catalyst includes at least one constituent selected from among the group comprising Ti-oxide, Zr-oxide, Cr-oxide, Mn-oxide, Fe-oxide, Co-oxide, Ni-oxide, Cu-oxide, Al-oxide, Si-oxide, Sn-oxide, and V-oxide.

In addition, in the apparatus for the enrichment of heavy oxygen isotopes according to the present invention, the distillation column is packed with structured packing, and the above-mentioned structured packing is promoting-fluid-dispersion type structured packing which has a structure such that when a liquid descending in the distillation column and a vapor ascending in the distillation column make contact, the liquid and the vapor flow in mutually opposite directions over the surface of the above-mentioned structured packing along the main flow direction, which is along the direction of the column axis, and at the same time mixing of the liquid and/or the vapor in a direction at right angles to the above-mentioned main flow direction is promoted and mass transfer occurs.

In addition, in the apparatus of the present invention, the specific surface area of the packing in the above-mentioned distillation column may be in the range of 350 $m^2/m^3$ to 1200 $m^2/m^3$, and preferably 500 $m^2/m^3$ to 750 $m^2/m^3$.

Additionally, in the apparatus of the present invention, the above-mentioned distillation column may comprise a plurality (n) of distillation columns ($A_1$~$A_n$), wherein the bottoms of the columns $A_k$ (k: a natural number of (n−1) or less) are connected to the tops of columns $A_{k+1}$ by a conduit pipe via a liquid transfer means which sends liquid output from column $A_k$ to column $A_{k+1}$, and the lower part of the column $A_k$ is connected to the top of column $A_{k+1}$ by a conduit pipe for transferring the vapor output from the column $A_{k+1}$ to the column $A_k$.

Additionally, in the apparatus of the present invention, a condenser is preferably provided at the top of the aforementioned column $A_1$, and a reboiler is preferably provided at the bottom of the aforementioned column $A_{k+1}$.

Additionally, in the present invention, a circulation system for a medium for heat exchange which connects a second conduit of the above-mentioned condenser and a second conduit of the above-mentioned reboiler may be provided, and a circulation means for circulating the medium for heat exchange (for example, air, nitrogen, oxygen, or the like) may be provided somewhere along the above-mentioned circulation system.

The aforementioned circulation means may comprise a low-temperature compressor.

In addition, the aforementioned circulation means may comprise a normal temperature compressor. In this case, a heat exchanger for conducting heat exchange between the medium for heat exchange at the inlet of the above-mentioned normal temperature compressor and the medium for heat exchange at the outlet of the above-mentioned normal temperature compressor is preferably provided.

In addition, in the apparatus of the present invention, a plate fin type condenser maybe provided at the top of the above-mentioned distillation column, and a coil-type reboiler or a plate fin type reboiler may be provided within the above-mentioned column in the vicinity of the bottom. In addition, a conduit pipe is connected to the inlet side of a first conduit of the above-mentioned condenser for introducing at least a part of the output vapor from the top of the distillation column into the above-mentioned first conduit of the above-mentioned condenser. A conduit pipe is connected to the outlet side of the first conduit for introducing liquid output from this conduit into the top of the above-mentioned distillation column again. A conduit pipe for circulating a medium for heat exchange is connected to the second conduit of the condenser, this conduit pipe for circulating a medium for heat exchange is connected to the above-mentioned coil type reboiler or plate fin type reboiler, and a circulation means is provided in the above-mentioned conduit pipe for circulating the medium for heat exchange within the above-mentioned conduit pipe.

BRIEF DESCRIPTION OF THE DRAWINGS

FIG. 23 is a graph showing the simulated results of the concentrations of the heavy oxygen isotopes for an example in which the apparatus shown in FIG. 17 was used, and shows the concentration distribution of each isotope within the third distillation column.

FIG. 24 is a graph showing the simulated results of the concentrations of the heavy oxygen isotopes for an example in which the apparatus shown in FIG. 18 was used, and shows the concentration distribution of each isotope within the first distillation column.

FIG. 25 is a graph showing the simulated results of the concentrations of the heavy oxygen isotopes for an example in which the apparatus shown in FIG. 18 was used, and shows the concentration distribution of each isotope within the second distillation column.

FIG. 26 is a graph showing the simulated results of the concentrations of the heavy oxygen isotopes for an example in which the apparatus shown in FIG. 18 was used, and shows the concentration distribution of each isotope within the third distillation column.

FIG. 27 is a graph showing the simulated results of the concentrations of the heavy oxygen isotopes for an example in which the apparatus shown in FIG. 18 was used, and shows the concentration distribution of each isotope within the fourth distillation column.

DETAILED DESCRIPTION OF THE PREFERRED EMBODIMENTS

Figure 1:
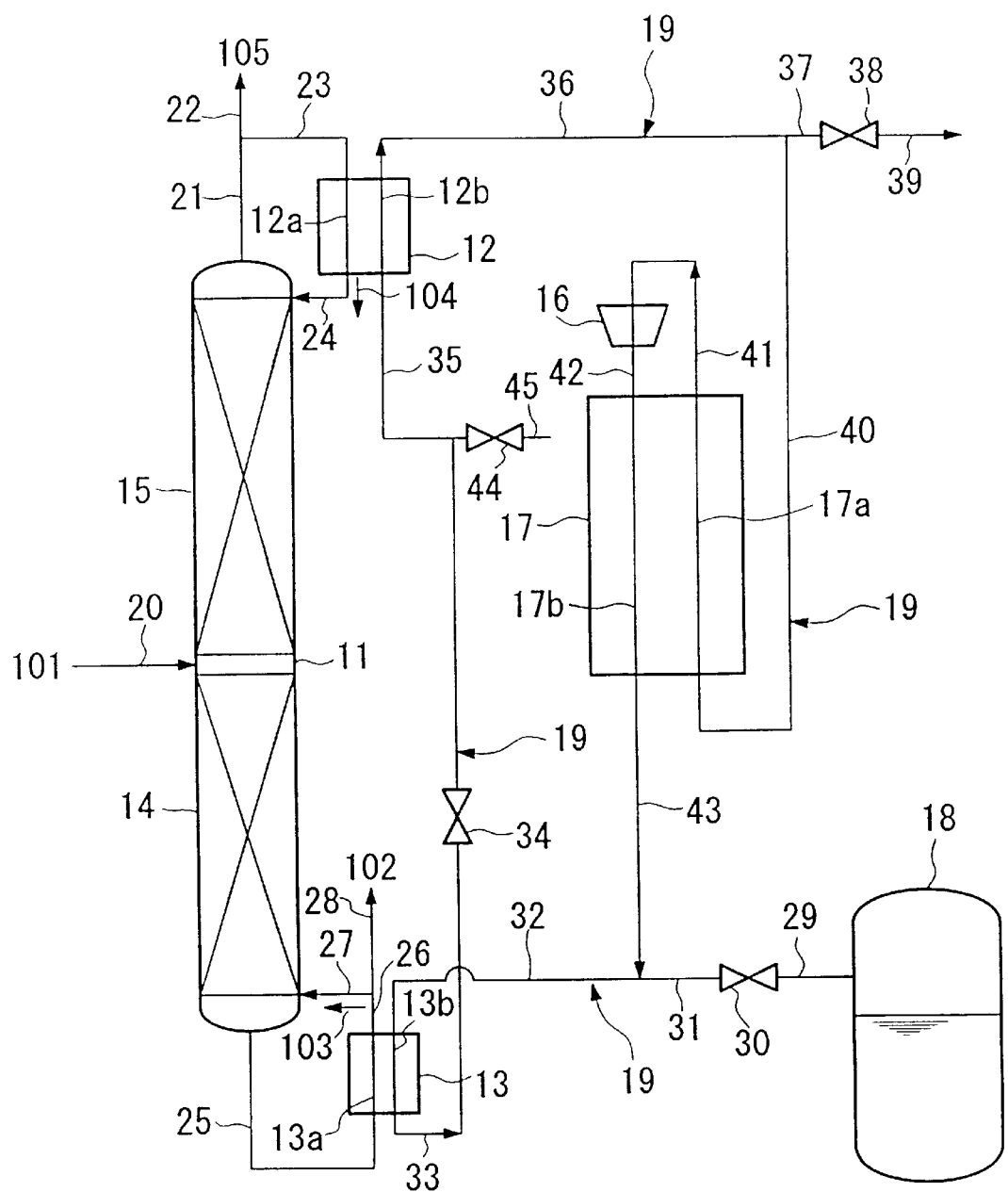
FIG. 1 is a diagram showing a structural outline of an embodiment of an apparatus for the enrichment of heavy oxygen isotopes of the present invention.

FIG. 1 is a diagram showing an embodiment of an apparatus for the enrichment of heavy oxygen isotopes according to an embodiment of the present invention. The enrichment apparatus shown comprises a first distillation column 11 which is a packed column packed with structured packing 14 and 15; a condenser 12 for cooling and liquefying at least a part of the vapor (output vapor) output from the top of distillation column 11; a reboiler 13 for heating and vaporizing at least a part of the liquid (output liquid) output from the bottom of the distillation column 11; a storage tank 18 for a medium for heat exchange for exchanging heat with the above-mentioned output vapor and the above-mentioned output liquid within the condenser 12 and the reboiler 13; a circulation system 19 for circulating said medium for heat exchange passed the condenser 12 and the reboiler 13; a blower (compressor) 16 which is a ventilating (circulating) means for circulating the medium for heat exchange within the circulation system 19; and a heat exchanger 17 for the medium for heat exchange.

The lower part of the distillation column 11 is packed with structured packing 14, and the upper part of distillation column 11 is packed with structured packing 15.

As the structured packing 14 and 15, it is possible to suitably use non-promoting-fluid-dispersion type structured packing and/or promoting-fluid-dispersion type structured packing. Non-promoting-fluid-dispersion type structured packing has a shape and structure with which the liquid descending within the distillation column and the vapor ascending within the distillation column flow in opposition to one another along the surface of the packing, and vapor-liquid contact occurs without the promotion of mixing of the liquid and vapor in the horizontal cross-section direction with respect to the column axis. As examples, a packing material in which a large number of plates formed from aluminum, copper, alloy of aluminum and copper, stainless steel, various types of plastic, or the like are positioned parallel to the direction of the main flow (the direction of the column axis) can be mentioned.

Here, the main flow indicates the descending liquid and the ascending vapor which occurs along the direction of the column axis within the distillation column, therefore, it indicates the flow in the direction of the column axis with respect to the flow of mass transfer which is produced at the liquid-vapor interface (in other words, the boundary layer) at the surface of the packing.

Figure 2:
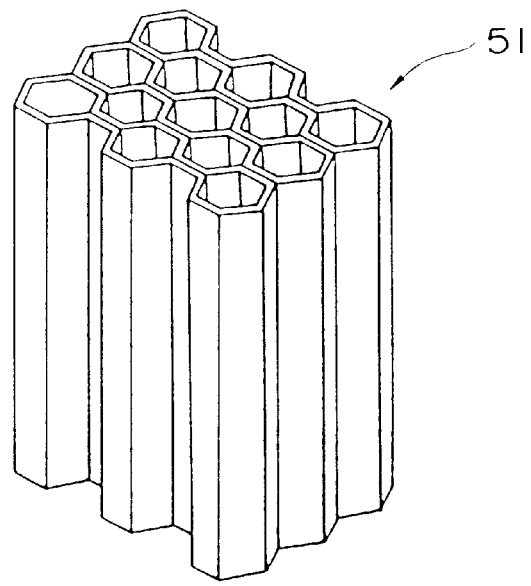
FIG. 2 is a perspective view showing an example of the non-promoting-fluid-dispersion type structured packing which can be used in the enrichment apparatus shown in FIG. 1.
Figure 3:
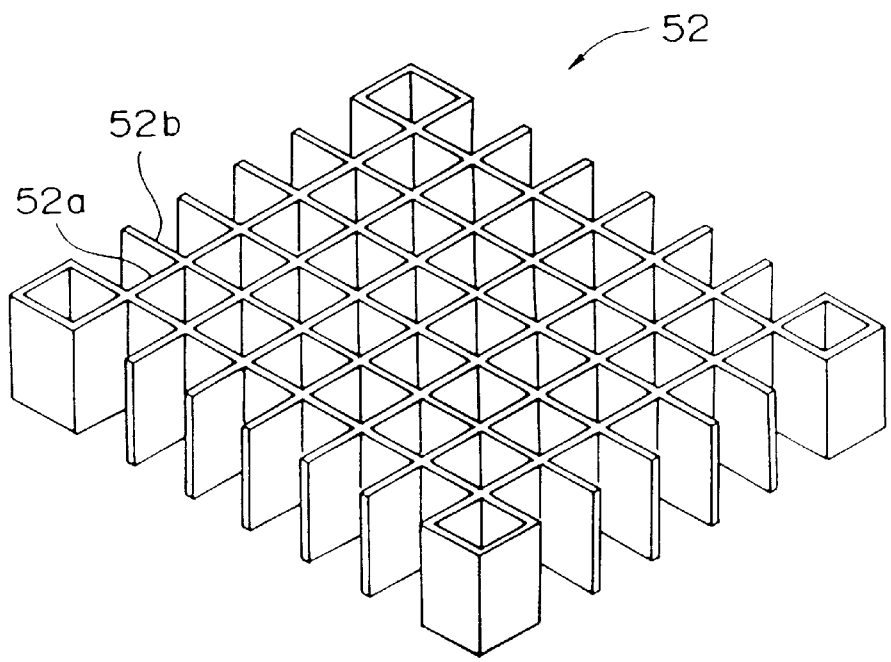
FIG. 3 is a perspective view showing another example of the non-promoting-fluid-dispersion type structured packing which can be used in the enrichment apparatus shown in FIG. 1.

Examples of typical non-promoting-fluid-dispersion type packing materials are shown in FIG. 2 and FIG. 3.

Figure 4:
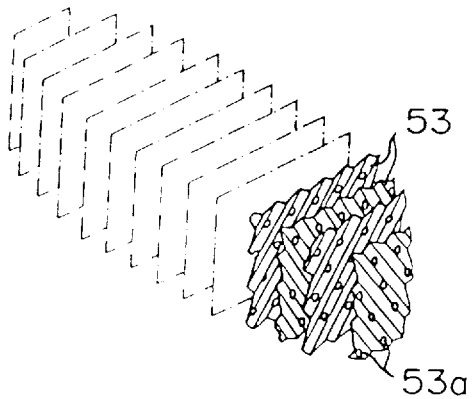
FIG. 4 is a perspective view showing an example of the promoting-fluid-dispersion type structured packing which can be used in the enrichment apparatus shown in FIG. 1.
Figure 7:
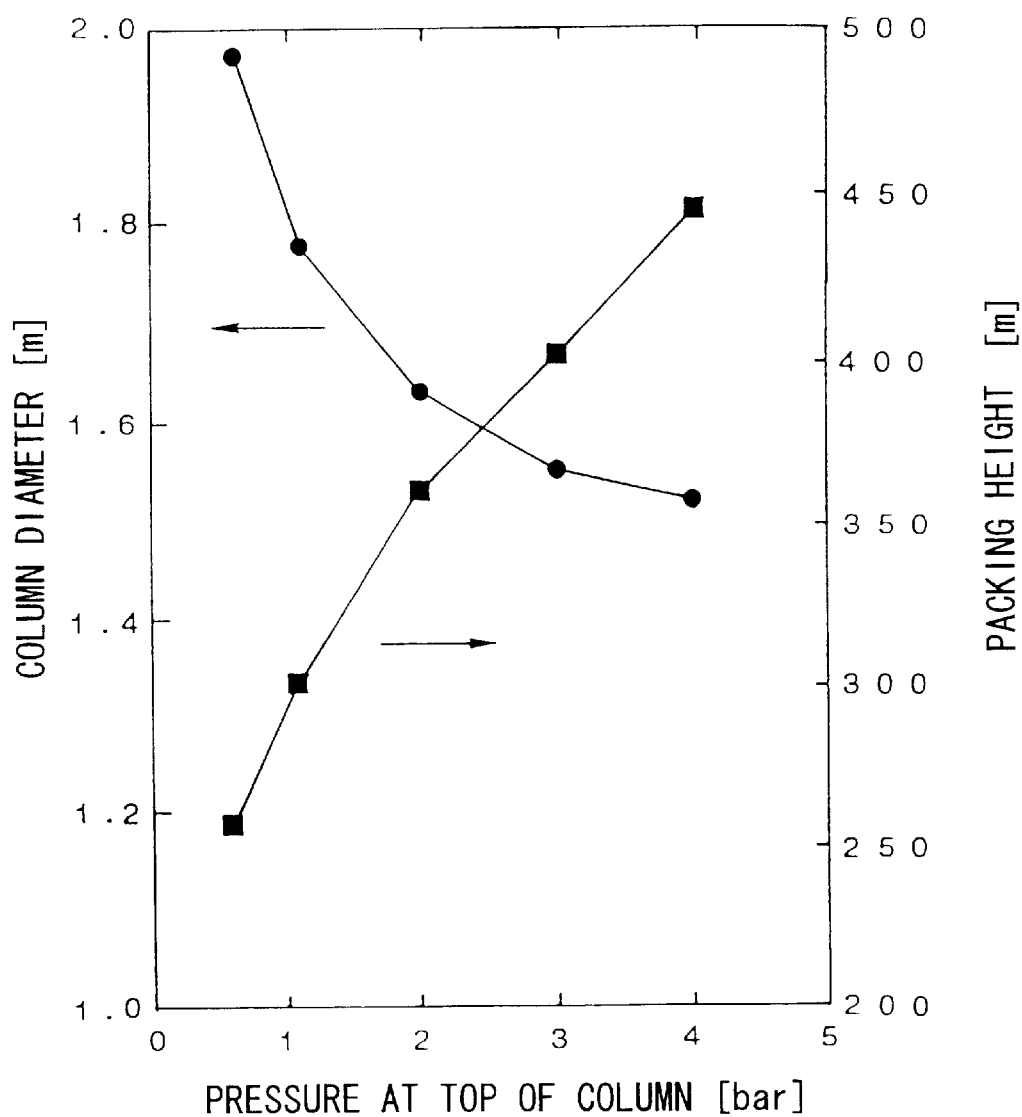
FIG. 7 is a graph showing the simulated results for a distillation operation as an example of when the enrichment apparatus shown in FIG. 1 is used.

FIG. 2 is FIG. 7 disclosed in Japanese Utility Model Application, First Publication No. Sho 56-20624; and FIG. 3 is FIG. 4 disclosed in Japanese Utility Model Application, First Publication No. Sho 51-45935.

The non-promoting-fluid-dispersion type structured packing 51 shown in FIG. 2 has a honeycomb structure comprising plates parallel to the direction of the axis of the column.

In addition, the non-promoting-fluid-dispersion type structured packing 52 shown in FIG. 3 is a lattice structure comprising a plurality of mutually parallel plates 52a and a plurality plates 52b which are arranged at right angles with respect to the plates 52a, and this lattice structure is positioned along the direction of the column axis.

Promoting-fluid-dispersion type structured packing has a shape and structure with which vapor-liquid contact occurs mainly on the surface of the above-mentioned structured packing between the liquid descending within the distillation column and the vapor ascending within the column, at which time, the liquid and the vapor flow in opposition to one another on the surface of the above-mentioned structured packing in the direction of the main flow which is along the direction of the column axis, and at the same time, mixing of the liquid and/or the vapor in a direction at right angles to the above-mentioned main flow direction is promoted and vapor-liquid contact occurs. These are called structured packing or regular packing in which thin plates of aluminum, copper, aluminum-copper alloy, stainless steel, various plastics, or the like are formed into a variety of regular forms, and then made into a laminated block.

Figure 5:
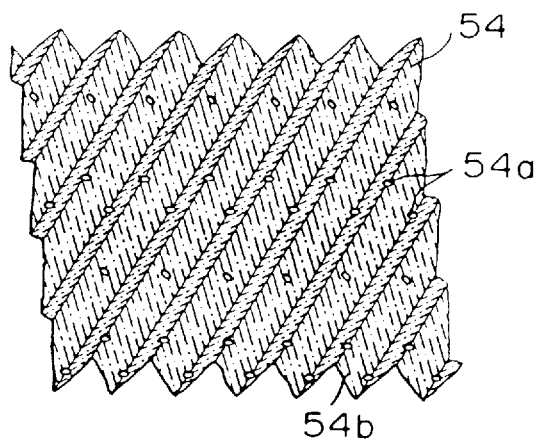
FIG. 5 is a perspective view showing another example of the promoting-fluid-dispersion type structured packing which can be used in the enrichment apparatus shown in FIG. 1.
Figure 6:
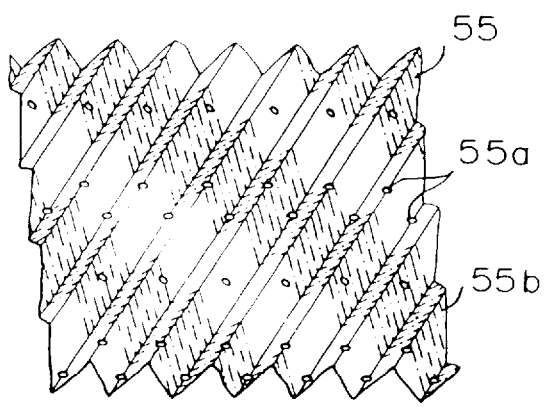
FIG. 6 is a perspective view showing another example of the promoting-fluid-dispersion type structured packing which can be used in the enrichment apparatus shown in FIG. 1.

Typical examples of promoting-fluid-dispersion type structured packing are shown in FIG. 4, FIG. 5 and FIG. 6. The example shown in FIG. 4 is FIG. 3 disclosed in Japanese Examined Patent Application, Second Publication No. Sho 57-36009. The example shown in FIG. 5 is FIG. 1 disclosed in Japanese Unexamined Patent Application, First Publication No. Sho 54-16761. The example shown in FIG. 6 is FIG. 3 disclosed in Japanese Unexamined Patent Application, First Publication No. Sho 54-15554.

All of the examples shown in these figures show the form of a wave-shaped thin plate which is a structural component of this type of packing. Small holes (references 53a, 54a, and 55a in the figures) having a diameter of 2~4 mm are punched in a thin plate of metal such as aluminum having a thickness of 0.1~0.3 mm with a fixed regular distribution, which is then molded into a wave shape.

In the promoting-fluid-dispersion type structured packing 53 shown in FIG. 4, a plurality of wave-shaped thin plates are disposed parallel to the column axis and made into the form of a block by layering the plates so that they come into contact with one another. The wave-shaped grooves in each of the thin plates are inclined with respect to the column axis, and neighboring wave-shaped thin plates are disposed so that the direction of their wave-shaped grooves intersect one another. In addition, a plurality of holes 53a are provided in the thin plates. When the thin plates are disposed perpendicular with respect to the horizontal plane, the holes are provided with an interval of spacing therebetween and form a plurality of rows along a direction which is at right angles to the column axis. In the promoting-fluid-dispersion type structured packing 53 having this type of structure, the extent of the packing's ability to promote fluid distribution will vary depending on the size and number of holes 53a, the distribution of the plurality of holes 53a provided in the wave-shaped thin plates, and the like. Accordingly, many inventions have been proposed which are characterized by the selection and combination of these conditions.

FIG. 5 shows an example of a structural unit of another promoting-fluid-dispersion type structured packing. In the promoting-fluid-dispersion type structured packing 54 shown here, a thin plate is molded pressed in a wave shape to form wave-shaped grooves. In addition, this example, has the feature that extremely small wave-shaped grooves 54b are formed in the thin plates at a fixed angle with respect to the wave-shaped grooves.

It is preferable for the direction in which the wave-shaped grooves are formed to be set within the range of 15~60° with respect to the column axis, and for the direction in which the extremely small wave-shaped grooves 54b are formed to be set within the range of 15~90° with respect to the column axis. In addition, it is preferable for the length and height of the extremely small wave-shaped grooves 54b to be 0.3 to 3 mm. In addition, reference 54a indicates holes formed in the thin plate.

The promoting-fluid-dispersion type structured packing 55 shown in FIG. 6 has the feature of having a structure in which sections having extremely small grooves formed at a fixed angle with respect to the wave-shaped grooves and smooth sections which do not have these extremely small grooves are provided alternately in the wave-shaped thin plate. In addition, the reference 55a indicates holes formed in the thin plates.

In addition, when blocks of these promoting-fluid-dispersion type structured packing are packed in the distillation column, it is preferable to carry out the stacking by rotating the loading angle for the block in the column cross-section (i.e., the angle for disposing the wave-shaped thin plates) by a fixed angle for each block or each set of blocks, and thereby, the effect of achieving uniform dispersion is even further improved.

The detailed shape and structure of each of the various packings, their characteristics, and the characteristics of the packing method are introduced in Japanese Unexamined Patent Application, First Publication, No. Sho 58-26997, for example, as well as in the three references cited above.

In the present invention, of the two types of structured packing (non-promoting-fluid-dispersion type structured packing and promoting-fluid-dispersion type structured packing), it is particularly preferable to use promoting-fluid-dispersion type structured packing.

This is because when promoting-fluid-dispersion type structured packing is used, the flow of the descending liquid and the ascending vapor within the column readily becomes uniform, and it is possible to increase the efficiency of the vapor-liquid contact.

In addition, it is preferable for the specific surface area of the above-mentioned packing to be 350 $m^2/m^3$ to 1200 $m^2/m^3$, and more preferably 500 $m^2/m^3$ and 750 $m^2/m^3$. When the specific surface area is less than 350 $m^2/m^3$, the vapor-liquid contact surface area is insufficient and the efficiency of the vapor-liquid contact is reduced. When the specific surface area exceeds 1200 $m^2/m^3$, there is concern that flooding will occur.

In addition, in order for the vapor-liquid contact to proceed efficiently in the distillation column 11, it is preferable to provide at least one collector and one distributor (not shown in the Figures) in the distillation column 11.

Condenser 12 has a first conduit 12a into which vapor output from the top of distillation column 11 is introduced, and a second conduit 12b through which a medium for heat exchange passes for heat exchange with the vapor within the first conduit 12a, and is made such that the above-mentioned output vapor can be cooled and liquefied by means of heat exchange with the medium for heat exchange. As condenser 12, it is preferable to use plate fin type heat exchangers of counter current type or parallel flow type. In particular, since the amount of the medium for heat exchange required for distillation is small, it is preferable for the condenser to be a non-submerged type which is provided outside of the distillation column 11.

The reboiler 13 has a first conduit 13a into which liquid output from the distillation column 11 is introduced, and a second conduit 13b through which the medium for heat exchange passes for heat exchange with the liquid within the first conduit 13a, and is made such that the above-mentioned output liquid can be heated and vaporized by means of heat exchange with the medium for heat exchange.

As the reboiler 13, it is preferable to use plate fin type heat exchanger of counter current type or parallel flow type.

In this case, the reboiler 13 may be installed outside or inside the distillation columns 11, but for the purpose of easy manufacture, it is preferable for the reboiler 13 to be installed outside.

In addition, in place of the reboiler 13, it is possible to install a coil type reboiler within the bottom of the distillation column. This situation is advantageous from the point of view of the amount of liquid required for the liquid at bottom of the column, however, it is disadvantageous form the point of view of the surface area for heat exchange, and manufacturing efficiency.

As a blower 16, an normal temperature compressor can be used.

In addition, heat exchanger 17 a first conduit 17a into which the medium for heat exchange which has passed through the second conduit 12b of the above-mentioned condenser 12 is introduced, and a second conduit 17b into which the medium for heat exchange which has passed through blower 16 is introduced, and is made such that heat exchange can occur between the medium for heat exchange within the first conduit 17a on the inlet side of the blower 16 and the medium for heat exchange within the second conduit 17b on the outlet side of the blower 16. As the heat exchanger 17, it is preferable to use a counter-flow type or a parallel-flow type plate-fin heat exchanger.

In the following, as an example in which the above-mentioned apparatus is used, an example of a method for enrichment of $^{16}O^{17}O$ and $^{16}O^{18}O$ of those oxygen molecules which contain heavy oxygen isotopes is explained.

Initially, an oxygen vapor starting material (feed 101) is supplied to the distillation column 11, via the conduit pipe 20 which serves as a feeding section connected to the first distillation column 11 at a position intermediate between the bottom section packed with packing 14 and the upper section packed with packing 15.

The use of oxygen with high purity is preferred as the aforementioned oxygen vapor starting material. As methods for producing oxygen of high purity, known methods which use production apparatus for oxygen with high purity can be used, such as methods disclosed in Japanese Examined Patent Application, Second Publication No. Hei 4-13628; Japanese Unexamined Patent Application, First Publication No. Sho 64-41748; Japanese Unexamined Patent Application, First Publication No. Sho 64-46563; Japanese Unexamined Patent Application, First Publication No. Hei 3-17488, and Japanese Examined Patent Application, Second Publication No. Hei 6-72740.

As the above-mentioned oxygen of high purity, it is preferable to use oxygen with a purity of 99.999% or higher, from which impurities such as argon, hydrocarbons, krypton, xenon, and fluorine compounds (such as perfluorocarbons) have been removed in advance.

By means of the use of oxygen of high purity, there are no components which hinder the enrichment of oxygen in the heavy oxygen isotopes according to each of the processes of the present invention, and each of the processes proceeds well. In particular, the use of an oxygen starting material from which hydrocarbons have been removed is preferable from the point of view of safety.

In addition, it is preferable to use a cryogenic high purity oxygen product obtained from a production apparatus for oxygen with high purity using cryogenic distillation, because the oxygen starting material can be used as a cooling source. Moreover, as the oxygen starting material, it is also possible to use liquefied oxygen.

The oxygen starting material; vapor supplied to the distillation column 11 is distilled by means of vapor-liquid contact with a reflux liquid (i.e., descending liquid) described below, when ascending within the distillation column 11 and passing through the packing 15.

In this process, those molecules in the oxygen starting material vapor which contain heavy oxygen isotopes (i.e. $^{16}O^{17}O$, $^{16}O^{18}O$, etc.) are more likely to condense due to their high boiling points, and the condensed liquid flows down with the reflux liquid within the distillation column 11 as the descending liquid.

Accordingly, oxygen vapor ($^{16}O^{16}O$ enriched vapor), having a decreased concentration of the heavy isotopes, separates at the top of the distillation column 11.

The enriched vapor is then output from the distillation column 11 via the conduit pipe 21, and a portion of the vapor is introduced via conduit pipe 23 into the first conduit 12a of the condenser 12, where it is condensed by means of heat exchange with the medium for heat exchange flowing within the second conduit 12b, and returned to the top of the distillation column 11 via conduit pipe 24 as a reflux liquid 104.

The remaining portion of the aforementioned enriched vapor output from the distillation column 11 via the conduit pipe 21 is discharged out of the system as exhaust vapor 105 via the conduit pipe 22.

The reflux liquid introduced into the top of the distillation column 11 flows down as descending liquid while making vapor-liquid contact with the oxygen starting material vapor which is ascending within the distillation column 11, and reaches the bottom of the distillation column 11. In this process of vapor-liquid contact, the descending liquid becomes enriched in heavy oxygen isotopes, which have a greater tendency to liquefy.

Liquid which accumulates at the bottom of the distillation column 11 (hereinafter, referred to as the "column bottom liquid") is output from the distillation column 11 and introduced into the first conduit 13a of the reboiler 13 via the conduit pipe 25, where it is vaporized by means of heat exchange with the medium for heat exchange flowing within the second conduit 13b. Subsequently, it is output from the reboiler 13 via conduit pipe 26, and a portion thereof (reboiler vapor 103) is reintroduced into the bottom of the distillation column 11 via conduit pipe 27 and becomes; ascending vapor which rises within the distillation column 11.

The remaining portion of the vapor output from the first conduit 13a of the reboiler 13 is discharged from the system via conduit pipe 28 as product vapor 102 enriched in heavy oxygen isotopes.

Next, the flow of the medium for heat exchange which passes through the second conduit 12b of the condenser 12 and the second conduit 13b of the reboiler 13 will be explained.

As the medium for heat exchange, it is possible to use at least one of nitrogen, oxygen, air or the exhaust gas of an air separation unit. In the following, an example in which nitrogen is used as the medium for heat exchange will be explained.

Nitrogen within a storage tank 18, which has been filled with liquid nitrogen in advance, is output from the storage tank 18 through pipe 29 in a gaseous state as the medium for heat exchange, it passes through valve 30 and pipes 31 and 32 and flows into the second conduit 13b of the reboiler 13, and exchanges heat with the column bottom liquid (oxygen) within the first conduit 13a.

The nitrogen which has passed through the reboiler 13 then passes along pipe 33 and the pressure is reduced at the valve 34 and, at this time, a part thereof condenses.

Next, this nitrogen passes along pipe 35, flows into second conduit 12b of the condenser 12, and exchanges heat with the oxygen vapor within the first conduit 12a, and is vaporized.

The vaporized nitrogen passes along pipes 36 and 40 and is introduced into the first conduit 17a of the heat exchanger 17, and here it is heated to normal temperature through heat exchange with the nitrogen within the second conduit 17b, then it is introduced into the blower 16, and is pressurized.

The nitrogen pressurized by the blower 16 is introduced into second conduit 17b of heat exchanger 17, where it exchanges heat with the nitrogen within the first conduit 17a and is cooled, then it passes along pipe 43, is introduced into the above-mentioned pipe 31, and circulates through the above-described path.

The above-described circulation system 19 is a course comprising conduit pipes 31, 32, 33, 35, 36, 40, 41, 42, and 43 which are circulation conduit pipes for circulation nitrogen as the medium for heat exchange between the condenser 12 and the reboiler 13.

In the above-described method, it is possible to introduce the liquid nitrogen within the storage tank 18, for example, into the above-mentioned conduit pipe 35 via conduit pipe 45 which has valve 44 and supply it to the apparatus as a cooling source.

In addition, it is possible for a part of the circulating nitrogen to be discharged out of the system through conduit pipes 37 and 39 which are equipped with valve 38.

In this way, by means of the use and circulation of the medium for heat exchange, it is possible to utilize the cool temperature of the medium for heat exchange without waste and to reduce energy loss to a minimum, and thus to reduce operating costs.

In the above-mentioned operation, it is preferable for the distillation to be carried out in such a way that the superficial F factor within the distillation column 11 is at least 0.5 m/s(kg/m$^3$)$^{1/2}$ and no greater than 2.0 m/s(kg/m$^3$)$^{1/2}$, and preferably at least 0.8 m/s(kg/m$^3$)$^{1/2}$, and no greater than 1.8 m/s(kg/m$^3$)$^{1/2}$.

When the superficial F factor is less than 0.5 m/s(kg/m$^3$)$^{1/2}$, the mass transfer between the liquid and vapor decreases, and the efficiency of vapor-liquid contact (i.e., distillation efficiency) is reduced. In addition, a superficial F factor exceeding 2.0 m/s(kg/m$^3$)$^{1/2}$ is undesirable due to the tendency for flooding.

In addition, the pressure within the column is preferably in the range of 0.5 bar to 5 bar, and more preferably 1.1 bar to 2.5 bar.

When the pressure is less than 0.5 bar, the distillation operation becomes a low pressure distillation (vacuum distillation) and consideration must be given to apparatus for pump leaks and the like. In addition, if the pressure exceeds 5 bar, since the relative volatility of the three above-mentioned components becomes even closer to one and separation becomes more difficult, the disadvantage arises that the required packing height within the distillation column is increased.

As described above, in the method for enrichment of the heavy oxygen isotopes of the present invention, enrichment of $^{16}O^{17}O$ and $^{16}O^{18}O$ is carried out by means of cryogenic distillation of an oxygen starting material using a distillation column packed with structured packing, and thereby the effects shown below are obtained.

(1) In contrast to water distillation and NO distillation, since oxygen which does not contain other elements is used as the starting material, it is possible to obtain an enriched product with a high concentration of heavy oxygen isotopes, which does not contain compounds of heavy isotopes of other elements with $^{16}O$.

(2) Since the latent heat of vaporization of oxygen (the starting material) is low (the latent heat of vaporization of oxygen is approximately ⅙ of that of water), it is possible to reduce the size of the heat exchangers (condenser 12 and reboiler 13) compared with those for water distillation methods, and thus it is possible to reduce the energy consumption of the apparatus. For this reason, it is possible to reduce operation costs. In addition, it is possible to miniaturize the heat exchangers and to reduce apparatus costs.

(3) The oxygen starting material. is not a corrosive or toxic gas, and hence is advantageous with regard to ease of handling and safety when compared with NO-distillation methods in which NO, which is a corrosive and toxic gas, is used as the starting material.

(4) By means of the use of a distillation column 11 in which structured packing 14 and 15 are used, it is possible to reduce liquid hold-up when compared with situations in which unstructured packing is used, and thus it is possible to shorten the time required to start up the apparatus. Furthermore, it is possible to reduce power costs and the like required during the start-up and thereby to reduce operating costs.

(5) By means of using structured packing, it is possible to increase the efficiency of vapor-liquid contact within the distillation column 11, and thereby increase the efficiency of the heavy isotope enrichment.

(6) In general, since the separation coefficient of oxygen isotopes is extremely close to 1, when a plate distillation column is used as the distillation column, theoretically several thousand plates are necessary and the pressure loss is great. In addition, when using unstructured packing as well, the pressure loss is great.

In contrast to this, in the method of the above-mentioned embodiment, by means of using a distillation column 11 in which structure packing 14 and 15, for which the pressure loss is low, are used, it is possible for the pressure within the column to be set at a lower level. By means of reducing the pressure within the column, it is possible to increase the relative volatility of $^{16}O^{17}O$ with respect to $^{16}O^{16}O$, and to increase the relative volatility of $^{16}O^{18}O$ with respect to $^{16}O^{16}O$. Thereby, it is possible to increase the efficiency of the enrichment of $^{16}O^{17}O$ and $^{16}O^{18}O$.

(7) By means of using, as the structured packing 14 and 15, promoting-fluid-dispersion type structured packing with which the vapor-liquid contact occurs while mixing of the liquid and/or the vapor in a direction at right angles to the main flow direction within the distillation column 11 is promoted, it is possible to increase the efficiency of vapor-liquid contact and to further improve the efficiency of the enrichment of the heavy oxygen isotopes.

(8) By means of the provision of a condenser 12 and a reboiler 13 in the distillation column 11, and by using and circulating a medium for heat exchange, such as nitrogen, between the condenser 12 and the reboiler 13, it is possible to make use of the coolness of the medium for heat exchange without waste, to suppress energy loss to a minimum and thereby to reduce operating costs.

In addition, since a cryogenic and highly pure oxygen product obtained from a high purity oxygen production apparatus using cryogenic distillation is used as the oxygen starting material, it is possible to use this oxygen starting material as a cooling source and thereby to reduce operating cost of the apparatus.

In addition, by means of using highly pure oxygen with a purity of 99.999% or greater as the oxygen starting material, it is possible to prevent the final product from being contaminated with impurities such as argon, hydrocarbons such as methane, krypton, xenon, perfluorocarbons, and the like.

In particular, it is possible to prevent high concentrations of hydrocarbons such as methane, and thereby to prevent the occurrence of accidents such as fires.

In the following, the results of a computer simulation for a process of enrichment of heavy oxygen isotopes by means of vapor-liquid contact and distillation which occur within the distillation column 11 using the above mentioned process will be explained.

The distillation theory employed in designing the distillation column according to the present invention and the distillation theory employed in this simulation use a rate model relating to mass transfer, in which the so-called H.E.T.P. (Height Equivalent to a Theoretical Plate) or equilibrium stage model were not used.

In the distillation theory using this rate model, the mass flux N is expressed in the following way using the diffusion flux J and convection ρV.

$$N = J_{GS} + \rho_{GS} v_{GS} \omega_{GS}$$

In addition, as the formula for the correlation related to mass transfer, it is possible to give the following.

$$Sh_{GS}(J_{GS}/N) = A_1 Re_G^{A2} \cdot Sc_{GS}^{A3}$$

wherein Sh, Re, and Sc are respectively defined by the following formulae.

$$Sh_{GS} = Nd/(\rho_{GS} D_{GS} \Delta \omega_{GS})$$

$$Re_G = \rho_G U_G d/\mu_G$$

$$Sc_{GS} = \mu_{GS}/(\rho_{GS} D_{GS})$$

N: mass flux [kg/(m²·s)]
J: diffusion flux [kg/(m²·s)]
d: equivalent diameter [m]
D: diffusion coefficient [m²/s]
ρ: density [kg/m³]
v: velocity [m/s]
ω: concentration [kg/kg]
Sh: Sherwood number [-]
Re: Reynolds number [-]
Sc: Schmidt number [-]
A1, A2, A3: constants determined depending on the system
subscript G: vapor phase
subscript S: vapor-liquid interface The advantages with this rate model are that it is possible to correctly predict the mass transfer of an intermediate component within a multi-component system, and it does not give unrealistic results such as the negative values obtained with H.E.T.P. or Murphree's plate efficiency which occur when making calculations by means of the equilibrium stage model.

The aforementioned model is disclosed in detail in J. A. Wesselingh: "Non-equilibrium modeling of distillation" IChemE Distillation and Absorption '97, vol. 1, pp. 1–21 (1997).

In the following, as an example of a situation in which the enrichment apparatus shown in FIG. 1 is used, the results of a simulation of a process of enrichment of the heavy oxygen isotopes using the above-mentioned formula will be explained.

Naturally abundant oxygen contains three types of isotopes ($^{16}O$, $^{17}O$ and $^{18}O$), and the relative abundance of $^{16}O$ is 99.759%, the relative abundance of $^{17}O$ is 0.037%, and the relative abundance of $^{18}O$ is 0.204%.

Consequently, there are six types of oxygen molecules, $^{16}O^{16}O$, $^{16}O^{17}O$, $^{16}O^{18}O$, $^{17}O^{17}O$, $^{17}O^{18}O$, and $^{18}O^{18}O$. However, since the relative abundances of $^{17}O$ and $^{18}O$ are small, as shown in Table 3, the relative abundances of the molecules of $^{17}O^{17}O$, $^{17}O^{18}O$, and $^{18}O^{18}O$ are extremely small.

TABLE 3

| Mass Number | Oxygen Molecule | Relative Abundance |
|---|---|---|
| 32 | $^{16}O^{16}O$ | 0.99519 |
| 33 | $^{16}O^{17}O$ | 0.00074 |
| 34 | $^{16}O^{18}O$ | 0.00407 |
| 34 | $^{17}O^{17}O$ | $1.37 \times 10^{-7}$ |
| 35 | $^{17}O^{18}O$ | $1.51 \times 10^{-6}$ |
| 36 | $^{18}O^{18}O$ | $4.16 \times 10^{-6}$ |

For this reason, in this simulation, the presence of $^{17}O^{17}O$, $^{17}O^{18}O$, and $^{18}O^{18}O$ whose relative abundance is small is ignored, and the oxygen starting material is taken to comprise three types of components ($^{16}O^{16}O$, $^{16}O^{17}O$, and $^{16}O^{18}O$).

Table 4 shows the results of a study in which other data was varied for a situation in which the specific surface area of the packing was fixed (500 m²/m³), the concentration of the oxygen isotopes in the product were at generally fixed levels, and the operating pressure was varied.

Table 5 shows a comparison for variation of other data for a situation in which the column diameter and the packing height (total height of the column) were fixed, and the specific surface area of the packing was varied.

TABLE 4

| | Case 1 | Case 2 | Case 3 | Case 4 | Case 5 |
|---|---|---|---|---|---|
| Specific surface area of the packing (m²/m³) | 500 | 500 | 500 | 500 | 500 |
| Internal diameter of the distillation column (m) | 1.970 | 1.780 | 1.635 | 1.555 | 1.525 |
| Packing height at top of column (m) | 62 | 70 | 80 | 75 | 82 |
| Packing height at bottom of column (m) | 194 | 231 | 280 | 327 | 363 |
| Total height of column (m) | 256 | 301 | 360 | 402 | 445 |
| Heat exchange amount of reboiler/condenser (kW) | 1900 | 1900 | 1900 | 1900 | 1900 |
| Pressure (bar) | 0.6–1.0 | 1.1–1.7 | 2.0–2.9 | 3.0–4.2 | 4.0–5.6 |
| Superficial F Factor (m/s (kg/m³)$^{1/2}$ | 1.4–1.7 | 1.4–1.6 | 1.3–1.5 | 1.3–1.4 | 1.2–1.3 |
| Feed 101 | | | | | |
| Pressure (bar) | 0.7 | 1.2 | 2.2 | 3.2 | 4.2 |
| Flow rate (mol/s) | 1.00 | 1.00 | 1.00 | 1.00 | 1.00 |

TABLE 4-continued

|  | Case 1 | Case 2 | Case 3 | Case 4 | Case 5 |
| --- | --- | --- | --- | --- | --- |
| Concentration of $^{16}O^{17}O$ (-) | $7.38 \times 10^{-4}$ | $7.38 \times 10^{-4}$ | $7.38 \times 10^{-4}$ | $7.38 \times 10^{-4}$ | $7.38 \times 10^{-4}$ |
| Concentration of $^{16}O^{18}O$ (-) | $4.07 \times 10^{-3}$ | $4.07 \times 10^{-3}$ | $4.07 \times 10^{-3}$ | $4.07 \times 10^{-3}$ | $4.07 \times 10^{-3}$ |
| Product vapor 102 | | | | | |
| Pressure (bar) | 1.0 | 1.7 | 2.9 | 4.2 | 5.6 |
| Flow rate (mol/s) | 0.0148 | 0.0148 | 0.0148 | 0.0148 | 0.0148 |
| Concentration of $^{16}O^{17}O$ (-) | $8.62 \times 10^{-3}$ | $8.61 \times 10^{-3}$ | $8.63 \times 10^{-3}$ | $8.59 \times 10^{-3}$ | $8.60 \times 10^{-3}$ |
| Concentration of $^{16}O^{18}O$ (-) | 0.199 | 0.194 | 0.188 | 0.179 | 0.176 |
| Reboiler vapor 103 | | | | | |
| Pressure (bar) | 1.0 | 1.7 | 2.9 | 4.2 | 5.6 |
| Flow rate (mol/s) | 278 | 286 | 296 | 305 | 313 |
| Concentration of $^{16}O^{17}O$ (-) | $8.62 \times 10^{-3}$ | $8.61 \times 10^{-3}$ | $8.63 \times 10^{-3}$ | $8.59 \times 10^{-3}$ | $8.60 \times 10^{-3}$ |
| Concentration of $^{16}O^{18}O$ (-) | 0.199 | 0.194 | 0.188 | 0.179 | 0.176 |
| Reflux liquid 104 | | | | | |
| Pressure (bar) | 0.6 | 1.1 | 2.0 | 3.0 | 4.0 |
| Flow rate (mol/s) | 273 | 280 | 288 | 296 | 303 |
| Concentration of $^{16}O^{17}O$ (-) | $6.20 \times 10^{-4}$ | $6.20 \times 10^{-4}$ | $6.20 \times 10^{-4}$ | $6.21 \times 10^{-4}$ | $6.20 \times 10^{-4}$ |
| Concentration of $^{16}O^{18}O$ (-) | $1.15 \times 10^{-3}$ | $1.22 \times 10^{-3}$ | $1.30 \times 10^{-3}$ | $1.45 \times 10^{-3}$ | $1.50 \times 10^{-3}$ |
| Exhaust vapor 105 | | | | | |
| Pressure (bar) | 0.6 | 1.1 | 2.0 | 3.0 | 4.0 |
| Flow rate (mol/s) | 0.985 | 0.985 | 0.985 | 0.985 | 0.985 |
| Concentration of $^{16}O^{17}O$ (-) | $6.20 \times 10^{-4}$ | $6.20 \times 10^{-4}$ | $6.20 \times 10^{-4}$ | $6.21 \times 10^{-4}$ | $6.20 \times 10^{-4}$ |
| Concentration of $^{16}O^{18}O$ (-) | $1.15 \times 10^{-3}$ | $1.22 \times 10^{-3}$ | $1.30 \times 10^{-3}$ | $1.45 \times 10^{-3}$ | $1.50 \times 10^{-3}$ |

(The total height of the column does not include the height of the liquid collector or the liquid distributor.)

TABLE 5

|  | Case 2 | Case 6 | Case 7 |
| --- | --- | --- | --- |
| Specific surface area of the packing (m²/m³) | 500 | 750 | 900 |
| Internal diameter of the distillation column (m) | 1.780 | 1.780 | 1.780 |
| Packing height at top of column (m) | 70 | 60 | 55 |
| Packing height at bottom of column (m) | 231 | 241 | 246 |
| Total height of column (m) | 301 | 301 | 301 |
| Heat exchange amount of reboiler/condenser (kW) | 1900 | 1515 | 1045 |
| Pressure (bar) | 1.1–1.7 | 1.1–1.7 | 1.1–1.5 |
| Superficial F Factor (m/s (kg/m³)^{1/2}) | 1.4–1.6 | 1.1–1.3 | 0.8–0.9 |
| Feed 101 | | | |
| Pressure (bar) | 1.2 | 1.2 | 1.2 |
| Flow rate (mol/s) | 1.00 | 1.00 | 1.00 |
| Concentration of $^{16}O^{17}O$ (-) | $7.38 \times 10^{-4}$ | $7.38 \times 10^{-4}$ | $7.38 \times 10^{-4}$ |
| Concentration of $^{16}O^{18}O$ (-) | $4.07 \times 10^{-3}$ | $4.07 \times 10^{-3}$ | $4.07 \times 10^{-3}$ |
| Product vapor 102 | | | |
| Pressure (bar) | 1.7 | 1.7 | 1.5 |
| Flow rate (mol/s) | 0.0148 | 0.0148 | 0.0148 |
| Concentration of $^{16}O^{17}O$ (-) | $8.61 \times 10^{-3}$ | $1.13 \times 10^{-2}$ | $1.09 \times 10^{-2}$ |
| Concentration of $^{16}O^{18}O$ (-) | 0.194 | 0.201 | 0.174 |
| Reboiler vapor 103 | | | |
| Pressure (bar) | 1.7 | 1.7 | 1.5 |
| Flow rate (mol/s) | 286 | 228 | 156 |
| Concentration of $^{16}O^{17}O$ (-) | $8.61 \times 10^{-3}$ | $1.13 \times 10^{-2}$ | $1.09 \times 10^{-2}$ |
| Concentration of $^{16}O^{18}O$ (-) | 0.194 | 0.201 | 0.174 |
| Reflux liquid 104 | | | |
| Pressure (bar) | 1.1 | 1.1 | 1.1 |
| Flow rate (mol/s) | 280 | 223 | 154 |
| Concentration of $^{16}O^{17}O$ (-) | $6.20 \times 10^{-4}$ | $5.80 \times 10^{-4}$ | $5.86 \times 10^{-4}$ |
| Concentration of $^{16}O^{18}O$ (-) | $1.22 \times 10^{-3}$ | $1.12 \times 10^{-3}$ | $1.52 \times 10^{-3}$ |
| Exhaust vapor 105 | | | |
| Pressure (bar) | 1.1 | 1.1 | 1.1 |
| Flow rate (mol/s) | 0.985 | 0.985 | 0.985 |
| Concentration of $^{16}O^{17}O$ (-) | $6.20 \times 10^{-4}$ | $5.80 \times 10^{-4}$ | $5.86 \times 10^{-4}$ |
| Concentration of $^{16}O^{18}O$ (-) | $1.22 \times 10^{-3}$ | $1.12 \times 10^{-3}$ | $1.52 \times 10^{-3}$ |

(The total height of the column does not include the height of the liquid collector or the liquid distributor.)

FIG. 7 shows the relationship between the pressure within the column, the column diameter, and the height of the packing within the column for Cases 1 to 5 obtained by means of the above-mentioned simulation.

From FIG. 7, it can be understood that when the specific surface area of the packing is a fixed condition, it is possible to reduce the volume of the column by means of increasing the pressure within the column.

However, when the enrichment rate of $^{16}O^{17}O$ is generally fixed, there is a tendency for the pressure to be increased and for the height of the packing to be increased, and above 3 to 4 bars, the effect of reducing the volume of the column is reduced.

In addition, from Table 5, in a comparison of situations in which the specific surface area of the packing is 500, 750, and 900 $m^2/m^3$, it is clear that from the point of view of the enrichment efficiency that a specific surface area for the packing of 750 $m^2/m^3$ is advantageous.

On the other hand, by means-of reducing the pressure within the distillation column, while the diameter of the column is increased, at the same time, the relative volatility of $^{16}O^{17}O$ with respect to $^{16}O^{16}O$, and the relative volatility of $^{16}O^{18}O$ with respect to $^{16}O^{16}O$ increases and thereby it is possible to increase enrichment efficiency for $^{16}O^{17}O$, and $^{16}O^{18}O$.

Figure 8:
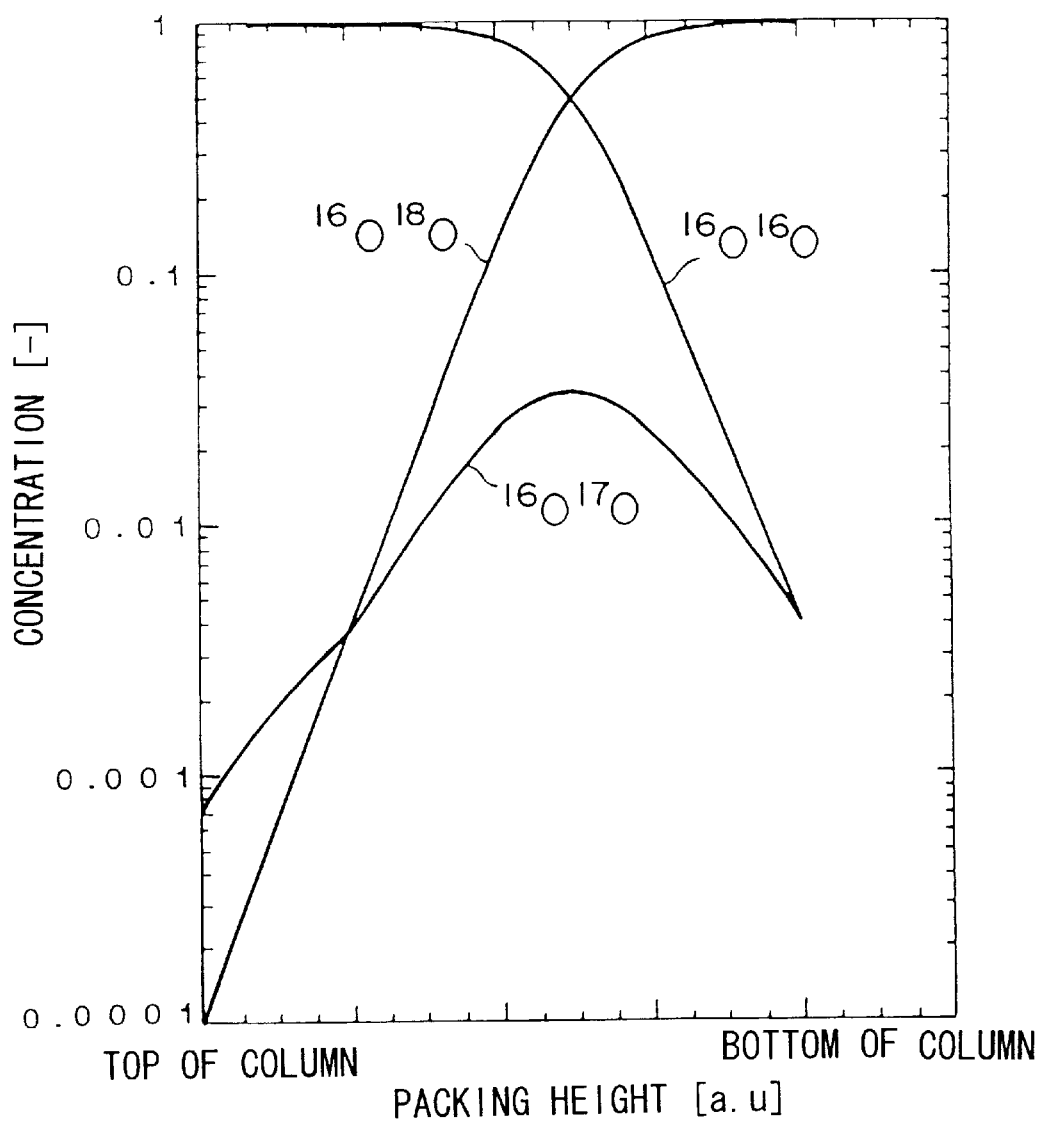
FIG. 8 is a graph showing the simulated results for a distillation operation as an example of when the enrichment apparatus shown in FIG. 1 is used.

FIG. 8 shows the concentration distribution for the three above-mentioned components ($^{16}O^{16}O$, $^{16}O^{17}O$, and $^{16}O^{18}O$) within the distillation column 11 obtained by means of the above-mentioned simulation.

From this figure, among these components, the concentration of $^{16}O^{18}O$ gradually increases from the top of the distillation column 11 to the bottom of the distillation column 11.

In contrast to this, among these components, from the top to the bottom of the distillation column 11, the concentration of $^{16}O^{17}O$ increases once to a peak and thereafter it decreases gradually as it approaches the bottom of the distillation column 11.

In this way, when attempting to carryout enrichment of $^{16}O^{17}O$ using one distillation column, it is clear that there is a fixed limit to the possible enrichment concentration of $^{16}O^{17}O$.

For this reason, it is considered that for increasing the concentration of $^{16}O^{17}O$ to 10% or greater, for example, a method in which a plurality of distillation columns are used, in which enrichment of $^{16}O^{17}O$ is carried out in the first distillation column, and the obtained enriched material is further enriched in the second and subsequent distillation columns, is effective.

Figure 9:
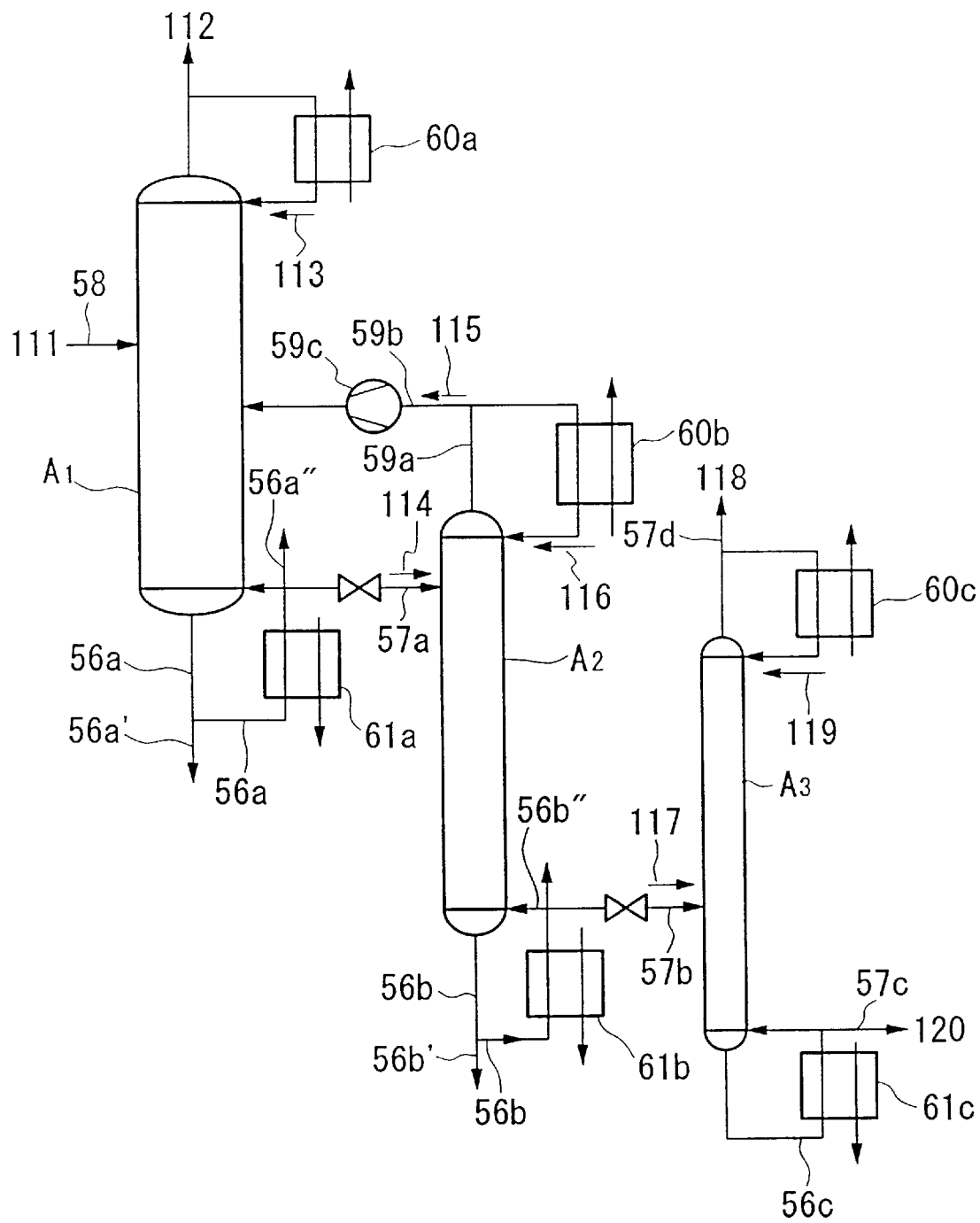
FIG. 9 is a diagram showing a structural outline of another embodiment of the apparatus for the enrichment of heavy oxygen isotopes of the present invention.

FIG. 9 shows a suitable enrichment apparatus for enriching $^{16}O^{17}O$ and $^{16}O^{18}O$, and in particular $^{16}O^{17}O$, to high concentrations. The enrichment apparatus shown here is equipped with 3 distillation columns (A1~A3).

The bottom of the first column A1 and the center section (an intermediate position between the top of the column and the bottom of the column) of the second column A2 are connected by conduit pipes 56a and 57a, and the bottom of the second column A2 and the center section of the third column A3 are connected by conduit pipes 56b and 57b. In addition, a conduit pipe 56c is connected to the bottom of the third column A3, and column bottom liquid from the third column A3 can be drawn out of the system via conduit pipes 56c and 57c.

In addition, the conduit pipe 58 which is connected to the center section of the first column A1 is a feed section for introducing oxygen starting material into the first column A1.

In addition, conduit pipes 59a and 59b are for the purpose of returning vapor output from the top of the second column A2 to the first column A1. The conduit pipe 59b is connected to a position located between the connection position of the conduit pipe 58, which is the above-mentioned feed section, and the bottom of the column.

A blower 59c is provided in the conduit pipe 59, such that the output vapor from the second column A2 can be pressurized and sent to the first column A1.

Condensers 60a, 60b and 60c are provided in the vicinities of the tops of the first to third columns A1 to A3 respectively, and reboilers 61a, 61b, and 61c are provided in the vicinities of the bottoms of the first to third columns A1 to A3 respectively.

When using the above-mentioned enrichment apparatus, firstly oxygen starting material vapor (111) is introduced into the first column A1 via conduit pipe 58, which is the feed section, distillation is conducted within the first column A1, the column bottom liquid in which the concentration of heavy isotopes has been increased is vaporized at the reboiler 61a and a part thereof is introduced into the center section of the second column A2 via conduit pipe 57a.

This column bottom liquid can be extracted from conduit pipe 56a' or 56a" as a product.

The vapor introduced into the second column A2 is distilled within the second column A2, the column bottom liquid in which the concentration of heavy isotopes has been further increased is passed through reboiler 61b and conduit pipe 57b and introduced into the third column A3, where additional distillation is carried out, and thereby a column bottom liquid in which the concentration of heavy isotopes is even further increased is obtained.

This column bottom liquid can be extracted from conduit pipe 56b' or 56b" as a product.

In this situation, it is preferable to suitably set the various conditions such as the internal column pressure, the column height, the column diameter, and the type of packing, in such as way that within the second column A2 (which is the distillation column before final stage distillation column A3), a concentration peak of $^{16}O^{17}O$ is formed in the center section of column, and a mixture of oxygen isotopes comprising $^{16}O^{17}O$ at a concentration of 1% or greater, $^{16}O^{18}O$ at a concentration of 90% or greater, with main part of the remainder being $^{16}O^{16}O$, is separated at the bottom of the distillation column.

In addition, in this case, vapor in the vicinity of the top of the second column A2 passes through conduit pipes 59a and 59b, and is pressurized using blower 59c, thereafter, and the recovery rate can be increased by introducing it into the first column A1. In other words, it is possible to improve the efficiency of the isotope enrichment within the first column A1.

Next, the column bottom liquid of the third column A3 passes through the reboiler 61c and the conduit pipe 57c and is output from the system as product vapor (120). In the above-mentioned distillation process, the concentration of $^{16}O^{18}O$ within the product vapor (120) can be increased to 90% or greater by means of suitably setting the above-mentioned various conditions.

The vapor from the top of the third column A3 is passed through the conduit pipe 57d and is output from the system as finished product vapor (118). In the above-mentioned distillation process, the concentration of $^{16}O^{17}O$ within the finished product vapor (118) can be increased to 10% or greater by means of suitably setting the above-mentioned various conditions.

In the Figures, the reference numerals 111~120 respectively indicate the oxygen starting material vapor (111) which is introduced into the first column A1 via conduit pipe 58; the vapor (112) output from the top of the first column A1; the condensed liquid (113) which is formed by liquefying the vapor output from the top of the first column A1 by means of condenser 60a; the vapor (114) which is introduced into the second column A2 after passing through the reboiler 61a and the conduit pipe 57a; vapor (115) which is output from the top of the second column A2, passes through conduit pipe 59b, and is returned to the first column A1; the liquid (116) which is output from the second column A2, liquefied in the condenser 60b, and then returned to the second column A2 again; the vapor (117) which passes through the reboiler 61b, and the conduit pipe 57b, and is introduced into the third column A3; the vapor (118) which is output from the top of the third column A3; the liquid (119) which is drawn of from the top of the third column A3 liquefied in the condenser 60c and then returned again to the third column A3; and the vapor (120) which is output from the third column A3 through the reboiler 61c and the conduit pipe 57c.

In this way, by means of constructing the distillation column from three distillation columns, i.e. the first to third columns A1 to A3, it is possible to further enrich the oxygen isotopes enriched in the first column A1 in the second column A2 and the third column A3.

Consequently, when compared to a situation in which one distillation column is used, it is possible to obtain an enriched product having a higher isotope enrichment rate, and more specifically, an enriched product (finished product vapor 118) having a concentration of $^{16}O^{17}O$ of, for example, 10% or greater; and an enriched product (finished product vapor 120) having a concentration of $^{16}O^{18}O$ of, for example, 90% or greater.

In addition, when $^{16}O^{18}O$ is extracted as the finished product, it is possible to extract the finished product from the bottom of the first column A1 and the second column A2.

In addition, since the relative volatility of $^{16}O^{17}O$ with respect to $^{16}O^{16}O$ is smaller than the relative volatility of $^{16}O^{18}O$ with respect to $^{16}O^{16}O$, enrichment of $^{16}O^{17}O$ is more difficult than enrichment of $^{16}O^{18}O$, but it is possible to sufficiently increase the enrichment rate for $^{16}O^{17}O$ by means of conducting a multi-stage distillation using first to third columns A1 to A3.

In addition, in the above-mentioned apparatus, there are three distillation columns. However, the present invention is not limited to this. It is possible to have a plurality (n) of distillation columns ($A_1 \sim A_n$), wherein the bottom portion of the column $A_k$ (k: a natural number of (n−1) or less) is connected to the center section of the column $A_{k+1}$ by means of a conduit pipe which directs the column bottom liquid of column Ak into the column Ak+1. The number of distillation columns may be, for example, from 2 to 100.

In addition, under the conditions shown in Table 4 and Table 5, the packing height of a single distillation column is considerably high at several hundred meters, therefore, when actually designing the apparatus, the apparatus can be made compact by dividing the distillation column into a plurality of columns having a packing height of from several tens to one hundred meters, and then connecting these columns in a series.

Figure 10:
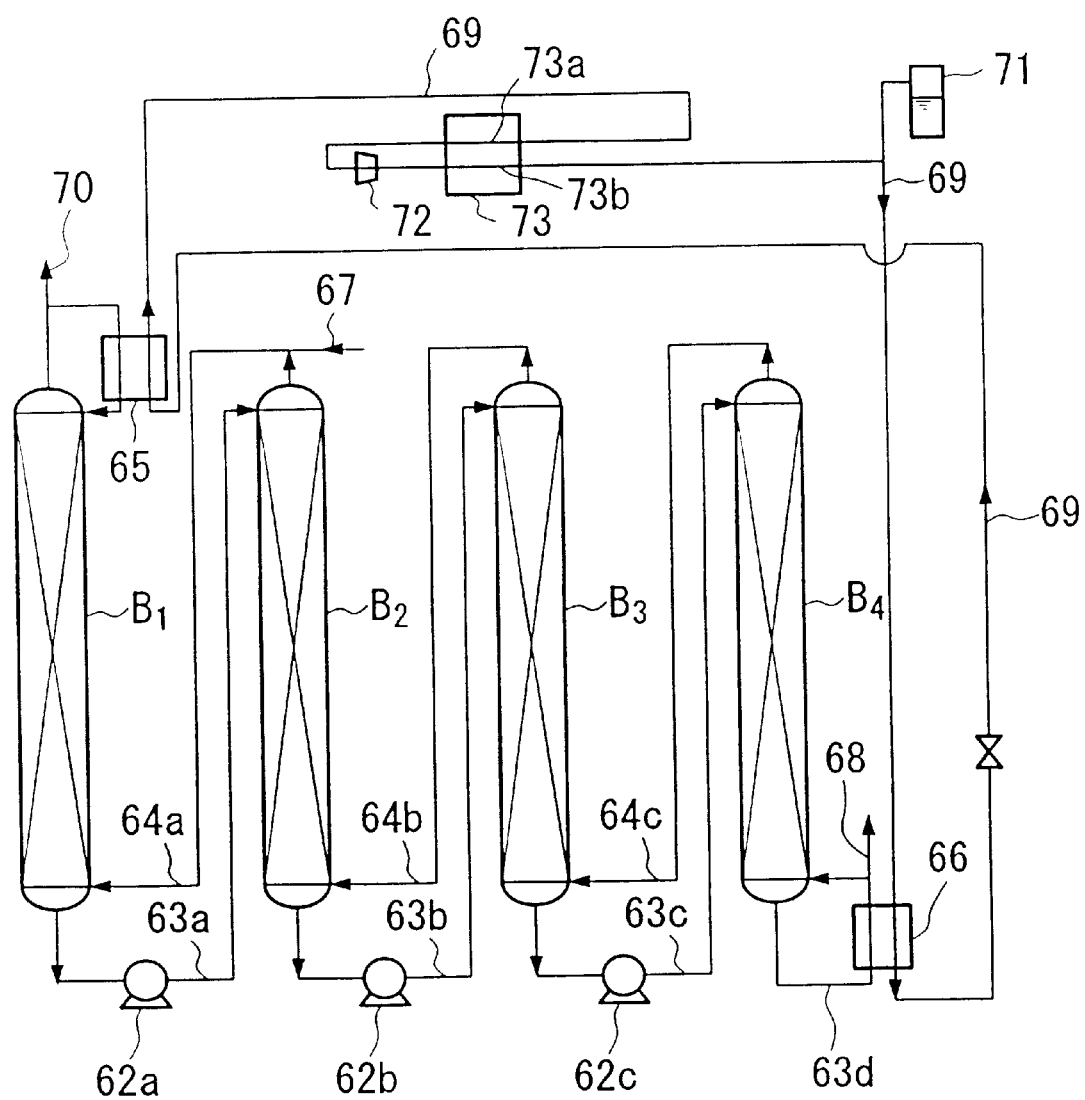
FIG. 10 is a diagram showing a structural outline of an example of a distillation column which can be used in the apparatus for the enrichment of heavy oxygen isotopes of the present invention.

FIG. 10 shows an example of the enrichment apparatus in a situation in which the above-mentioned distillation column has been divided.

The apparatus shown in FIG. 10 comprises four distillation columns (i.e., the first column $B_1$~fourth column $B_4$), wherein the bottom portion of the column $B_k$ (k: a natural number of 3 or less) is connected in series to the top of the column $B_{k+1}$ by means of the conduit pipes 63a~63c, via liquid feeding means 62a~62c such as a feeding pump for feeding the liquid output from the column $B_k$ to the column $B_{k+1}$; and the lower portion of $B_k$ is connected to the top of the column $B_{k+1}$ by means of the conduit pipes 64a~64c for directing the vapor output from the column $B_{k+1}$ to the column $B_k$. In addition, a condenser 65 is provided in the vicinity of the top of the first column $B_1$, and a reboiler 66 is provided in the vicinity of the-bottom of the fourth column $B_4$.

In addition, the circulation system indicated by number 69 is designed so as to circulate a medium for heat exchange (for example, nitrogen gas) output from the storage tank 71 for the medium for heat exchange through a reboiler 66, a condenser 65, a first conduit 73a of a heat exchanger 73, a blower 72 (a circulatory means), and a second conduit 73b of the heat exchanger 73.

The above-mentioned first conduit 73a corresponds to the system on the inlet side of the blower 72, and the second conduit 73b corresponds to the system on the outlet side of the blower 72.

As the blower 72, it is possible to use a normal temperature compressor or a low-temperature compressor. When using a low-temperature compressor as the blower 72, the heat exchanger. 73 is not necessary.

When using the aforementioned apparatus, a starting material vapor is introduced via the feed section, conduit pipes 67 and 64a, into the first column $B_1$ where distillation takes place. Subsequently, a portion of the vapor separated at the top of the column is extracted while the remaining portion is liquefied in the condenser 65, and returned to the first column $B_1$. In addition, the column bottom liquid is introduced into the second column $B_2$ via the conduit pipe 63a.

Subsequently, the column head vapor obtained from the top of the second column $B_2$ is returned to the first column $B_1$ via the conduit pipe 64a, while the column bottom liquid in the second column $B_2$ is introduced into the third column $B_3$ via the conduit pipe 63b.

Subsequently, the column head vapor obtained in the third column $B_3$ is then returned to the second column $B_2$ via the conduit pipe 64b, while the column bottom liquid in the third column $B_3$ is introduced into the fourth column $B_4$ via the conduit pipe 63c.

Subsequently, the column head vapor obtained in the fourth column $B_4$ is returned to the third column $B_3$ via the conduit pipe 64c, while the column bottom liquid in the fourth column $B_4$ passes through the conduit pipe 63d, is vaporized by passing through the reboiler 66, and then output from the system through conduit pipe 68.

In the aforementioned apparatus, the conduit pipe 67, which is the feeding member of the starting material vapor, is connected to another conduit pipe 64a. However, the present invention is not limited to this, and the conduit pipe which is the feeding member may be connected to conduit pipes 64b or 64c depending on conditions such as the concentration of isotopes in the starting material vapor, and the like. Alternatively, it could be connected to the center section of each column.

In addition, it is possible to operate the aforementioned apparatus with the pressure in each column reduced, by means of inserting a blower into the extraction path 70 for column head vapor of the first column $B_1$, or alternatively in conduit pipes 64a, 64b, and 64c for returning the vapor. In addition, a reduced pressure operation (vacuum operation) is also possible.

Thereby, the relative volatility of each component can be increased, leading to an improved yield. In addition, the efficiency of isotope separation is increased, and thus it is possible to decrease the column height.

By means of using a plurality of distillation columns as described in the aforementioned, it is possible to decrease the column height and to construct an overall compact apparatus, which in turn makes a reduction in equipment costs possible.

The apparatus shown in FIG. 10 comprises four distillation columns. However, the present invention is not limited to this. A plurality (n) of distillation columns ($B_1$~$B_n$) may be provided, wherein the bottom of the column $B_k$ (k: a natural number of n−1 or less) may be connected to the top of the column $B_{k+1}$ by means of a conduit pipe via a means for feeding the liquid output from the column $B_k$ to the column $B_{k+1}$; and the lower part of the column $B_k$ may be connected to the top of the column $B_{k+1}$ by means of a conduit pipe for directing the vapor output from the column $B_{k+1}$ the column $B_k$. The number of distillation columns may be, for example, from 2 to 100.

Additionally, in the above case, a condenser is provided at the top of the column $B_1$, and a reboiler is provided at the bottom portion of the column $B_k$.

Figure 11:
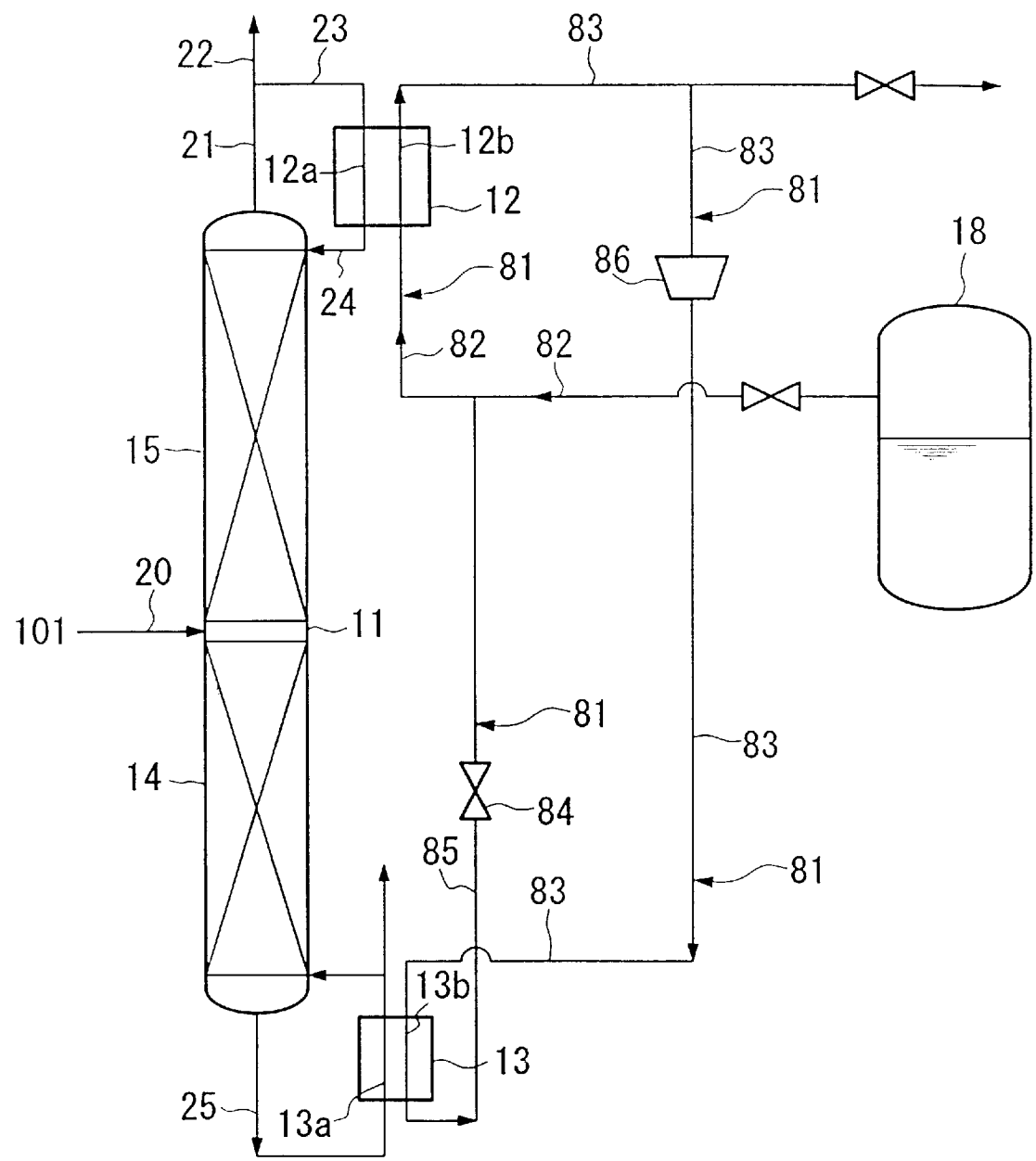
FIG. 11 is a diagram showing a structural outline of yet another embodiment of the apparatus for the enrichment of heavy oxygen isotopes of the present invention.

In addition, in the enrichment apparatus shown in the above-mentioned FIG. 1, a normal temperature is shown as an example of the blower 16, and a heat exchanger 17 is provided, however, as shown in FIG. 11, it is possible for a low-temperature compressor to be used as the blower indicated by the number 86, and in that situation, a heat exchanger 17 is not necessary.

In the enrichment apparatus shown in FIG. 11, the circulation system 81 has a conduit pipe 82 for introducing a medium for heat exchange, such as liquid nitrogen, from the storage tank 18 into a second conduit 12b of the condenser 12, and a conduit 83 for introducing the vapor or liquid within the second conduit 12b via the blower 86 into the second conduit 13b of the reboiler 13, and a conduit pipe 85 for introducing the liquid or vapor within the second conduit 13b via a valve 84 into the conduit pipe 82.

In this apparatus, the medium for heat exchange which circulates within the circulation system 81 is cooled by means of the blower 86, which is a low-temperature compressor, therefore, a heat exchanger 17 is not necessary.

Figure 12:
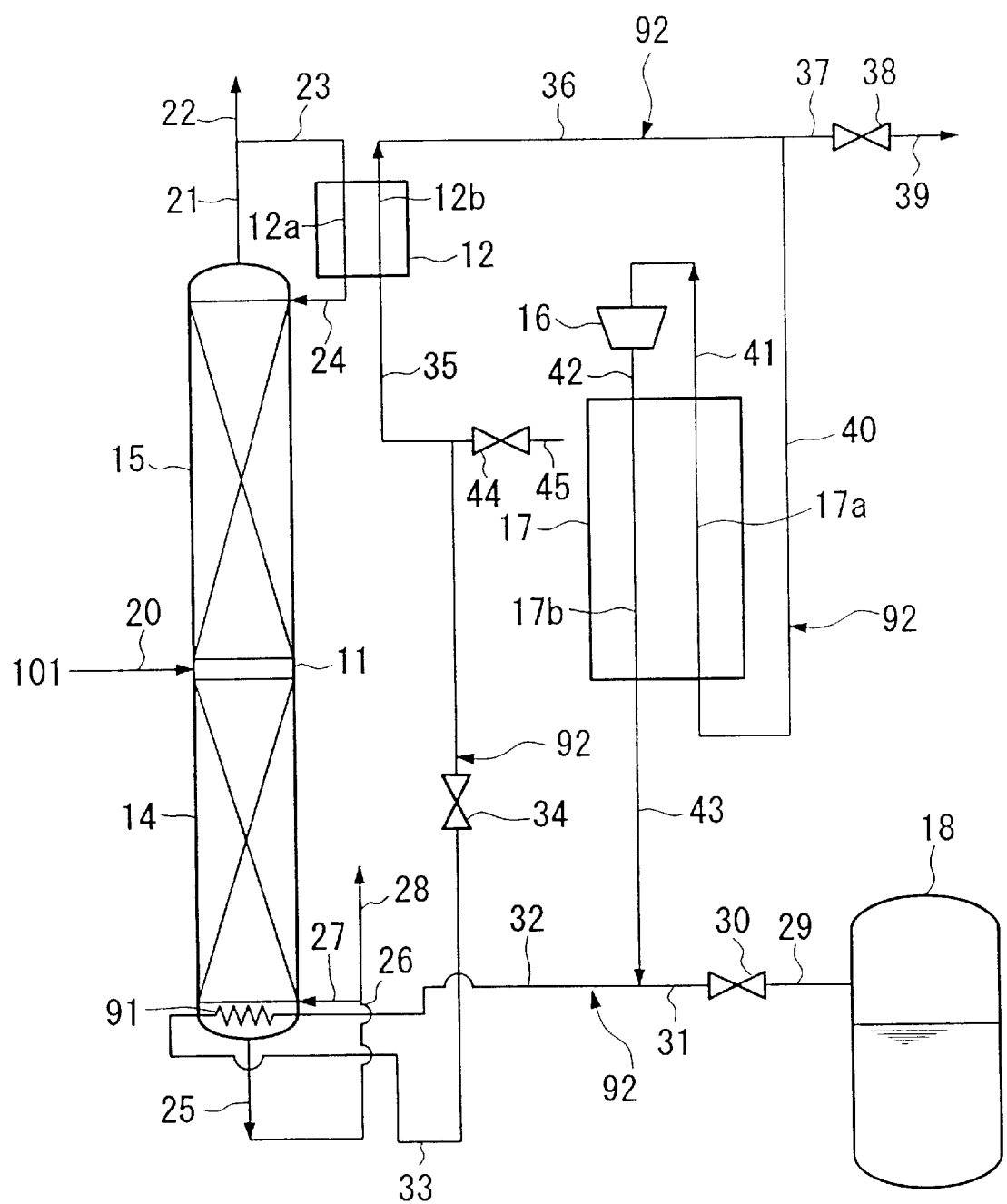
FIG. 12 is a diagram showing a structural outline of yet another embodiment of the apparatus for the enrichment of heavy oxygen isotopes of the present invention.

In addition, FIG. 12 shows an apparatus having a coil type reboiler 91, through which the medium for heat exchange passes, provided in the interior of the bottom of the distillation column 11, and this is in place of the reboiler 13 which is provided outside of the distillation column 11 in the enrichment apparatus shown in FIG. 1.

The coil reboiler 91 is such that the column bottom liquid of the distillation column 11 can be heated by means of heat exchange with the medium for heat exchange, such that a part thereof is vaporized.

In the enrichment apparatus shown in this figure as well, the circulation system 92 is able to circulate the medium for heat exchange between the coil type reboiler 91 and the second conduit 12b of the condenser 12, and this is the same as for the apparatus shown in FIG. 1.

Embodiment 1

A computer simulation was conducted for enrichment of heavy oxygen isotopes using the enrichment apparatus shown in FIG. 9. A situation in which plate fin type heat exchangers were used as the condensers 60a, 60b, and 60c and reboilers 61a, 61b and 61c was assumed.

The data for each of the columns is shown in Table 6. In addition, the data for each of the condensers and reboilers of each column are shown in Table 7.

In addition, the concentration, pressure, and flow rate for each of the components of the liquids or vapors represented by numbers 111 to 120 are shown in Table 8.

Figure 13:
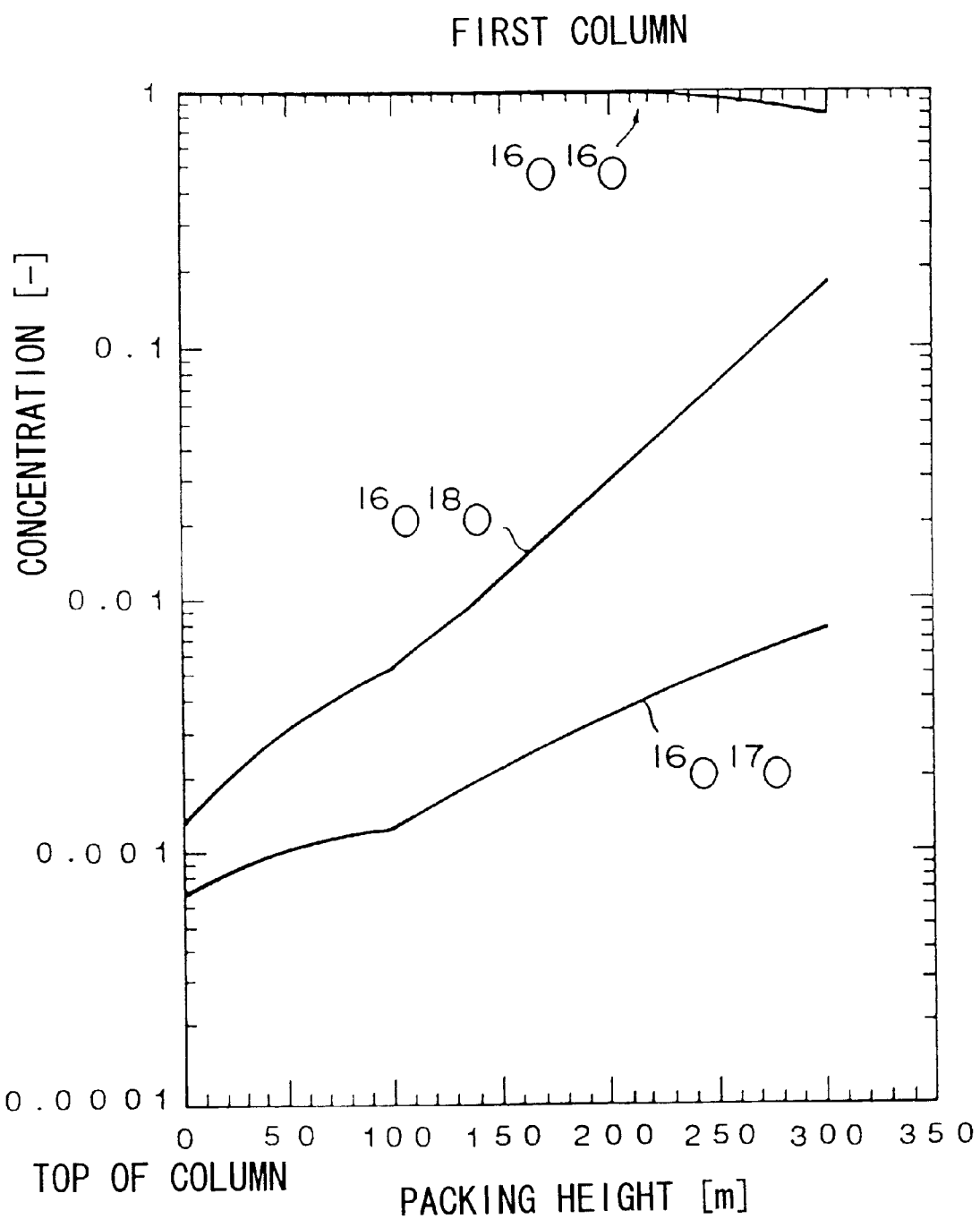
FIG. 13 is a graph showing the simulated results of the distillation operation as an example of when the enrichment apparatus shown in FIG. 9 is used, and shows the concentration distribution of each of the isotopes within the first distillation column.
Figure 14:
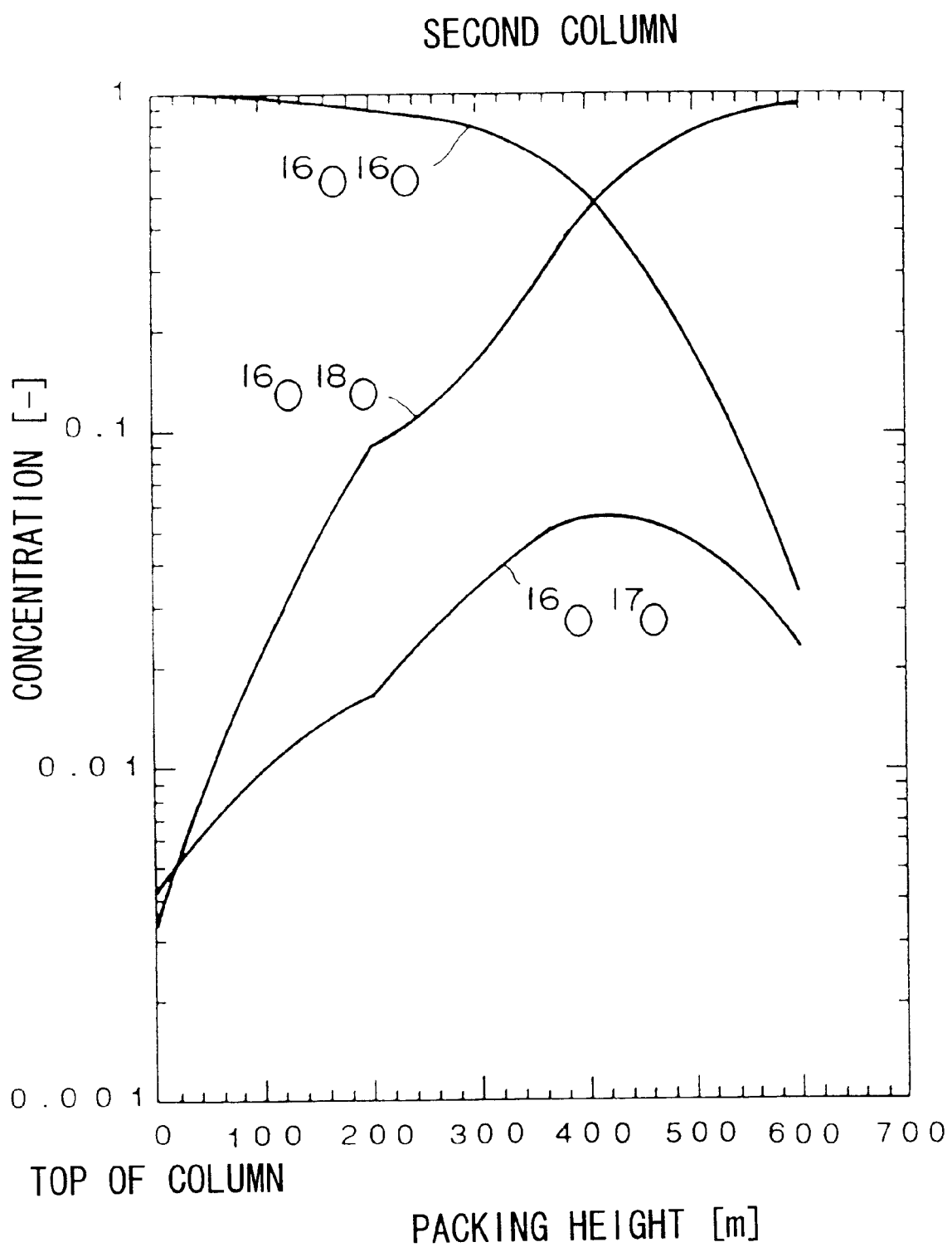
FIG. 14 is a graph showing the simulated results of the distillation operation as an example of when the enrichment apparatus shown in FIG. 9 is used, and shows the concentration distribution of each of the isotopes within the second distillation column.
Figure 15:
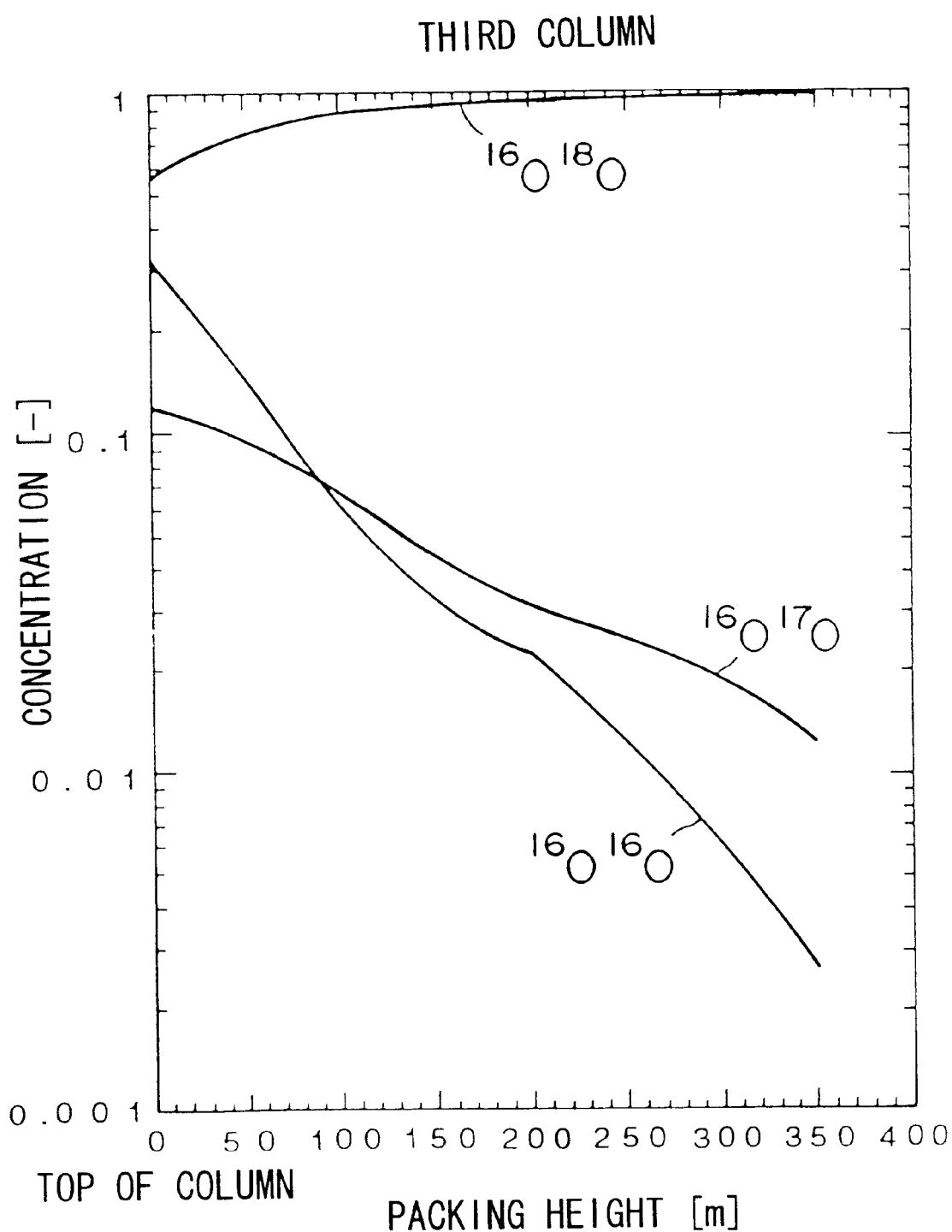
FIG. 15 is a graph showing the simulated results of the distillation operation as an example of when the enrichment apparatus shown in FIG. 9 is used, and shows the concentration distribution of each of the isotopes within the third distillation column.

In addition, FIGS. 13 to 15 show the concentration distribution for each of the above-mentioned three components ($^{16}O^{16}O$, $^{16}O^{17}O$, and $^{16}O^{18}O$) with increasing height within the first through third columns A1 to A3.

TABLE 6

Embodiment 1

|  | First distillation column | Second distillation column | Third distillation column |
|---|---|---|---|
| Specific surface area of packing ($m^2/m^3$) | 500 | 500 | 500 |
| Inner diameter of distillation column (m) | 3.00 | 0.50 | 0.20 |
| Height of Packing in the upper part of column (m) | 100 | 200 | 200 |
| Height of Packing in the lower part of column (m) | 200 | 400 | 150 |
| Height of packing (m) | 300 | 600 | 350 |
| Total height of packing (m) |  | 1250 |  |
| Heat exchange amount of reboiler/condenser (kW) | 5500 | 150 | 23 |
| Superficial F factor [m/s $(kg/m^3)^{1/2}$] | 1.7 | 1.6 | 1.6 |

TABLE 7

Embodiment 1

|  | Amount of heat exchange (kW) | First medium | | | Second medium | | |
|---|---|---|---|---|---|---|---|
|  |  | type | temperature (K) | Pressure (bar) | type | temperature (K) | pressure (bar) |
| First column condenser | 5500 | oxygen | 91.0 | 1.10 | nitrogen | 86.0 | 2.51 |
| Second column condenser | 150 | oxygen | 91.0 | 1.10 | nitrogen | 86.0 | 2.51 |
| Third column condenser | 23 | oxygen | 91.0 | 1.10 | nitrogen | 86.0 | 2.51 |
| First column reboiler | 5500 | oxygen | 95.7 | 1.73 | nitrogen | 101.2 | 8.46 |
| Second column reboiler | 150 | oxygen | 99.2 | 2.38 | nitrogen | 104.2 | 10.30 |
| Third column reboiler | 23 | oxygen | 96.2 | 1.83 | nitrogen | 101.2 | 8.46 |

TABLE 8

|  | Concentration | | | Pressure | Flow Rate |
|---|---|---|---|---|---|
| No | $^{16}O^{16}O$ (−) | $^{16}O^{17}O$ (−) | $^{16}O^{18}O$ (−) | (bar) | (mol/s) |
| 111 | $9.95 \times 10^{-1}$ | $7.38 \times 10^{-4}$ | $4.07 \times 10^{-3}$ | 1.32 | 2.86 |
| 112 | $9.98 \times 10^{-1}$ | $6.71 \times 10^{-4}$ | $1.29 \times 10^{-3}$ | 1.10 | 2.85 |
| 113 | $9.98 \times 10^{-1}$ | $6.71 \times 10^{-4}$ | $1.29 \times 10^{-3}$ | 1.10 | $8.09 \times 10^{-2}$ |

TABLE 8-continued

| No | Concentration $^{16}O^{16}O$ (-) | $^{16}O^{17}O$ (-) | $^{16}O^{18}O$ (-) | Pressure (bar) | Flow Rate (mol/s) |
|---|---|---|---|---|---|
| 114 | $8.01 \times 10^{-1}$ | $7.99 \times 10^{-3}$ | $1.91 \times 10^{-1}$ | 1.51 | $4.22 \times 10^{-2}$ |
| 115 | $9.92 \times 10^{-1}$ | $4.14 \times 10^{-3}$ | $3.48 \times 10^{-3}$ | 1.10 | $3.38 \times 10^{-2}$ |
| 116 | $9.92 \times 10^{-1}$ | $4.14 \times 10^{-3}$ | $3.48 \times 10^{-3}$ | 1.10 | $2.22 \times 10$ |
| 117 | $3.48 \times 10^{-2}$ | $2.34 \times 10^{-2}$ | $9.42 \times 10^{-1}$ | 1.52 | $8.44 \times 10^{-3}$ |
| 118 | $3.24 \times 10^{-1}$ | $1.21 \times 10^{-1}$ | $5.56 \times 10^{-1}$ | 1.10 | $8.44 \times 10^{-4}$ |
| 119 | $3.24 \times 10^{-1}$ | $1.21 \times 10^{-1}$ | $5.56 \times 10^{-1}$ | 1.10 | 3.38 |
| 120 | $2.69 \times 10^{-3}$ | $1.26 \times 10^{-2}$ | $9.85 \times 10^{-1}$ | 1.83 | $7.60 \times 10^{-3}$ |

As shown in FIG. 13 through FIG. 15, in the above-mentioned simulation, the obtained results are a concentration of $^{16}O^{18}O$ of 19.1% and a concentration of the $^{16}O^{17}O$ of 0.799% in the column bottom liquid of the first column A1.

When a part of this column bottom liquid is supplied to the center section of the second first A1 and distillation conducted, the obtained results are a concentration of $^{16}O^{18}O$ of 94.2% and a concentration of the $^{16}O^{17}O$ of 2.34% in the column bottom liquid of the second column A2.

Subsequently, when this column bottom liquid is supplied to the center section of the third column A3 and distillation conducted, the results are that a liquid containing $^{16}O^{18}O$ at a high concentration of 98.5% is obtained from the bottom of the third column A3, and a vapor containing $^{16}O^{17}O$ at a high concentration of 12.1% is obtained at the top of the third column A3.

From the results of the above-mentioned simulation, it is clear that by means of the above-mentioned apparatus it is possible to produce 0.000844 mol/s (a yearly production rate of 0.88 tons) of $^{16}O^{17}O$ at a concentration of 12.1%, and 0.00760 mol/s (a yearly production rate of 8.1 tons) of $^{16}O^{18}O$ at a concentration of 98.5% with respect to a 2.86 mol/s feed rate.

As explained above, the method for enrichment of the heavy oxygen isotopes of the present invention is enrichment of $^{16}O^{17}O$ and $^{16}O^{18}O$ by means of cryogenic distillation of an oxygen starting material using a distillation column packed with structured packing, and therefore it is possible to obtain the effects indicated below.

(1) In contrast to water distillation and NO distillation, since oxygen which does not contain other elements is used as the starting material, it is possible to obtain an enriched product with a high concentration of heavy oxygen isotopes, which does not contain compounds of heavy isotopes of other elements with $^{16}O$.

(2) Since the latent heat of vaporization of oxygen (the starting material) is low (the latent heat of vaporization of oxygen is approximately ⅙ of that of water), it is possible to reduce the size of distillation column and the heat exchangers (reboiler, condensers, and the like) compared with those for water distillation methods, and thus it is possible to reduce operation costs and apparatus costs.

(3) The oxygen starting material is not a corrosive or toxic gas, and hence is advantageous with regard to ease of handling and safety when compared with NO-distillation methods in which NO, which is a corrosive and toxic gas, is used as the starting material.

(4) By means of the use of a distillation column in which structured packing is used, it is possible to reduce liquid hold-up and to shorten the time required to start up the apparatus. Furthermore, it is possible to reduce the operating costs associated therewith.

(5) By means of using structured packing, it is possible to increase the efficiency of vapor-liquid contact within the distillation column, and thereby to increase the efficiency of the heavy isotope enrichment.

(6) By means of the use of structured packing for which the pressure loss is low, it is possible for the pressure within the column to be set at a lower level. For this reason, it is possible to conduct the distillation under conditions in which the relative volatility of each of the components is comparatively large, and thereby it is possible to increase the enrichment efficiency for oxygen molecules ($^{16}O^{17}O$ and $^{16}O^{18}O$) which contain heavy isotopes.

(7) By means of using, as the structured packing, promoting-fluid-dispersion type structured packing with which the vapor-liquid contact occurs while mixing of the liquid and/or the vapor in a direction at right angles to the main flow direction within the distillation column is promoted, it is possible to increase the efficiency of vapor-liquid contact and to further improve the efficiency of the enrichment of the heavy oxygen isotopes.

(8) By means of the provision of a condenser and a reboiler in the distillation column, and by using and circulating a medium for heat exchange between the condenser and the reboiler, it is possible to make use of the coolness of the medium for heat exchange without waste, to suppress energy loss to a minimum and thereby to reduce operating costs.

(9) By means of a plurality of distillation columns, it is possible to further enrich oxygen isotopes enriched in one column in the other columns. Consequently, compared with a situation in which only one distillation column is used, it is possible to sufficiently increase the enrichment rate of $^{16}O^{17}O$ in particular.

In addition, by means of dividing a single distillation column into a plurality of columns and then connecting them in series, it is possible to make the apparatus as a whole compact.

Figure 16:
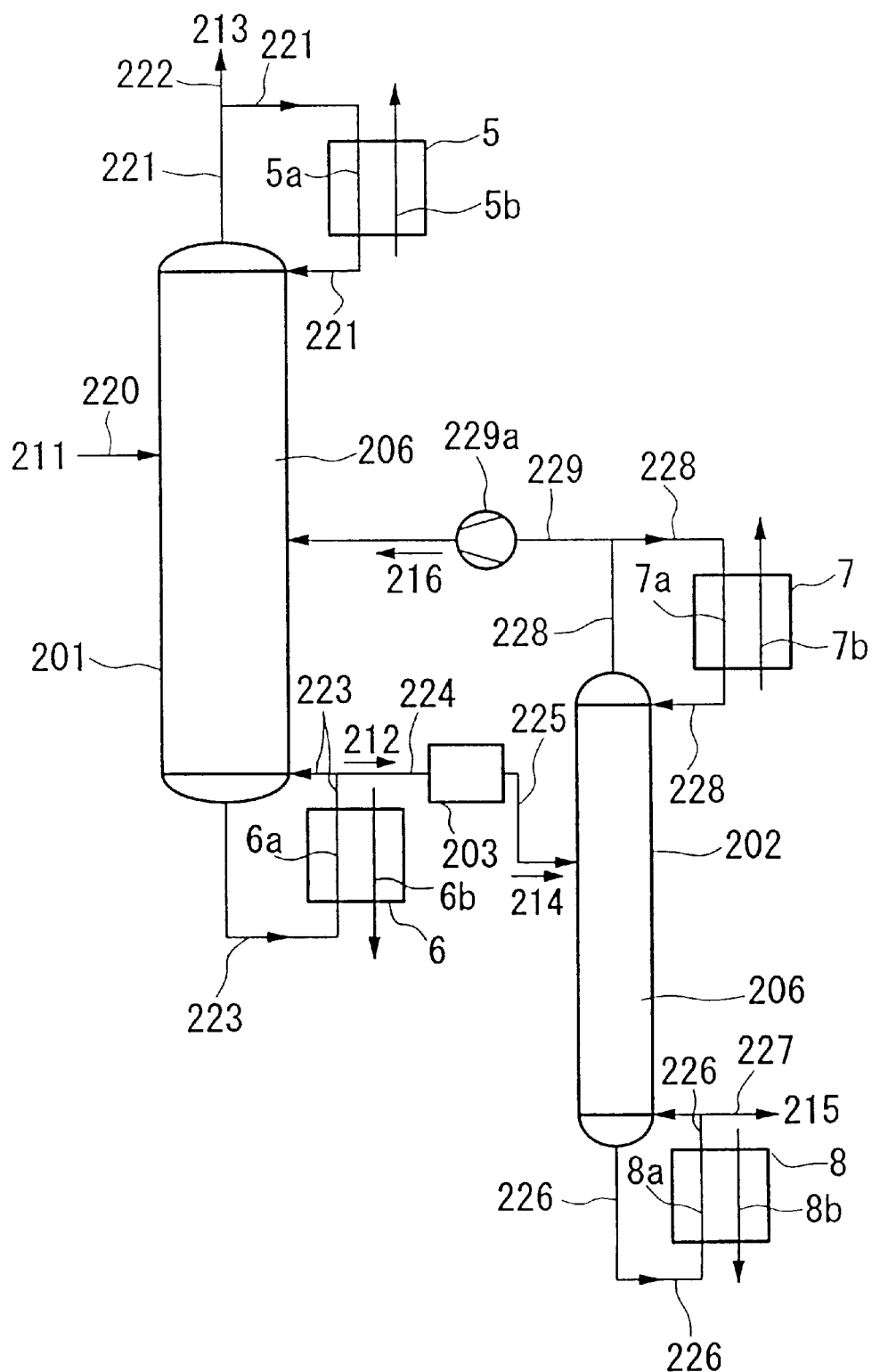
FIG. 16 is a diagram showing a structural outline of yet another embodiment of the apparatus for the enrichment of heavy oxygen isotopes of the present invention.

FIG. 16 shows another embodiment of the apparatus for enrichment of the heavy oxygen isotopes of the present invention. The apparatus shown here comprises a first distillation column 201 for enriching an oxygen starting material in oxygen molecules which contain heavy oxygen isotopes ($^{16}O^{17}O$, $^{16}O^{18}O$, $^{17}O^{17}O$, $^{17}O^{18}O$ and $^{18}O^{18}O$) by means of cryogenic distillation of an oxygen starting material containing heavy oxygen isotopes; an isotope exchanger 203 which is an isotope scrambler for increasing by means of isotope scrambling the concentration of oxygen molecules which only contain heavy isotopes ($^{17}O^{17}O$, $^{17}O^{18}O$ and $^{18}O^{18}O$) within the enriched material obtained from the distillation column 201, and a second distillation column 202 for further enrichment of the oxygen molecules which contain heavy oxygen isotopes by means of cryogenic distillation of the enriched material in which the concentration of heavy isotope molecules of oxygen has been increased by means of the above-mentioned isotope exchanger 203.

The inside of the first and second distillation columns 201 and 202 are packed with structured packing 206.

As the structured packing 206, it is possible to suitably use the above-mentioned non-promoting-fluid-dispersion type structured packing and/or promoting-fluid-dispersion type structured packing.

In addition, in order to make the vapor-liquid contact within the distillation columns 201 and 202 proceed more efficiently, it is necessary to provide one or more liquid collectors and liquid distributors (not shown in the figures) within each distillation column 201 and 202.

In FIG. 16, in the vicinity of the tops of the distillation columns 201 and 202, condensers 5 and 7 for cooling and liquefying at least a part of the vapor output from the tops of distillation columns 201 and 202 respectively are provided, and in the vicinity of the bottom of the distillation columns 201 and 202, reboilers 6 and 8 for heating and vaporizing at least a part of the liquid output from the bottom of the distillation columns 201 and 202 are provided.

The condensers 5 and 7 each have a first conduit 5a and 7a into which vapor output from the top of distillation columns 201 and 202 is introduced, and second conduits 5b and 7b through which a medium for heat exchange passes, and are made such that the above-mentioned output vapor can be cooled and liquefied by means of heat exchange with the medium for heat exchange.

As condensers 5 and 7, it is preferable to use plate fin type heat exchangers or straight pipe type heat exchangers. Since the amount of the medium for heat exchange required for distillation is small, it is preferable for the condensers 5 and 7 to be of a non-submerged type which are provided outside of the distillation columns.

The reboilers 6 and 8 each have a first conduit 6a and 8a into which liquid output from the distillation columns 201 and 202 is introduced, and second conduits 6b and 8b through which the medium for heat exchange passes, and are made such that the above-mentioned output liquid can be heated and vaporized by means of heat exchange with the medium for heat exchange.

As the reboilers 6 and 8, it is preferable to use plate fin type heat exchanger.

In addition, the reboilers 6 and 8 may be installed outside or inside the distillation columns 201 and 202, but for the purpose of easy manufacture, it is preferable for the reboilers 6 and 8 to be installed outside as in the apparatus shown in the figure. When the reboilers are provided internally within the distillation columns 201 and 202, it is possible to use the coil type reboiler described below.

The isotope exchanger 203 has an external container (not shown in the figure) and within this external container, an isotope exchange catalyst (not shown in the figure). As this isotope exchange catalyst, catalysts containing at least one type selected from the group comprising tungsten (W), tantalum (Ta), palladium (Pd), rhodium (Rh), platinum (Pt), and gold (Au) can be used.

The isotope exchanger 203 is made such that the heavy isotope enriched material obtained by means of the distillation column 201 is introduced into the reactor and brought into contact with the above-mentioned isotope exchange catalyst, then isotope exchange (described below) within the enriched material is promoted, and thereby it is possible to increase the concentration of heavy isotope oxygen molecules within the enriched material.

In addition, as the isotope exchange catalysts, in addition to those mentioned above, it is possible to use a catalyst including at least one type selected from the group comprising Ti-oxide, Zr-oxide, Cr-oxide, Mn-oxide, Fe-oxide, Co-oxide, Ni-oxide, Cu-oxide, Al-oxide, Si-oxide, Sn-oxide, and V-oxide.

The second conduit 5b of the condenser 5 and the second conduit 6b of the reboiler 8 are connected by means of a circulation system (omitted from the figure) the same as the circulation system 19 shown in FIG. 1. By means of the circulation of a medium for heat exchange within this circulation system, the liquid or the vapor within the first conduits 5a and 6a can respectively be vaporized or liquefied.

In the same way, the second conduit 7b of the condenser 7 and the second conduit 8b of the reboiler 6 are connected by means of a circulation system (omitted from the figure) the same as the circulation system 19 shown in FIG. 1.

In the following, as an example of a situation in which the apparatus shown in FIG. 16 is used, another embodiment of the enrichment method of the present invention will be explained in detail.

Firstly, via conduit pipe 220 which is the feed section connected to the first distillation column 201, oxygen starting material vapor is supplied to the interior of the distillation column 201 as first distillation column feed 211.

The oxygen starting material which is supplied to the interior of the distillation column 201 rises within the distillation column 201, and passes over the packing 206, at which time it makes vapor-liquid contact with the circulating liquid (the descending liquid) described below and is distilled.

The oxygen molecules containing heavy isotopes ($^{16}O^{17}O$, $^{16}O^{18}O$, $^{17}O^{17}O$, and $^{17}O^{18}O$) within the oxygen starting material vapor are more likely to condense due to their high boiling points, and the condensed liquid flows down with the reflux liquid within the distillation column 201 as the descending liquid.

Accordingly, oxygen vapor ($^{16}O^{16}O$ enriched vapor), having a decreased concentration of the heavy isotopes, becomes enriched at the top of the distillation column 201.

The enriched vapor is then output from the distillation column 201 via the conduit pipe 221, and a portion of the vapor is introduced into the first conduit 5a of the condenser 5, where it is condensed by means of heat exchange with the medium for heat exchange flowing within the second conduit 5b, and is returned to the top of the distillation column 201 as a reflux liquid.

The remaining portion of the aforementioned enriched vapor output from the distillation column 201 via the conduit pipe 221 is discharged out of the system as exhaust vapor 213 via the conduit pipe 222.

The reflux liquid introduced into the top of the first distillation column 201 becomes descending liquid and flows down over the surface of the structured packing 206 while making vapor-liquid contact with the oxygen starting material vapor which is ascending within the distillation column 201, and reaches the bottom of the distillation column 201. In this process of vapor-liquid contact, the descending liquid becomes enriched with oxygen molecules containing heavy oxygen isotopes ($^{16}O^{17}O$, $^{16}O^{18}O$, $^{17}O^{17}O$, $^{17}O^{18}O$, and $^{18}O^{18}O$) which have a greater tendency to liquefy.

Liquid which accumulates at the bottom of the distillation column 201 (hereinafter, referred to as the "column bottom liquid") is output from the distillation column 201 via conduit pipe 223 and is introduced into the first conduit 6a of the reboiler 6, where it is vaporized by means of heat exchange with the medium for heat exchange flowing within the second conduit 6b. Subsequently, it is output from the reboiler 6, and a portion thereof is reintroduced as reboiler vapor into the bottom of the distillation column 201 and becomes ascending vapor which rises within the distillation column 201.

The remaining portion of the vapor output from the first conduit 6a of the reboiler 6 is introduced via conduit pipe 224 into the isotope exchanger 203 as first distillation column output vapor 212 which is the enriched material enriched with heavy oxygen isotopes.

In the isotope scrambler (i.e., the isotope exchanger 203) into which the first distillation column output vapor 203 is introduced, isotope exchange is conducted by means of an isotope exchange catalyst packed in the isotope exchanger 203. Isotope exchange is a reaction wherein coupled atoms in a two-atom molecule are exchanged with other atoms on the surface of a sufficiently heated catalyst In other words, if, for example, A, B, C, and D are, respectively, any one of the isotope atoms, $^{16}O$, $^{17}O$, and $^{18}O$, isotope exchange is a reaction in which:

$$AB+CD=AC+BD;\ \text{or}\ AB+CD=AD+BC$$

If a particular isotope atom is considered, after sufficient time has passed, an isotope atom which couples to form a molecule is randomly determined according to the abundance ratio of each isotope constituent prior to isotope exchange.

Accordingly, the abundance ratio of each isotope in the reactant material (i.e., oxygen molecule) obtained by means of isotope exchange in the isotope exchanger 203 is determined according to the abundance ratio of each isotope in the first column output vapor 212.

In the following, this will be explained in more detail.

The components of $^{16}O^{16}O$, $^{16}O^{17}O$, and $^{16}O^{18}O$ are present in the output vapor 212. If the respective molar ratios of these components is $Y_{11}$, $Y_{12}$, and $Y_{13}$, since each of these component oxygen molecules randomly exchanges coupled oxygen atoms in the isotope scrambler, the concentration of each component after the isotope scrambling is as follows:

$^{16}O^{16}O$: $(Y_{11}+Y_{12}/2+Y_{13}/2)^2$  (i)

$^{16}O^{17}O$: $(Y_{11}+Y_{12}/2+Y_{13}/2)Y_{12}$  (ii)

$^{16}O^{18}O$: $(Y_{11}+Y_{12}/2+Y_{13}/2)Y_{13}$  (iii)

$^{17}O^{17}O$: $Y^2_{12}/4$  (iv)

$^{17}O^{18}O$: $Y_{12}Y_{13}/2$  (v)

$^{18}O^{18}O$: $Y^2_{13}/4$  (vi)

The sum of these constituent concentrations equals 1.

As described above, the phenomena in which, in the presence of a plurality of molecules which contain isotopes, each molecule randomly exchanges the coupled atoms from which it is formed is called "isotope scrambling", and the apparatus in which this takes place is called an "isotope scrambler". The above-mentioned embodiment is an example in which an isotope exchanger which uses a catalyst is employed as an isotope scrambler.

By means of the aforementioned isotope exchange, heavy isotope oxygen molecules ($^{18}O^{18}O$, $^{17}O^{18}O$, and $^{17}O^{17}O$) are formed from $^{16}O^{17}O$ and $^{16}O^{18}O$, and thereby the concentration of heavy isotope oxygen molecules in the aforementioned first distillation column output vapor 212 is increased.

The vapor in which the concentration of heavy isotope oxygen molecules has been increased in this way is then supplied to the second distillation column 202, via the conduit pipe 225, as the second distillation column feed 214, and ascends within the distillation column 202 as ascending vapor while making vapor-liquid contact with the descending liquid (i.e., reflux liquid), which flows down over the surface of the packing 206, and reaches the top of the distillation column 202. On the other hand, the descending liquid eventually reaches the bottom portion of the distillation column 202.

In this process of vapor-liquid contact, the descending liquid becomes enriched in the heavy isotope oxygen molecules ($^{18}O^{18}O$, $^{17}O^{18}O$, and $^{17}O^{17}O$) generated by means of the above-mentioned isotope scrambling, and the ascending vapor becomes enriched in the $^{16}O^{16}O$ generated by means of the isotope scrambling.

The column bottom liquid of the second distillation column 202 is output from the distillation column 202, via the conduit pipe 226, and is vaporized in the reboiler 8. Subsequently, the resultant vapor is divided into two portions, one of which is discharged, via the conduit pipe 227, out of the system as output vapor 215 as a finished product.

The remaining portion of the vapor of the column bottom liquid, output from the distillation column 202 and vaporized in the reboiler 8, is returned again to the lower portion of the distillation column 202 as ascending vapor.

The re-boiled vapor introduced into the second distillation column 202 ascends in the distillation column 202, and is distilled by means of vapor-liquid contact with the aforementioned descending liquid when passing through the packing 206, in the same manner as the aforementioned feed vapor.

The vapor separated at the head of the column is output from the distillation column 202 via the conduit pipe 228, and a portion thereof is returned, via the condenser 7, to the top of the distillation column 202 as the reflux liquid.

The remaining portion of the aforementioned separated vapor which has been output from the distillation column 202 via the conduit pipe 228, pass through the conduit pipe 229 and blower 229a, and are returned to the first distillation column 201 as returned vapor 216.

In this distillation operation in which first and second distillation columns 201 and 202 are used, the operating pressure is set in the range of 0.5 bar to 5 bar, preferably in the range of 1.1 bar to 2.5 bar, and more preferably in the range of 1.1 bar to 1.8 bar.

The superficial F factor in the distillation columns 201 and 202 is set to at least 0.5 m/s(kg/m$^3$)$^{1/2}$ and no greater than 2.0 m/s(kg/m$^3$)$^{1/2}$, and preferably to at least 0.8 m/s (kg/m$^3$)$^{1/2}$, and no greater than 1.8 m/s(kg/m$^3$)$^{1/2}$.

If the superficial F factor is less than 0.5 m/s(kg/m$^3$)$^{1/2}$, mass transfer between the liquid and the vapor declines, leading to a deterioration of the efficiency of vapor-liquid contact (i.e., distillation efficiency). In addition, a superficial F factor exceeding 2.0 m/s(kg/m$^3$)$^{1/2}$ is undesirable due to a tendency towards flooding.

As the medium for heat exchange which flows within the second conduit 5b of the condenser 5 and the second conduit 6b of the reboiler 6, it is possible to use nitrogen, oxygen, air or the exhaust gas of an air separation unit.

By means of the above-mentioned method, in the same way as for the enrichment method in which the apparatus shown in FIG. 1 is used, it is possible to obtain the following effects.

(1) Since oxygen which does not contain other elements is used as the starting material, it is possible to obtain an enriched product with a high concentration of heavy oxygen isotopes.

(2) Since the latent heat of vaporization of oxygen (the starting material) is low, it is possible to reduce the size of the distillation columns, the heat exchangers, and the like compared with those for water distillation methods, and thus it is possible to reduce apparatus costs and operation costs.

(3) Since the oxygen starting material is not a corrosive or toxic gas, it is advantageous with regard to ease of handling and safety.

(4) By means of the use of a distillation column in which structured packing is used, it is possible to reduce liquid hold-up, and thus it is possible to shorten the time required to start up the apparatus. Furthermore, it is possible to reduce operating costs associated therewith.

(5) By means of using structured packing, it is possible to increase the efficiency of vapor-liquid contact within the distillation column, and thereby it is possible to increase the efficiency of the isotope enrichment.

(6) By means of using structured packing, the pressure loss for which is low, it is possible to carry out the distillation under conditions in which the relative volatility of each component is comparatively large and thereby it is possible to increase the efficiency of the enrichment of oxygen molecules containing heavy isotopes.

(7) By means of using promoting-fluid-dispersion type structured packing as the structured packing, it is possible to increase the efficiency of vapor-liquid contact, and thereby it is possible to further increase the efficiency of the enrichment of heavy oxygen isotopes.

(8) By means of the provision of a condenser and a reboiler in the distillation column, and by using and circulating a medium for heat exchange between the condenser and the reboiler, it is possible to make use of the coolness of the medium for heat exchange without waste, to suppress energy loss to a minimum and thereby to reduce operating costs.

(9) By means of the use of a plurality of distillation columns, it is possible to obtain an enriched product for which the ratio of enrichment is even higher. In addition, it is possible to reduce the height of the distillation columns, and to make the construction of the apparatus as a whole compact.

In the method of the present embodiment, in addition to these effects, the following effects are also possible.

(10) After the enrichment of an oxygen starting material in oxygen molecules containing heavy oxygen isotopes ($^{16}O^{17}O$, $^{16}O^{18}O$, $^{17}O^{17}O$, $^{17}O^{18}O$, and $^{18}O^{18}O$) by means of the cryogenic distillation of an oxygen starting material which contains heavy oxygen isotopes, the concentration of heavy isotope oxygen molecules ($^{18}O^{18}O$, $^{17}O^{18}O$, and $^{17}O^{17}O$ which are oxygen molecules which comprise only heavy isotopes) within the enriched material is increased by means of isotope exchange, and thereby it is possible to obtain a finished product containing a high concentration of heavy oxygen isotopes.

In contrast to this, in a method which uses only an oxygen distillation method, since a major portion of the oxygen molecules which contain heavy oxygen isotopes for enrichment are $^{16}O^{17}O$ and $^{16}O^{18}O$, the ratio of the atoms of $^{17}O$ and $^{18}O$ (which are of interest) is limited to less than 50%.

(11) By means of the carrying out the isotope scrambling using an isotope exchanger equipped with an isotope exchange catalyst which promotes isotope exchange in the above-mentioned enriched material, it is possible to simplify the apparatus structure and to reduce equipment costs.

Figure 17:
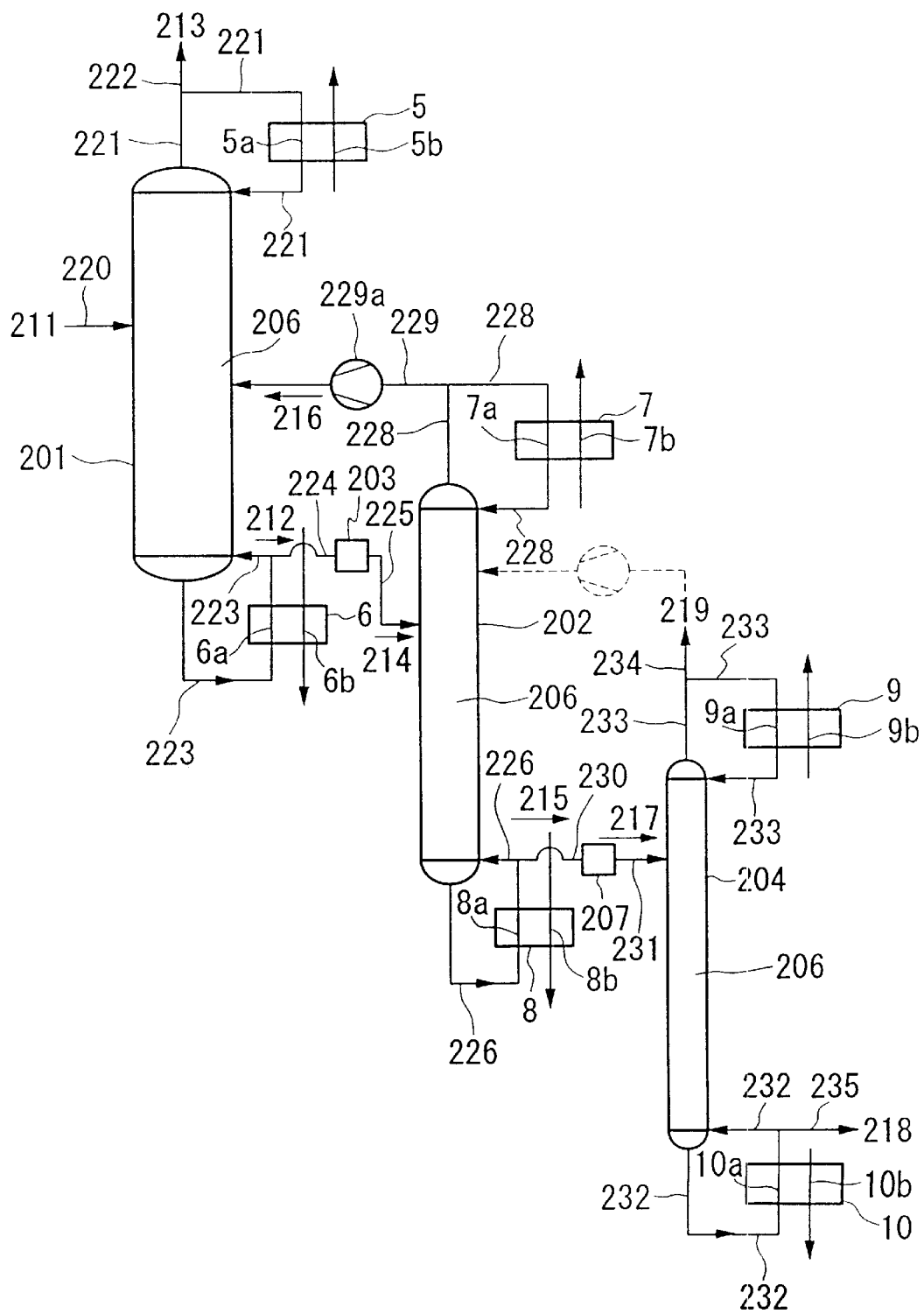
FIG. 17 is a diagram showing a structural outline of yet another embodiment of the apparatus for the enrichment of heavy oxygen isotopes of the present invention.

FIG. 17 shows yet another embodiment of the enrichment apparatus for heavy oxygen isotopes of the present invention. The apparatus shown here differs from the apparatus shown in FIG. 16 in that an isotope exchanger 207 is provided in the stage after the second distillation column 202, and a third distillation column 204 is provided in the stage after the isotope exchanger 207.

It is possible for this isotope exchanger 207 to have the same structure as the above-mentioned isotope exchanger 203.

The third distillation column 204 may be packed with structured packing 206 in the same way as the first and second distillation columns 201 and 202.

The specific surface area of the above-mentioned packing 206 is preferably in the range of 350 m$^2$/m$^3$ to 1200 m$^2$/m$^3$, and preferably 500 m$^2$/m$^3$ to 750 m$^2$/m$^3$. When the specific surface area is less than 350 m$^2$/m$^3$, the vapor-liquid contact surface area is small and the efficiency of the vapor-liquid contact is reduced. A specific surface area exceeding 1200 m$^2$/m$^3$ is not preferred due to a tendency towards flooding.

A condenser 9 comprising first and second conduits 9a and 9b is provided in the vicinity of the top of the third distillation column 204, and a reboiler 10 comprising first and second conduits 10a and 10b is provided in the vicinity of the bottom of the third distillation column 204. The second conduit 9b of the condenser 9 is connected to the second conduit 10b of the reboiler 10 via a circulatory system for a medium for heat exchange (not shown in the figures), which is constructed in the same manner with the aforementioned circulatory system 19.

In carrying out enrichment, of the heavy oxygen isotopes using the aforementioned apparatus, firstly, in accordance with the process described above, the first distillation column output vapor 212, having passed through the first distillation column 201, is introduced into the isotope exchanger 203, where the concentration of heavy isotope oxygen molecules in the enriched material is increased by means of isotope exchange, and then this is introduced into the second distillation column 202, where it is further distilled.

Subsequently, the column bottom liquid of the second distillation column 202 is vaporized by means of the reboiler 8, and a portion thereof is returned to the second distillation column 202, while the remaining portion is introduced into the isotope exchanger 207 via the conduit pipe 230 as output vapor 215.

In the isotope exchanger 207, the output vapor 215 is brought into contact with the aforementioned isotope exchange catalyst and the concentration of heavy isotope oxygen molecules (i.e., $^{18}O^{18}O$, $^{18}O^{17}O$, and $^{17}O^{17}O$, and particularly $^{18}O^{18}O$ and $^{17}O^{18}O$) is increased by means of the aforementioned isotope exchange.

The vapor, in which the concentration of oxygen molecules of heavy oxygen isotopes (in particular $^{18}O^{18}O$ and $^{17}O^{18}O$) has been increased by means of the isotope exchanger 207, is supplied via the conduit pipe 231 to the third distillation column 204 as the third distillation column feed 217, and is distilled by means of vapor-liquid contact in the third distillation column 204. In this process of vapor-liquid contact, the descending liquid is further enriched in heavy oxygen isotopes (and $^{18}O^{18}O$ in particular).

The column bottom liquid is introduced from the distillation column 204 via the conduit pipe 232 into the reboiler 10, and discharged after being vaporized. A portion thereof is discharged, via the conduit pipe 235, out of the system as output vapor 218 for use as a finished product.

The remaining portion of the vapor obtained by means of the vaporization of the column bottom liquid of the third distillation column 204 in the reboiler 10 is returned to the lower portion of the distillation column 204.

The vapor introduced into the third distillation column 204 ascends within the distillation column 204, and is distilled by means of vapor-liquid contact with the aforementioned descending liquid while passing through the packing 206.

The vapor separated at the top of the column is discharged from the distillation column 204 via the conduit pipe 233, and a portion thereof is returned, via the condenser 9, to the top of the distillation column 204 as reflux liquid.

The remaining portion of the aforementioned separated vapor is discharged, via the conduit pipe 234, out of the system as exhaust vapor 219. The exhaust vapor 219 may also be returned to the distillation column 202 (shown with a broken line in FIG. 17).

In the distillation operation which utilizes the above-mentioned third distillation column 204, the operating pressure is set in the range of 0.5 bar to 5 bar, preferably in the range of 1.1 bar to 2.5 bar, and more preferably in the range of 1.1 bar to 2.0 bar.

The superficial F factor within the distillation column 204 is set to at least 0.5 m/s(kg/m$^3$)$^{1/2}$ and no greater than 2.0 m/s(kg/m$^3$)$^{1/2}$, and preferably to at least 0.8 m/s(kg/m$^3$)$^{1/2}$, and no greater than 1.8 m/s(kg/m$^3$)$^{1/2}$.

If the superficial F factor is less than 0.5 m/s(kg/m$^3$)$^{1/2}$, mass transfer between the liquid and the vapor declines, leading to a deterioration in the efficiency of vapor-liquid contact (i.e., distillation efficiency). In addition, a superficial F factor exceeding 2.0 m/s(kg/m$^3$)$^{1/2}$ is undesirable due to a: tendency towards flooding.

In the method of the above-mentioned embodiment, it is possible to obtain a product containing a high concentration of heavy oxygen isotopes (in particular, $^{18}O^{18}O$), by means of increasing the concentration of the heavy isotope oxygen molecules (i.e., $^{18}O^{18}O$ and $^{17}O^{18}O$) in the output vapor 215, which has passed through the first distillation column 201, the isotope exchanger 203, and the second distillation column 202, using the isotope exchanger 207; and increasing the concentration of the heavy oxygen isotopes ($^{18}O^{18}O$ in particular) in the feed 217 through distillation of the obtained enriched material (i.e., the third distillation column feed 217) in the third distillation column 204.

In particular, it is possible to set a low column height since the enriched material fed into the third distillation column 204 is enriched in $^{17}O^{18}O$ and $^{18}O^{18}O$, both of which comprise large separation factors.

Figure 18:
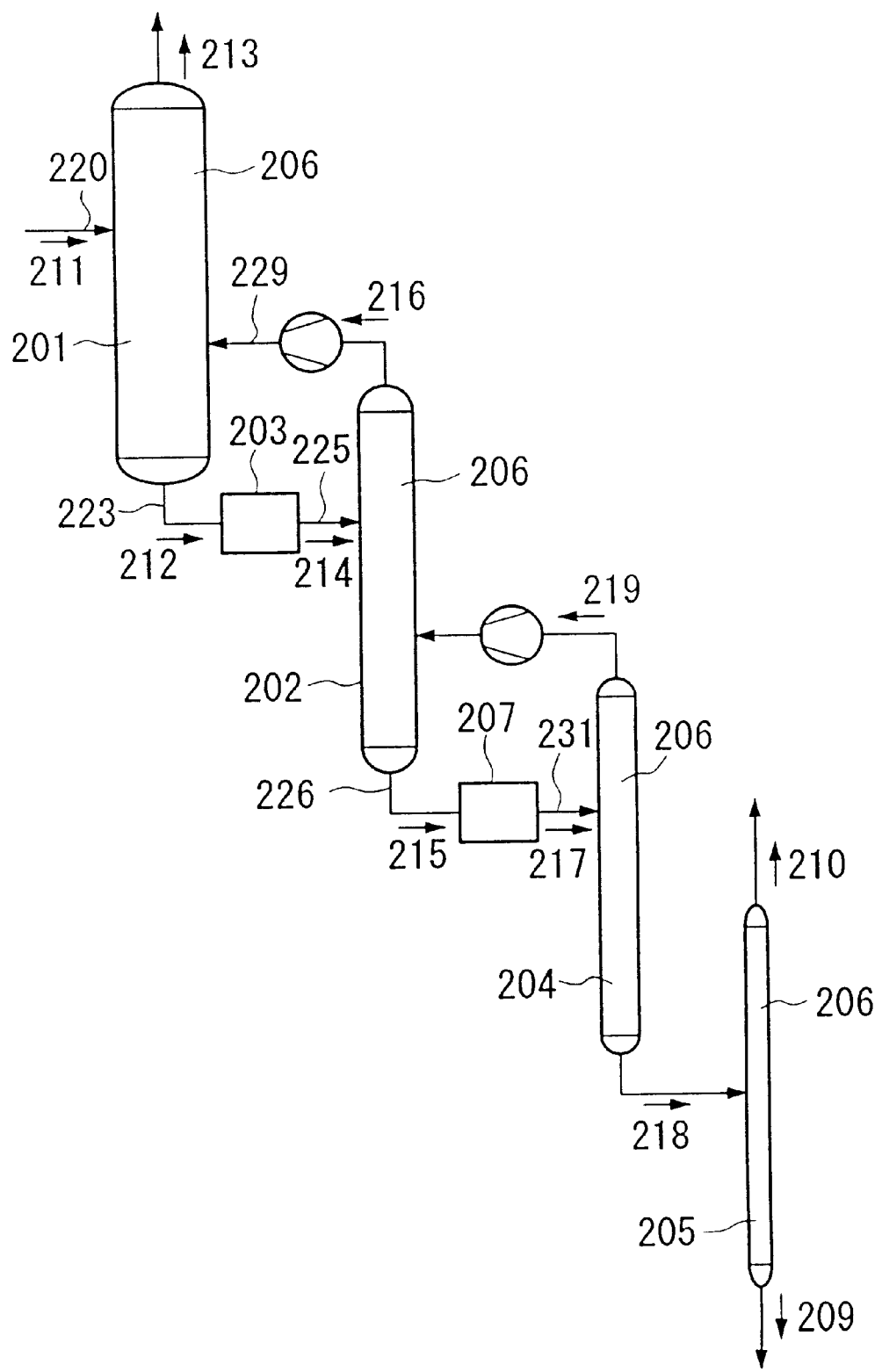
FIG. 18 is a diagram showing a structural outline of yet another embodiment of the apparatus for the enrichment of heavy oxygen isotopes of the present invention.

FIG. 18 shows another embodiment of the apparatus for enrichment of the heavy oxygen isotopes of the present invention. The apparatus shown here differs from the apparatus shown in FIG. 17 by being equipped with a fourth distillation column 205 in the stage after the third distillation column 204.

Each of the distillation columns 201, 202, and 204, and the isotope exchangers 203 and 207 may be constructed in the same manner as shown in FIG. 17.

A condenser and reboiler (not shown in the figures), similar to the ones shown in FIG. 17 are provided in each of the distillation columns 201, 202, 204, and 205. In addition, in FIG. 18, a portion of the conduit pipes have been omitted and are not shown.

The fourth distillation column 205 may be packed with structured packing 206, in a similar way as in the first through third distillation columns.

In carrying out the enrichment of heavy oxygen isotopes using the aforementioned apparatus, in accordance with the above-described process, enrichment of heavy oxygen isotopes is carried out in the first distillation column 201 to produce a first distillation column output vapor 212, which is then introduced into the isotope exchanger 203 where the concentration of heavy isotope oxygen molecules is increased by means of isotope exchange. The second distillation feed 214 which has passed through the isotope exchanger 203 is then introduced into the second distillation column 202, and the concentration of the heavy isotope oxygen molecules ($^{18}O^{18}O$ and $^{17}O^{18}O$ in particular) in the output vapor 215 of the second distillation column 202 is increased by means of the isotope exchanger 207. The resultant third distillation column feed 217 is then supplied to the third distillation column 204.

At this time, it is preferable to create a maximum concentration of $^{17}O^{18}O$ in the middle section of the column (i.e., at a position between the top of the column and the bottom of the column) in the third distillation column 204; in other words, to create a peak in the concentration of $^{17}O^{18}O$ at the middle section of the column, by means of appropriately setting various conditions, such as the inner pressure of the column, the reflux ratio, the column height, the column diameter, the type of packing, and the like.

In this manner, the concentration of $^{16}O^{18}O$ at the bottom of the third distillation column 204 is suppressed, while the concentration of $^{17}O^{18}O$ is increased at the bottom portion of the third distillation column 204. Additionally, $^{18}O^{18}O$ can be recovered at a high recovery rate at the bottom of the third distillation column 204.

Accordingly, by means of setting the operating conditions of the third distillation column 204, it is possible to enrich $^{18}O$ to a high concentration at the bottom of the third distillation column 204, and in addition to enrich $^{17}O$ to a high concentration at the top of the column of the third distillation column.

Subsequently, the output vapor 218, in which heavy isotope oxygen molecules (in particular, $^{17}O^{18}O$, and $^{18}O^{18}O$) have been enriched in the bottom of the third distillation column 204, is introduced into the fourth distillation column 205.

In the fourth distillation column 205, enriched liquid in which the concentration of $^{18}O^{18}O$ in particular has been increased collects at the bottom of the column by means of distillation. The output liquid is then vaporized in the reboiler (not shown in the figure), and, subsequently, a portion thereof is discharged out of the system as output vapor 209 (i.e., finished product vapor). Additionally, the remaining portion is then introduced into the lower section of the column 205, and forms the ascending vapor.

In addition, the separated vapor at the top of the column is discharged out of the system as output vapor 210.

In the method of the present embodiment, by means of using a fourth distillation column 205, it is possible to further increase the concentration of the heavy isotope oxygen molecules (i.e., $^{18}O^{18}O$ and $^{17}O^{18}O$) in the output vapor 218, which has passed sequentially through the first distillation column 201, the isotope exchanger 203, the second distillation column 202, the isotope exchanger 207, and the third distillation column 204.

Accordingly, it is possible to obtain an output vapor 209 in which the concentration of $^{18}O^{18}O$ is increased, for example, to 99% or greater. In addition, it is possible to obtain an output vapor 210 in which the concentration of $^{17}O^{18}O$ is increased, for example, to 10% or greater.

In addition, it is possible to set a low column height since the enriched material fed into the fourth distillation column 205 is enriched in $^{17}O^{18}O$ and $^{18}O^{18}O$, both of which comprise large separation factors.

In addition, the apparatus according to the present invention is not limited to the above-mentioned constructions, and the aforementioned distillation columns 201, 202, 204 and 205 may also be divided into a plurality of columns as shown in FIG. 10.

Figure 19:
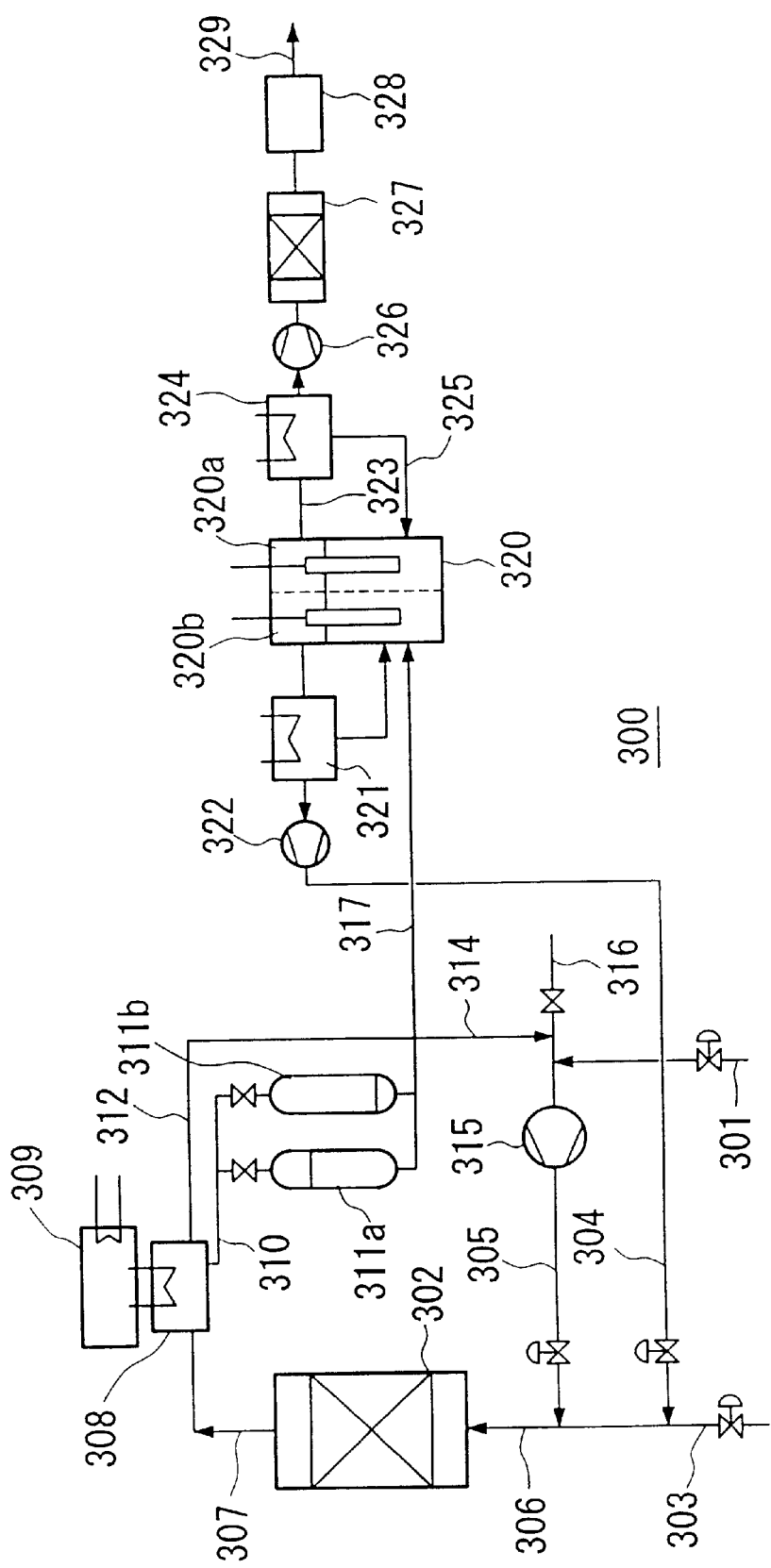
FIG. 19 is a structural outline showing an example of an isotope scrambler used in the enrichment apparatus of the present invention.

As the isotope scrambler used in the present invention, it is possible to use the apparatus shown in FIG. 19.

The isotope scrambler 300 shown here conducts isotope exchange by means of conducting hydrogenation using a catalyst, followed by electrolysis of the obtained produced water, and comprises a catalytic column 302 which is a reaction system for producing water by means of reacting hydrogen with output vapor from the distillation column located at the step in front of the isotope scrambler; a cooler 308 for condensing and recovering the produced water; water storage tanks 311a and 311b for storing the produced water recovered at the cooler 308; an electrolysis unit 320 for conducting electrolysis of the aforementioned produced water; an oxygen purifier 327 for oxidizing impurities in the oxygen obtained by means of the electrolysis; and a trap 328 for removing the oxidized impurities.

As the catalytic column 302, it is possible to use columns packed with hydrogen and oxygen reactive catalysts. As these catalysts, it is preferable to use a catalyst containing at least one type of metal selected from the group comprising Pt, Pd, Rh, Ru, Au, Ni, Cu, and Mn.

In addition, it is possible to use a catalyst, in which the above-mentioned metals (Pt, Pd, Rh, etc.) are carried by at least one selected from the group comprising Al-oxide, Si-oxide, Ti-oxide, Zr-oxide, Cr-oxide, V-oxide, Co-oxide, Mn-oxide, or the like.

It is preferable for the catalytic column to be constructed such that the reaction between hydrogen and oxygen occurs at a temperature of 150° C. or below. A temperature higher than 150° C. causes an exchange reaction between the oxygen in the aforementioned oxide and oxygen in the aforementioned enriched material, and is hence undesirable.

Preferred examples of the oxygen purifier 327 include purifiers provided with catalysts containing no oxygen, such as those containing Pt. Pd, Rh, Ru, Au, Ni, Cu, and Ag—Pd, since the mixing of the oxygen derived from catalysts in the product can be prevented.

Furthermore, as the catalyst, it is possible to use the above-mentioned catalysts which do not contain oxygen carried on the above-mentioned metal oxides.

As the trap 328, it is possible to use an adsorption trap, a cold trap, or the like.

In using the isotope scrambler 300 shown herein, first, the vapor output (hereinafter, referred to as the enriched material) from the distillation column in an earlier step is input, via the conduit pipe 301, into the suction side of a circulatory blower 315, and is further introduced into a catalytic column 302 via the conduit pipes 305 and 306. In addition, the hydrogen produced in the electrolysis process described in the following is supplied into the catalytic column 302 via the conduit pipes 304 and 306. Additionally, hydrogen supplied from a supply source (not shown in the figures) may be supplied, via the conduit pipes 303 and 306, into the catalytic column 302, in accordance with necessity.

The amount of hydrogen supplied to the catalytic column 302 is appropriately determined according to the flow rate of the aforementioned enriched material as measured by means of a flow meter (not shown in the figures) provided in conduit pipe 301.

The amount of hydrogen supplied is regulated by means of opening/closing regulating valves provided in conduit pipes 303 and 304, which are controlled by a control unit (not shown in the figures).

Simultaneously, diluent gas is introduced into the catalytic column 302 via a conduit pipe 305 from conduit pipes 314 and 316. The diluent gas reduces the concentration of components in the vapor introduced into the catalytic column 302 to a level no greater than that of the explosive limits value, and maintains a low temperature within the catalytic column 302 (for example, 150° C. or lower, and preferably 100° C. or lower). As the diluent gas, it is possible to use inert gases such as argon or the like.

The amount of the diluent gas supplied from the conduit pipe 316 is appropriately determined in accordance with the concentration, temperature, and the like of the component vapors introduced into the catalytic column 302.

The aforementioned enriched material which is introduced into the catalytic column 302 via the conduit pipe 301 reacts with hydrogen introduced via the conduit pipe 303 and thereby water is produced.

Water vapor (produced water) produced in the catalytic column 302 is introduced, via the conduit pipe 307, into the cooler 308, where the water vapor is cooled and condensed by means of a "chiller" supplied from a freezer 309, and then passes through the conduit pipe 310, and is stored in the water storage tanks 311a and 311b. Cooling of the produced water preferably continues until the temperature of the produced water decreases to 10° C. or below.

On the other hand, the cooler 308 comprises a heat exchange chamber and a condensed water separation chamber. The diluent gas separated from the produced water in the condensed water separation chamber passes through the conduit pipes 312 and 314, and is reused by being returned to the catalytic column 303 via the aforementioned conduit pipes 305 and 306 by means of the circulatory blower 315. Additionally, diluent gas may also be supplied into the conduit pipe 305 via the conduit pipe 316, if necessary.

The produced water stored in the water storage tanks 311a and 311b is introduced, via the conduit pipe 317, into the electrolysis unit 320 for electrolysis. In the electrolysis unit 320, oxygen is produced as a separate product in the anode chamber 320a, and hydrogen is produced as a separate product in the cathode chamber 320b.

Hydrogen output from the cathode chamber 320b is cooled in the cooler 321, and is introduced into the catalytic column 302 via the aforementioned conduit pipes 304 and 306 by means of the circulatory blower 322. The hydrogen introduced into the catalytic column 302 is recycle and used as the hydrogen added to the above-mentioned enriched material.

Oxygen output from the anode chamber 320a passes through conduit pipe 323, and is cooled in the cooler 324 and after its pressure is raised by means of the blower 326, is introduced into the oxygen purifier 327.

In the oxygen purifier 327, impurities such as hydrogen and carbon monoxide in the oxygen output from the anode chamber 320a are oxidized to form water, carbon dioxide and the like. The temperature in the oxygen purifier 327 is preferably set to approximately 300° C.

The impurities oxidized in the oxygen purifier 327 are removed by means of the trap 328.

The oxygen having passed through the trap 328 is introduced, via a conduit pipe 329, into the distillation column located one step after this isotope scrambler 300.

If water vapor is mixed in with the hydrogen produced in the cathode chamber 320b, the water vapor is cooled and condensed by means of the chiller supplied from the above-mentioned freezer 309 within the cooler 321, and returned to the electrolysis unit 320.

If water vapor is mixed in with the oxygen produced in the anode chamber 320a, the water vapor is cooled and condensed by means of the chiller supplied from the above-mentioned freezer 309 within the cooler 324, and is returned to the electrolysis unit 320, via the conduit pipe 325.

In the method according to this embodiment, by means of reacting the aforementioned enriched material with hydrogen in the catalytic column 302 to temporarily form water, the number of oxygen atoms contained per molecule equals one. In other words, the enriched material is reformed to simple oxygen in the electrolysis chamber 320 after separating oxygen out into single atoms. Accordingly, the aforementioned isotope scrambling (i.e., isotope exchange) is reliably conducted, and the concentration of each component does reliably reach the values shown in the above-mentioned formulae (i)~(vi).

Thus, the concentration of heavy isotope oxygen molecules can be reliably increased.

In addition, the method of this embodiment is one in which the enriched material is temporarily formed into water, and this water is then electrolyzed. Since reaction rates for the production reaction for this water and the electrolysis of the water are high, it is possible to increase production efficiency.

When the aforementioned electrolysis unit 320 is able to produce oxygen and hydrogen vapor of a high pressure in the anode chamber 320a and the cathode chamber 320b, the blowers 322 and 326 are not needed.

According to the aforementioned method, water is produced by means of diluting the enriched material with a diluent gas, and subsequently reacting the resultant material with hydrogen by means of employing a catalytic reaction. However, the present invention is not limited to the aforementioned, and it is possible to produce water by means of combusting the aforementioned hydrogen in the presence of the aforementioned enriched material, using a combustion chamber.

Figure 20:
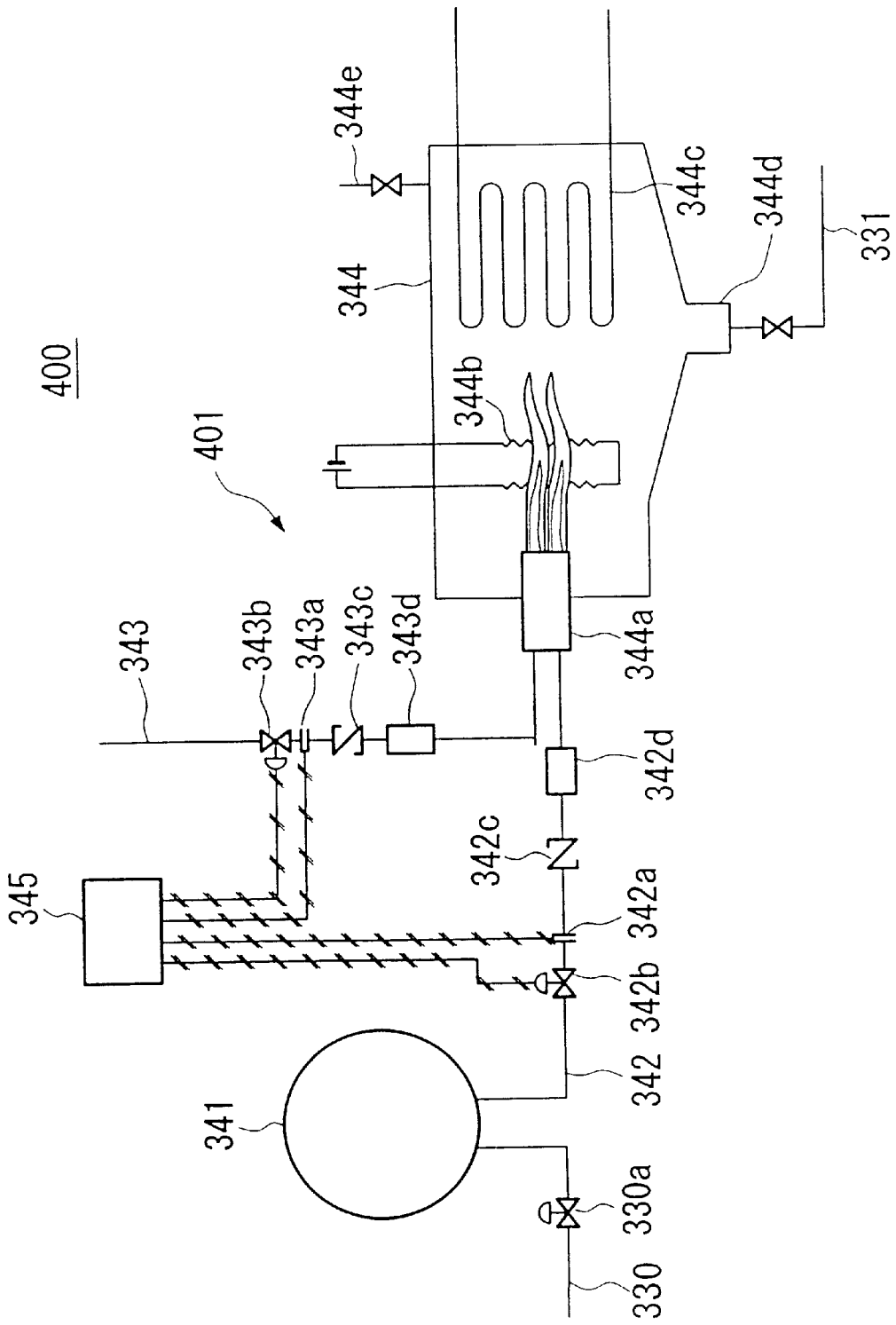
FIG. 20 is a structural outline showing the main parts of another example of an isotope scrambler used in the apparatus for the enrichment of heavy oxygen isotopes of the present invention.

FIG. 20 shows the main aspects of an example of an isotope scrambler wherein water is produced by means of reacting the aforementioned enriched material with hydrogen using a combustion chamber.

The isotope scrambler 400 shown here comprises a buffer tank 341 for temporarily storing the enriched material (oxygen vapor) which has passed through the distillation column at an earlier step; a conduit pipe 342 for introducing the oxygen vapor into the buffer tank 341; a conduit pipe 343 for introducing hydrogen (containing deuterium) supplied from a supply source (not shown in the figure); a combustion chamber 344 for reacting the oxygen and hydrogen supplied from the conduit pipes 342 and 343; and a combustion chamber 401 having a controller 345.

In the stage after the combustion chamber 401, water storage tanks 311a and 311b, a cooler 321, an electrolysis unit 320, a cooler 324, an oxygen purifier 327, and a trap 328, all of which are similar to those shown in FIG. 19, are provided.

The combustion chamber 344 comprises a burner 344a for mixing and combusting oxygen and hydrogen supplied into the combustion chamber 344; a heater 344b for igniting the oxygen-hydrogen mixed vapor; and a cooling coil 344c for cooling the reactant product (i.e., water vapor). Additionally, a discharge opening 344d is provided for expelling the reactant product (water) in the combustion chamber 344 via a valve.

The controller 345 regulates a flow regulating valve 342b by means of signals based on the flow rate of oxygen vapor measured by an oxygen flow rate detector 342a provided in conduit pipe 342, and thereby the controller 345 is able to adjust the supply volume of oxygen vapor supplied into the combustion chamber 344 via the conduit pipe 342.

In addition, the controller 345 regulates a flow regulating valve 343b by means of signals based on the flow rate of hydrogen which is measured by a hydrogen flow rate detector 343a provided in the conduit pipe 343, and thereby the controller 345 is able to adjust the supply volume of hydrogen supplied into the combustion chamber 344 via the conduit pipe 343.

Further, references 342c and 343c indicate check valves; references 342d and 343d indicate back-fire prevention chambers; and reference 344e indicates a conduit pipe for discharging the small amount of unreacted vapor remaining in the combustion chamber 344, via a valve.

In the following, an enrichment method is explained wherein the aforementioned isotope scrambler 400 is used instead of the aforementioned isotope exchanger 203 and/or isotope exchanger 207.

The output vapor which was output from the distillation column located at an earlier stage is introduced into the combustor 401 of the isotope scrambler 400 via the conduit pipe 330 and the regulating valve 330a.

The oxygen vapor introduced into the combustor 401 passes through the buffer tank 341, and is introduced into the combustion chamber 344 via the conduit pipe 342.

Simultaneously, hydrogen supplied from a supply source not shown in the figures is supplied to the combustion chamber 344 via the conduit pipe 343.

At this point, the controller 345 performs a calculation based on signal based on a predetermined value and a feedback signal based on the flow rate of oxygen vapor measured by the oxygen flow rate detector 342a. The controller regulates the flow rate regulating valve 342b by means of a signal resulting from this calculation. In the same manner, controller 345 performs a calculation based on the signal based on a predetermined value and a feedback signal based on the flow rate of hydrogen measured by the hydrogen flow rate detector 343a. The controller regulates the flow rate regulating valve 343b by means of a signal resulting from this calculation. As a result, the aforementioned oxygen and hydrogen are supplied into the combustion chamber 244 in volumes which approximate the stoichiometric volume for producing water.

The oxygen and hydrogen supplied to the combustion chamber 344 are always regulated to a volume which closely approximates the aforementioned stoichiometric volume by means of the aforementioned feedback control. However, despite this, excess supplied vapor is regularly discharged via a valve from a discharge conduit pipe 344e, and this prevents the vapor from accumulating in the combustion chamber 344.

In order to further reduce the volume of the exhaust vapor, it is preferable to jointly employ an even more precise controlling means, such as a feed-forward controlling method.

The aforementioned oxygen and hydrogen supplied into the combustion chamber 344 are mixed by means of the burner 344a, and subsequently, jetted into the combustion chamber 344, ignited by means of the heater 344b, and reacted with each other to produce water.

Most of the produced water is condensed by the cooling coil 344c, and subsequently expelled out of the combustion chamber 344 via the discharge opening 344d, and supplied, via the aforementioned conduit pipe 331, to the water storage tank 311a or 311b for storage.

The produced water output from the water storage tanks 311a and 311b is then sent to the electrolysis unit 320, and thereafter, isotope scrambling is conducted in the same manner as in the process using the isotope scrambler 300 shown in the aforementioned FIG. 19.

The aforementioned method for using a combustion chamber 401 does not comprise a circulatory system for diluent gas, and thus leads to a simpler apparatus, compared to the method in which an isotope scrambler 300 is employed.

Furthermore, the hydrogen supplied to the combustion chamber 401 is recirculated and reused in the same manner as in the aforementioned method in which an isotope scrambler 300 is employed.

In addition, isotope scrambling may be conducted according to a high-heat thermal treatment method. In that case, the aforementioned isotope scrambling (i.e., isotope exchange) is conducted by means of directing! the aforementioned enriched material into a silica pipe heated to 1000° C. or higher for thermal treatment.

Furthermore, isotope scrambling may be conducted by means of utilizing an oxidation-reduction reaction. In that method, the oxidation-reduction reaction is controlled by means of suitably setting condition such as the partial pressure of oxygen and the reaction temperature during the oxidation-reduction reaction.

In this method, the enriched material ($O_2$) is reacted with an oxidizable material, such as a metal or metal oxide, to form a temporary oxide, which is subsequently reduced to produce oxygen. Thereby, isotope scrambling is carried out.

For example, oxygen is produced by means of reacting an oxidizable material such as a metal or oxides (e.g., $Mn_3O_4$, Ag, and Au) with the aforementioned enriched material according to one of the following formulae to form an oxide ($MnO_2$, $Ag_2O$, $Au_2O_3$) and subsequently reducing this oxide.

$$Mn_3O_4 + O_2 = 3MnO_2$$

$$4Ag + O_2 = 2Ag_2O$$

$$4Au + 3O_2 = 2Au_2O_3$$

In addition, a method may be employed in which oxygen is produced by means of reacting the aforementioned enriched material with $Cu_2O$, FeO, or CO as the oxidizable material (in the following way), to obtain an oxide (such as CuO, $Fe_2O_3$, and $CO_2$), and then subsequently reducing this oxide.

$$Cu_2O + 0.5O_2 = 2CuO$$

$$2FeO + 2O_2 = 2Fe_2O_3$$

$$CO + 0.5O_2 = CO_2$$

Furthermore, an oxidization-reduction reaction using a peroxide ($BaO_2$) in the following manner may also be employed.

$$BaO + 0.5O_2 = BaO_2$$

In the aforementioned reaction, the equilibrium pressure for oxygen differs depending on the temperature. For example, the reaction proceeds from left to right at a temperature of approximately 650° C., and the reaction proceeds from the right to left at a temperature of approximately 800° C.

In this case, by means of controlling the reaction by setting the temperature and oxygen pressure at appropriate values, it is possible to utilize either reaction proceeding from left to right, or from right to left.

In addition, as the above-mentioned oxidizable materials, in addition to BaO, SrO, CaO, a mixture of thereof, and the like may be used.

In addition, as the above-mentioned oxidizable materials, it is possible to use a mixture of two or more of BaO, SrO, CaO, Cu2O, FeO, CO, Mn3O4, Ag, and Au.

In this way, after the oxidation of the oxidizable material by means of the heavy a oxygen isotope enriched material, the obtained oxide undergoes isotopic scrambling by means of reduction, and it is possible to increase the rate of the reaction and production efficiency. In addition, isotope scrambling may be conducted by means of generating oxygen plasma through silent discharge, high-frequency discharge, or electromagnetic induction. In this method, an oxygen ion or radical is generated by means of the plasma, and as a result, isotope scrambling (i.e., isotope exchange) occurs between oxygen molecules and other oxygen molecules in the enriched material.

In addition, a method may also be employed in which isotope scrambling is conducted by means of temporarily converting a portion of the enriched material to ozone, which is subsequently decomposed into oxygen. Preferred examples of the aforementioned method for ozonization include irradiation with ultraviolet rays, and silent discharge.

In the oxygen isotope enrichment method according to the present invention, the output vapor 215 from the second distillation column 202 may be directly supplied to the third distillation column 204 or fourth distillation column 205, when conducting the enrichment of heavy oxygen isotopes by means of using the apparatus shown in FIG. 17 or 18.

Moreover, the present embodiment is not limited to situations of enrichment of all the oxygen molecules ($^{16}O^{16}O$, $^{16}O^{17}O$, $^{16}O^{18}O$, $^{17}O^{17}O$, $^{17}O^{18}O$, and $^{18}O^{18}O$) which contain heavy oxygen isotopes, and enrichment of at least one of these six molecules is also possible In the following, an explanation will be given of the results of computer simulations conducted for situations in which the enrichment of heavy oxygen isotopes was carried out using the apparatuses shown in FIGS. 17 and 18.

In these simulations, the above-mentioned rate model will be employed.

Embodiment 2

Figure 21:
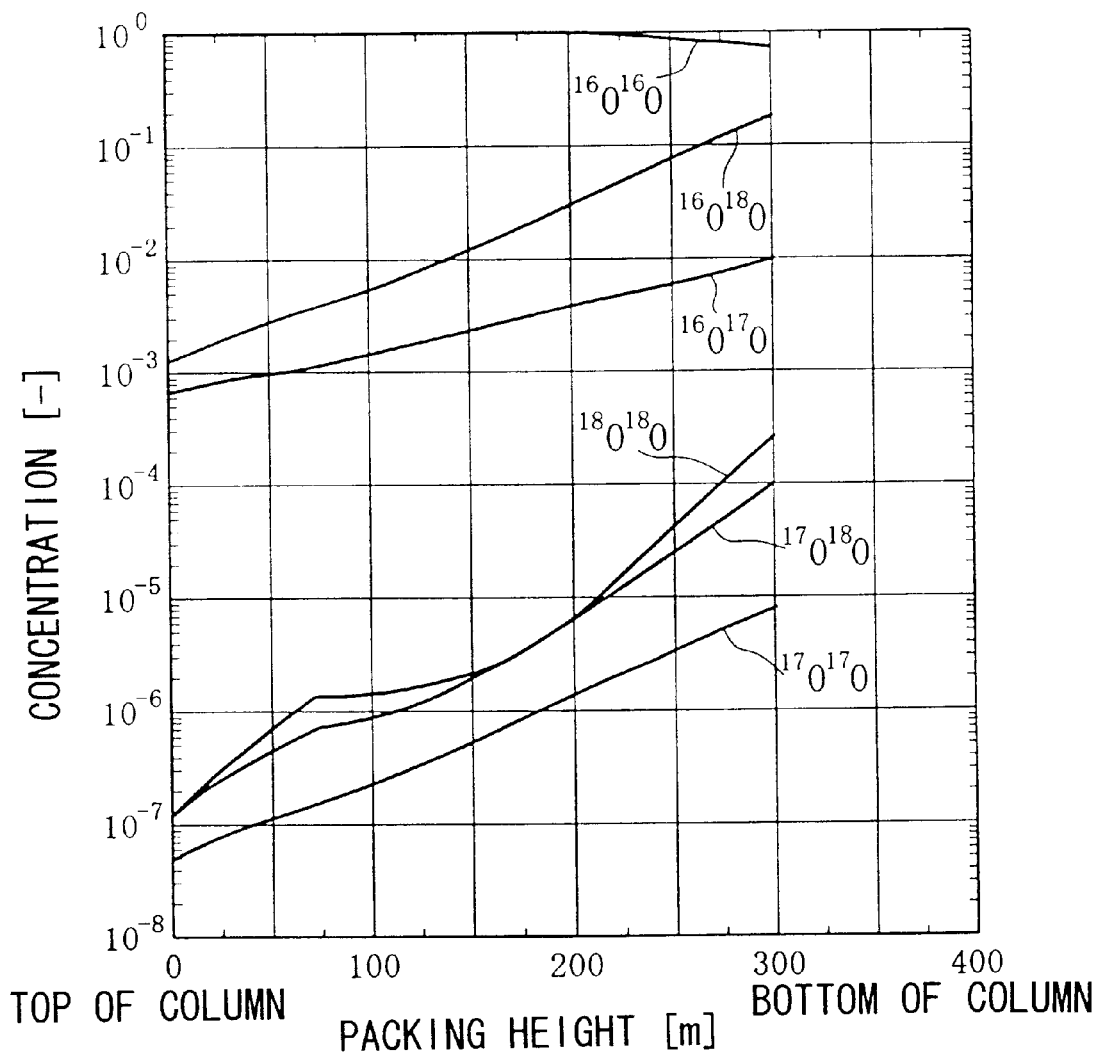
FIG. 21 is a graph showing the simulated results of the concentrations of the heavy oxygen isotopes for an example in which the apparatus shown in FIG. 17 was used, and shows the concentration distribution of each isotope within the first distillation column.
Figure 22:
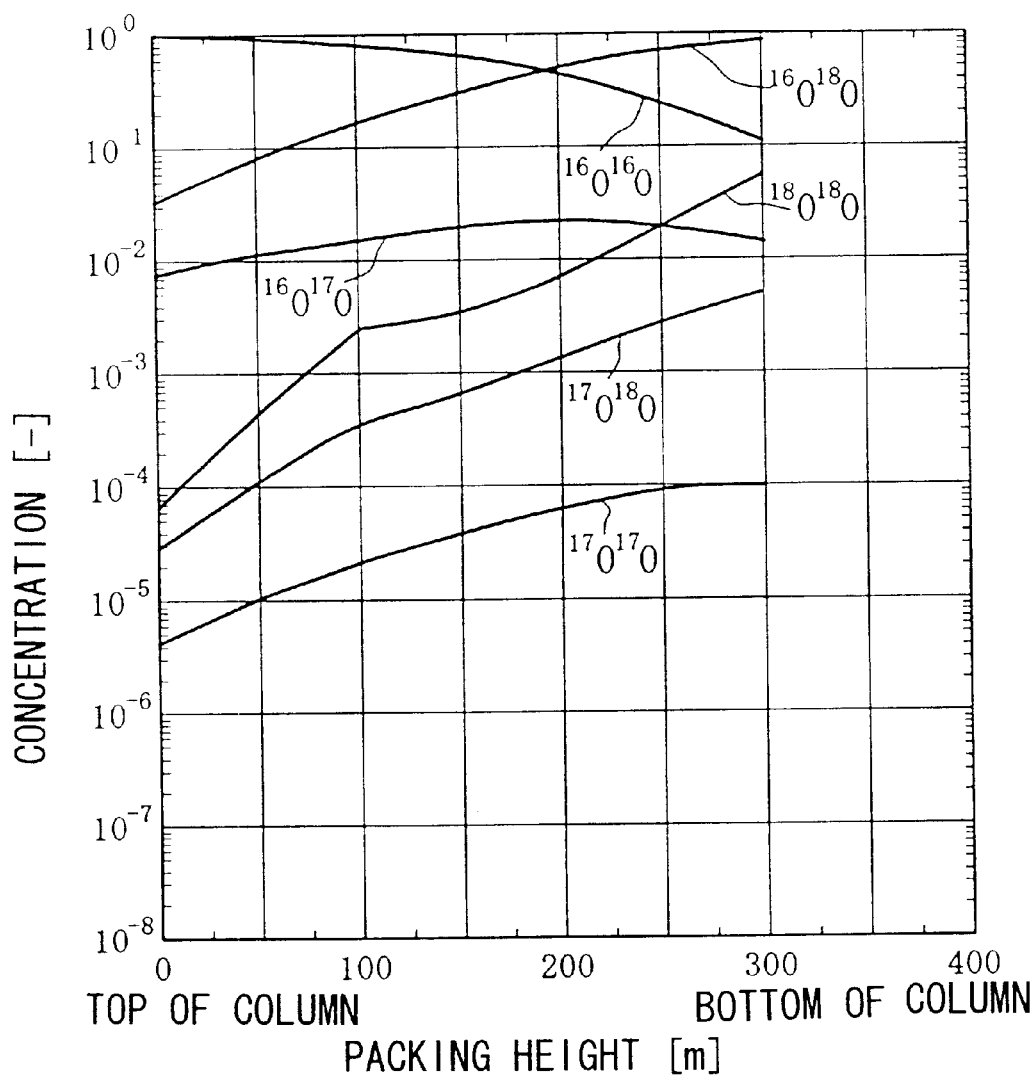
FIG. 22 is a graph showing the simulated results of the concentrations of the heavy oxygen isotopes for an example in which the apparatus shown in FIG. 17 was used, and shows the concentration distribution of each isotope within the second distillation column.

Tables 10 to 12 and FIGS. 21 to 23 show the simulation results, obtained according to the aforementioned model, for a situation in which the processes for the apparatus shown in FIG. 17 are performed. The configuration of the apparatus is shown in Table 9.

Tables 10 to 12 show the pressure, flow rate, and concentration of isotopes for the vapor or liquid obtained in each process.

FIGS. 21 to 23 show the concentration distribution of each isotope in the first through third distillation columns 201, 202, and 204.

In this simulation, the oxygen was taken to consist of six isotopes ($^{16}O^{16}O$, $^{16}O^{17}O$, $^{16}O^{18}O$, $^{17}O^{17}O$, :$^{17}O^{18}O$, and $^{18}O^{18}O$).

TABLE 9

| | Embodiment 2 | | |
|---|---|---|---|
| | First distillation column | Second distillation column | Third distillation column |
| Specific surface area of packing ($m^2/m^3$) | 500 | 500 | 500 |
| Inner diameter of distillation column (m) | 1.780 | 0.290 | 0.125 |
| Distance from the top of the column to feed position (m) | 70 | 100 | 80 |
| Height of packing (m) | 300 | 300 | 400 |
| Heat exchange amount of reboiler/condenser (kW) | 1900 | 52 | 9 |
| Pressure (bar) | 1.1~1.7 | 1.1~1.8 | 1.1~2.0 |
| Superficial F factor [m/s $(kg/m^3)^{1/2}$] | 1.4~1.6 | 1.5~1.6 | 1.4~1.6 |

(Height of packing does not include the height of liquid collector and liquid distributor.)

TABLE 10

Embodiment 2

|  | First column feed 211 | First column output vapor 212 | First column exhaust vapor 213 |
|---|---|---|---|
| Pressure (bar) | 1.2 | 1.7 | 1.1 |
| Flow rate (mol/s) | 1.000 | 0.0148 | 0.997 |
| Concentration of $^{16}O^{16}O$ (-) | 0.995 | 0.777 | 0.998 |
| Concentration of $^{16}O^{17}O$ (-) | $7.38 \times 10^{-4}$ | $9.68 \times 10^{-3}$ | $6.86 \times 10^{-4}$ |
| Concentration of $^{16}O^{18}O$ (-) | $4.07 \times 10^{-3}$ | 0.213 | $1.32 \times 10^{-3}$ |
| Concentration of $^{17}O^{17}O$ (-) | $1.37 \times 10^{-7}$ | $9.23 \times 10^{-6}$ | $5.02 \times 10^{-8}$ |
| Concentration of $^{17}O^{18}O$ (-) | $1.51 \times 10^{-6}$ | $1.15 \times 10^{-4}$ | $1.28 \times 10^{-7}$ |
| Concentration of $^{18}O^{18}O$ (-) | $4.16 \times 10^{-6}$ | $3.23 \times 10^{-4}$ | $1.24 \times 10^{-7}$ |

(First column: First distillation column 201)

TABLE 11

Embodiment 2

|  | Second column feed 214 | Second column output vapor 215 | Second column returned vapor 216 |
|---|---|---|---|
| Pressure (bar) | 1.3 | 1.8 | 1.1 |
| Flow rate (mol/s) | 0.0148 | $2.95 \times 10^{-3}$ | 0.0118 |
| Concentration of $^{16}O^{16}O$ (-) | 0.789 | 0.106 | 0.960 |
| Concentration of $^{16}O^{17}O$ (-) | $8.72 \times 10^{-3}$ | 0.0137 | $7.49 \times 10^{-3}$ |
| Concentration of $^{16}O^{18}O$ (-) | 0.190 | 0.818 | 0.0328 |
| Concentration of $^{17}O^{17}O$ (-) | $2.41 \times 10^{-5}$ | $1.04 \times 10^{-4}$ | $4.18 \times 10^{-6}$ |
| Concentration of $^{17}O^{18}O$ (-) | $1.05 \times 10^{-3}$ | $5.14 \times 10^{-3}$ | $2.65 \times 10^{-5}$ |
| Concentration of $^{18}O^{18}O$ (-) | 0.0114 | 0.0569 | $6.20 \times 10^{-5}$ |

(Second column: Second distillation column 202)

TABLE 12

Embodiment 2

|  | Third column feed 217 | Third column output vapor 218 | Third column exhaust vapor 219 |
|---|---|---|---|
| Pressure (bar) | 1.3 | 2.0 | 1.1 |
| Flow rate (mol/s) | $2.95 \times 10^{-3}$ | $4.72 \times 10^{-4}$ | $2.48 \times 10^{-3}$ |
| Concentration of $^{16}O^{16}O$ (-) | 0.272 | $5.87 \times 10^{-6}$ | 0.324 |
| Concentration of $^{16}O^{17}O$ (-) | $9.92 \times 10^{-3}$ | $2.08 \times 10^{-4}$ | 0.0118 |
| Concentration of $^{16}O^{18}O$ (-) | 0.489 | $5.17 \times 10^{-3}$ | 0.581 |
| Concentration of $^{17}O^{17}O$ (-) | $9.03 \times 10^{-5}$ | $9.49 \times 10^{-7}$ | $1.07 \times 10^{-4}$ |
| Concentration of $^{17}O^{18}O$ (-) | $8.91 \times 10^{-3}$ | $4.08 \times 10^{-3}$ | $9.83 \times 10^{-3}$ |
| Concentration of $^{18}O^{18}O$ (-) | 0.220 | 0.991 | 0.0729 |

(Third column: Third distillation column 204)

Embodiment 3

Tables 14 to 18 and FIGS. 24 to 27 show the simulation results, using the aforementioned model, for a situation in which the processes for the apparatus shown in FIG. 18 are performed.

Table 13 shows the configuration, heat exchange amount of the reboiler/condenser, operating pressure, and superficial F factor of each distillation column.

Tables 14 to 17 show the pressure, flow rate, and concentration of the isotopes for the vapor or liquid obtained in each process.

Table 18 shows the composition of the vapor output from the fourth distillation column 205, in addition to the pressure, flow rate, and composition concentration of the finished product vapor output from each of the top of the column and the bottom of the column. Table 18 shows the atomic ratio of the product obtained in the fourth distillation column 205.

FIGS. 24 to 27 show the concentration distribution of each isotope within each of the first through fourth distillation columns 201, 202, 204, and 205.

TABLE 13

Embodiment 1

|  | First distillation column | Second distillation Column | Third distillation column | Fourth distillation column |
|---|---|---|---|---|
| Specific surface area of packing (m²/m³) | 500 | 500 | 500 | 500 |
| Inner diameter of distillation column (m) | 1.780 | 0.290 | 0.125 | 0.092 |
| Distance from the top of the column to the feed position (m) | 70 | 100 | 100 | 200 |
| Height of packing (m) | 300 | 300 | 600 | 200 |
| Heat exchange amount of reboiler/condenser (kW) | 1900 | 52 | 12 | 6 |
| Pressure (bar) | 1.1~1.7 | 1.1~1.8 | 1.1~3.0 | 1.1~2.3 |
| Superficial F factor [m/s (kg/m³)^{1/2}] | 1.4~1.6 | 1.5~1.7 | 1.6~2.1 | 1.6~2.0 |

(Height of packing does not include the height of liquid collector, and liquid distributor.)

TABLE 14

Embodiment 3

|  | First column feed 211 | First column output vapor 212 | First column exhaust vapor 213 |
|---|---|---|---|
| Pressure (bar) | 1.2 | 1.7 | 1.1 |
| Flow rate (mol/s) | 1.000 | 0.0148 | 0.999 |
| Concentration of $^{16}O^{16}O$ (-) | 0.995 | 0.614 | 0.997 |
| Concentration of $^{16}O^{17}O$ (-) | $7.38 \times 10^{-4}$ | $8.37 \times 10^{-3}$ | $7.29 \times 10^{-4}$ |
| Concentration of $^{16}O^{18}O$ (-) | $4.07 \times 10^{-3}$ | 0.376 | $2.10 \times 10^{-3}$ |
| Concentration of $^{17}O^{17}O$ (-) | $1.37 \times 10^{-7}$ | $1.87 \times 10^{-6}$ | $9.32 \times 10^{-8}$ |
| Concentration of $^{17}O^{18}O$ (-) | $1.51 \times 10^{-6}$ | $3.37 \times 10^{-4}$ | $1.85 \times 10^{-7}$ |
| Concentration of $^{18}O^{18}O$ (-) | $4.16 \times 10^{-4}$ | $9.94 \times 10^{-4}$ | $1.37 \times 10^{-7}$ |

(First column: First distillation column 201)

TABLE 15

Embodiment 3

|  | Second column feed 214 | Second column output vapor 215 | Second column exhaust vapor 216 |
|---|---|---|---|
| Pressure (bar) | 1.3 | 1.8 | 1.1 |
| Flow rate (mol/s) | 0.0148 | $2.95 \times 10^{-3}$ | 0.0138 |
| Concentration of $^{16}O^{16}O$ (-) | 0.650 | 0.0114 | 0.731 |
| Concentration of $^{16}O^{17}O$ (-) | $7.05 \times 10^{-3}$ | $8.37 \times 10^{-3}$ | $8.25 \times 10^{-3}$ |
| Concentration of $^{16}O^{18}O$ (-) | 0.305 | 0.709 | 0.260 |
| Concentration of $^{17}O^{17}O$ (-) | $1.91 \times 10^{-5}$ | $5.21 \times 10^{-5}$ | $1.69 \times 10^{-5}$ |
| Concentration of $^{17}O^{18}O$ (-) | $1.65 \times 10^{-3}$ | 0.0102 | $2.66 \times 10^{-4}$ |
| Concentration of $^{18}O^{18}O$ (-) | 0.0358 | 0.187 | $7.74 \times 10^{-4}$ |

(Second column: Second distillation column 202)

TABLE 16

Embodiment 3

|  | Third column feed 217 | Third column output vapor 218 | Third column exhaust vapor 219 |
|---|---|---|---|
| Pressure (bar) | 1.4 | 3.0 | 1.1 |
| Flow rate (mol/s) | $2.95 \times 10^{-3}$ | $1.00 \times 10^{-3}$ | $1.95 \times 10^{-3}$ |
| Concentration of $^{16}O^{16}O$ (-) | 0.166 | $1.18 \times 10^{-5}$ | 0.251 |
| Concentration of $^{16}O^{17}O$ (-) | $4.86 \times 10^{-3}$ | $3.87 \times 10^{-7}$ | $7.37 \times 10^{-3}$ |
| Concentration of $^{16}O^{18}O$ (-) | 0.478 | $9.91 \times 10^{-3}$ | 0.719 |
| Concentration of $^{17}O^{17}O$ (-) | $3.56 \times 10^{-5}$ | $7.34 \times 10^{-7}$ | $5.36 \times 10^{-5}$ |
| Concentration of $^{17}O^{18}O$ (-) | $7.01 \times 10^{-3}$ | 0.0114 | $4.73 \times 10^{-3}$ |
| Concentraiion of $^{18}O^{18}O$ (-) | 0.344 | 0.979 | 0.0176 |

(Third column: Third distillation column 204)

TABLE 17

Embodiment 3

|  | Fourth column feed 218 | Fourth column output vapor 209 from bottom of column | Fourth column output vapor 210 from top of column |
|---|---|---|---|
| Pressure (bar) | 3.0 | 2.3 | 1.1 |
| Flow rate (mol/s) | $1.00 \times 10^{-3}$ | $9.34 \times 10^{-4}$ | $7.03 \times 10^{-5}$ |
| Concentration of $^{16}O^{16}O$ (-) | $1.18 \times 10^{-5}$ | $1.49 \times 10^{-5}$ | $1.69 \times 10^{-4}$ |
| Concentration of $^{16}O^{17}O$ (-) | $3.87 \times 10^{-7}$ | $5.09 \times 10^{-10}$ | $5.52 \times 10^{-6}$ |
| Concentration of $^{16}O^{18}O$ (-) | $9.91 \times 10^{-3}$ | $2.13 \times 10^{-3}$ | 0.139 |
| Concentration of $^{17}O^{17}O$ (-) | $7.34 \times 10^{-7}$ | $1.58 \times 10^{-8}$ | $1.03 \times 10^{-5}$ |
| Concentration of $^{17}O^{18}O$ (-) | 0.0114 | $4.53 \times 10^{-3}$ | 0.103 |
| Concentraiion of $^{18}O^{18}O$ (-) | 0.979 | 0.995 | 0.758 |

(Fourth column: Fourth distillation column 205)

TABLE 18

Embodiment 3

|  | First column feed 211 | Fourth column output vapor 209 from bottom of column | | Fourth column output vapor 210 from top of column | |
|---|---|---|---|---|---|
|  |  | Atomic ratio | Yield | Atomic ratio | Yield |
| Flow rate (mol/s) | 1.000 |  |  |  |  |
| Concentration of $^{16}O$ (-) | 0.99759 | 0.000107 | $9.97 \times 10^{-8}$ | 0.069670 | $4.91 \times 10^{-6}$ |
| Concentration of $^{17}O$ (-) | 0.00037 | 0.002265 | $5.72 \times 10^{-3}$ | 0.051513 | $9.79 \times 10^{-3}$ |
| Concentration of $^{18}O$ (-) | 0.00204 | 0.997628 | $4.57 \times 10^{-1}$ | 0.878817 | $3.03 \times 10^{-2}$ |

As shown in FIG. 26, a peak in the concentration of $^{17}O^{18}O$ appears in the middle section of the third distillation column 204.

Comparative Embodiment 1

For the purpose of comparison, Tables 19 and 20 show the results of a computer simulation using the aforementioned model for a situation in which enrichment of heavy oxygen isotopes is attempted without conducting isotope exchange.

In this embodiment, it is assumed that the same apparatus as the one shown in FIG. 16 is used with the exception that an isotope exchanger 203 is not provided. The configuration of the apparatus was determined according to Embodiment 2 (Table 9).

TABLE 19

Comparative Embodiment 1

|  | First column feed 211 | First column output vapor 212 | First column exhaust vapor 213 |
|---|---|---|---|
| Pressure (bar) | 1.2 | 1.7 | 1.1 |
| Flow rate (mol/s) | 1.000 | 0.0148 | 0.997 |
| Concentration of $^{16}O^{16}O$ (-) | 0.995 | 0.764 | 0.998 |
| Concentration of $^{16}O^{17}O$ (-) | $7.38 \times 10^{-4}$ | 0.0101 | $7.06 \times 10^{-4}$ |
| Concentration of $^{16}O^{18}O$ (-) | $4.07 \times 10^{-3}$ | 0.226 | $1.36 \times 10^{-3}$ |
| Concentration of $^{17}O^{17}O$ (-) | $1.37 \times 10^{-7}$ | $7.60 \times 10^{-6}$ | $4.58 \times 10^{-8}$ |
| Concentration of $^{17}O^{18}O$ (-) | $1.51 \times 10^{-6}$ | $9.63 \times 10^{-5}$ | $1.26 \times 10^{-7}$ |
| Concentration of $^{18}O^{18}O$ (-) | $4.16 \times 10^{-6}$ | $2.75 \times 10^{-4}$ | $1.24 \times 10^{-7}$ |

(First column: First distillation column 201)

TABLE 20

Comparative Embodiment 1

|  | Second column feed 214 | Second column output vapor 215 | Second column returned vapor 216 |
|---|---|---|---|
| Pressure (bar) | 1.3 | 1.8 | 1.1 |
| Flow rate (mol/s) | 0.0148 | $2.95 \times 10^{-3}$ | 0.0118 |
| Concentration of $^{16}O^{16}O$ (-) | 0.764 | 0.0672 | 0.938 |
| Concentration of $^{16}O^{17}O$ (-) | 0.0101 | 0.0117 | $9.67 \times 10^{-3}$ |
| Concentration of $^{16}O^{18}O$ (-) | 0.226 | 0.919 | 0.0527 |
| Concentration of $^{17}O^{17}O$ (-) | $7.60 \times 10^{-6}$ | $3.09 \times 10^{-5}$ | $1.77 \times 10^{-6}$ |
| Concentration of $^{17}O^{18}O$ (-) | $9.63 \times 10^{-5}$ | $4.69 \times 10^{-4}$ | $3.08 \times 10^{-6}$ |
| Concentration of $^{18}O^{18}O$ (-) | $2.75 \times 10^{-4}$ | $1.37 \times 10^{-3}$ | $1.77 \times 10^{-6}$ |

(Second column: Second distillation column 202)

Comparative Embodiment 2

The results (the concentration distribution of isotopes within the distillation column) for a situation in which enrichment of isotopes of an oxygen starting material was attempted using a single distillation column are shown in FIG. 8.

From Tables 10 to 12 and FIGS. 21 to 23, it is clear that an enriched material with a concentration of the heavy isotope oxygen molecule $^{18}O^{18}O$ of at least 99% can be obtained as the output vapor 218 of the third distillation column 204 in Embodiment 2 in which the use of the apparatus shown in FIG. 17 was assumed.

Additionally, when comparing the output vapor 215 from the second distillation column obtained in a situation in which isotope exchange was conducted (Table 11) and the enriched material obtained in Comparative Embodiment 1 and Comparative Embodiment 2 in which isotope exchange was not conducted, it is clear that the concentration of heavy oxygen isotopes, $^{18}O^{18}O$ in particular, can be increased by means of isotope exchange.

In addition, from Tables 14 and 18 and FIGS. 24 and 27, it is clear that it is possible to obtain an enriched material with a concentration of $^{18}O^{18}O$ of 99.5% as output vapor 209 from the bottom of the fourth distillation column 205 in Embodiment 3, in which it is assumed that the distillation is performed such that a peak in the concentration of $^{17}O^{18}O$ occurs in the middle section of the third distillation column 204, using the apparatus shown in FIG. 18.

Additionally, it is shown that the yield of $^{18}O^{18}O$, which is determined by the flow rate ($9.34 \times 10^{-4}$ mol/s) of the output vapor 209 from the bottom of the column, is a sufficiently high value of 47.5%, and therefore it is possible to recover $^{18}O^{18}O$ at a high yield.

The production rate of the aforementioned $^{18}O^{18}O$ (with a purity of 99.5%) is equivalent to approximately 1,000 kg per year, and it is clear that it is possible to obtain a production volume which is sufficient for the purpose of industrial production.

Additionally, in Embodiment 3, an enriched material comprising $^{17}O^{18}O$ at a concentration of 10% or greater can be obtained as the output vapor 210 from the top of the column.

According to the method of Embodiment 3, the enrichment rate for $^{17}O$ can be remarkably increased, whereas the enrichment rate of $H_2^{17}O$ is limited to 1% to 3% in enrichment-separation of $H_2^{17}O$ according to conventional water distillation methods.

When the flow rate of the output vapor 209 is $7.03 \times 10^{-5}$ mol/s and the concentration of $^{17}O^{18}O$ is 10.3%, a sufficiently high value, it is possible to recover $^{17}O^{18}O$ at a high yield.

The production rate of the aforementioned $^{17}O^{18}O$ (with a purity of 10.3%) is equivalent to approximately 77.5 kg per year, and it is clear that it is possible to obtain a production rate which is sufficient for the purpose of industrial production.

As explained above, by means of the present invention, it is possible to obtain the effects shown below.

(1) Since oxygen which does not contain other elements is used as the starting material, it is possible to obtain an enriched product with a high concentration of heavy oxygen isotopes.

(2) Since the latent heat of vaporization of oxygen (the starting material) is low, it is possible to reduce the size of the distillation columns, the heat exchangers, and the like compared with those for water distillation methods, and thus it is possible to reduce apparatus costs and operation costs.

(3) Since the oxygen starting material is not a corrosive or toxic gas, it is advantageous with regard to ease of handling and safety.

(4) By means of the use of a distillation column in which structured packing is used, it is possible to reduce liquid hold-up, and thus it is possible to shorten the time required to start up the apparatus. Furthermore, it is possible to reduce operating costs associated therewith.

(5) By means of using structured packing, it is possible to increase the efficiency of vapor-liquid contact within the distillation column, and thereby it is possible to increase the efficiency of the isotope enrichment.

(6) By means of using structured packing, the pressure loss for which is low, it is possible to carry out the distillation under conditions in which the relative volatility of each component is comparatively large and thereby it is possible to increase the efficiency of the enrichment of oxygen molecules containing heavy isotopes.

(7) By means of using promoting-fluid-dispersion type structured packing as the structured packing, it is possible to increase the efficiency of vapor-liquid contact, and thereby it is possible to further increase the efficiency of the enrichment of heavy oxygen isotopes.

(8) By means of the provision of a condenser and a reboiler in the distillation column, and by using and circulating a medium for heat exchange between the condenser and the reboiler, it is possible to make use of the coolness of the medium for heat exchange without waste, to suppress energy loss to a minimum and thereby to reduce operating costs.

(9) By means of the use of a plurality of distillation columns, it is possible to obtain an enriched product for which the ratio of enrichment is even higher. In addition, it is possible to reduce the height of the distillation columns, and to make the construction of the apparatus as a whole compact.

(10) After the enrichment of an oxygen starting material in oxygen molecules containing heavy oxygen isotopes ($^{16}O^{17}O$, $^{16}O^{18}O$, $^{17}O^{17}O$, $^{17}O^{18}O$, and $^{18}O^{18}O$) by means of the cryogenic distillation of an oxygen starting material which contains heavy oxygen isotopes, the concentration of heavy isotope oxygen molecules ($^{18}O^{18}O$, $^{17}O^{18}O$, and $^{17}O^{17}O$ which are oxygen molecules which comprise only heavy isotopes) within the enriched material is increased by means of isotope exchange, and thereby it is possible to obtain a finished product containing a high concentration of heavy oxygen isotopes.

(11) It is possible to increase the production efficiency and to increase the rate of the reaction by means of the carrying out the isotope scrambling by adding hydrogen to the enriched material (enriched in heavy oxygen isotopes) and causing them to react to produce water containing a high concentration of the heavy oxygen isotopes, and then separating this produced water into hydrogen and oxygen containing heavy oxygen isotopes by means of electrolysis.

(12) It is possible to increase the production efficiency and to increase the rate of the reaction by means of conducting isotope scrambling by means of oxidizing an oxidizable material by means of sd with the enriched material containing heavy oxygen isotopes, and subsequently reducing the obtained oxide.

Industrial Applicability

The method and apparatus for enrichment of heavy oxygen isotopes of the present invention can be used for enrichment of $^{17}O$ and $^{18}O$ which are the heavy oxygen isotopes used as tracers and the like.

What is claimed is:

1. A method of enrichment of heavy oxygen isotopes comprising:

enriching an oxygen starting material containing heavy oxygen isotopes in at least one of oxygen molecules selected from the group consisting of $^{16}O^{17}O$, $^{16}O^{18}O$, $^{17}O^{17}O$, $^{17}O^{18}O$ and $^{18}O^{18}O$ by means of cryogenic distillation;

conducting isotope scrambling; and obtaining an enriched material containing a high concentration of at least one of said oxygen molecules containing said heavy oxygen isotopes.

2. A method of enrichment of heavy oxygen isotopes according to claim 1, wherein an enriched material containing a high concentration of at least one of said oxygen molecules containing said heavy oxygen isotopes is obtained by means of conducting further cryogenic distillation on a heavy oxygen isotope enriched material obtained by means of said isotope scrambling.

3. A method of enrichment of heavy oxygen isotopes wherein the concentration of at least one component of a heavy oxygen isotope enriched material, obtained by means of said method of enrichment of heavy oxygen isotopes according to claim 2, is increased by means of conducting additional isotope scrambling.

4. A method of enrichment of heavy oxygen isotopes, wherein the concentration of at least the heavy isotope oxygen $^{18}O^{18}O$ of a heavy oxygen isotope enriched material, obtained by means of said method of enrichment of heavy oxygen isotopes according to claim 3, is further increased by means of conducting another cryogenic distillation.

5. A method of enrichment of heavy oxygen isotopes wherein a heavy oxygen isotope enriched material containing an increased concentration of the heavy isotope oxygen $^{18}O^{18}O$, and an enriched material containing an increased concentration of the heavy oxygen isotope containing the heavy isotope oxygen $^{17}O^{18}O$ are obtained by means of performing further cryogenic distillation of a heavy oxygen isotope enriched material obtained by means of a heavy oxygen isotope enrichment method according to any one of claims 2 and 4.

6. A method of enrichment of heavy oxygen isotopes according to any one of claims 1 and 3, wherein said isotope scrambling for concentrating heavy oxygen isotopes comprises isotope exchange using a catalytic reaction.

7. A method of enrichment of heavy oxygen isotopes according to any one of claims 1 and 3, wherein said isotope scrambling for concentrating heavy oxygen isotopes comprises:
    producing water containing a high concentration of said heavy oxygen isotopes by means of adding and reacting hydrogen to said heavy oxygen isotope enriched material; and
    subsequently separating the hydrogen and oxygen containing heavy oxygen isotopes by means of conducting electrolysis on the produced water.

8. A method of enrichment of heavy oxygen isotopes according to claim 7, wherein said reaction between said enriched material and hydrogen is conducted by means of combustion using a combustion chamber.

9. A method of enrichment of heavy oxygen isotopes according to claim 7, wherein said reaction between said enriched material and hydrogen is a catalytic reaction in which a diluent gas is supplied to said reaction system to dilute said enriched material and hydrogen.

10. A method of enrichment of heavy oxygen isotopes according to claim 9, wherein water produced by means of reacting said enriched material with hydrogen and the diluent gas are cooled and condensed; the mixture of produced water and the diluent gas are separated into the diluent gas and the condensed water; and
    said diluent gas is returned to said reaction system for recirculation and reuse.

11. A method of enrichment of heavy oxygen isotopes according to claim 7, wherein hydrogen produced by means of said electrolysis is recycled and reused as said hydrogen added to said enriched material.

12. A method of enrichment of heavy oxygen isotopes according to claim 7, wherein impurities in oxygen produced by means of said electrolysis are removed through oxidization by means of a catalytic reaction.

13. A method of enrichment of heavy oxygen isotopes according to any one of claims 1 and 3, wherein said isotope scrambling for concentrating heavy oxygen isotopes comprises passing said heavy oxygen isotope enriched material through plasma by means of silent discharge, high-frequency discharge, or electromagnetic induction.

14. A method of enrichment of heavy oxygen isotopes according to any one of claims 1 and 3, wherein said isotope scrambling for concentrating heavy oxygen isotopes comprises:
    irradiating said heavy oxygen isotope enriched material with ultraviolet rays to form ozone from said enriched material, and decomposing said ozone.

15. A method of enrichment of heavy oxygen isotopes according to any one of claims 1 and 3, wherein said isotope scrambling for concentrating heavy oxygen isotopes comprises:
    performing an oxidation-reduction reaction between said heavy oxygen isotope enriched material and a material selected from the group consisting of BaO, SrO, CaO, $Cu_2O_3$, FeO, CO, $Mn_3O_4$, Ag, Au, and/or a mixture thereof.

16. A method of enrichment of heavy oxygen isotopes according to any one of claims 1 and 3, wherein said isotope scrambling for concentrating heavy oxygen isotopes comprises an isotope exchange in which said heavy oxygen isotope enriched material is thermally treated at a temperature of 1000° C. or higher.

17. A method of enrichment of heavy oxygen isotopes comprising:
    supplying an oxygen starting material containing heavy oxygen isotopes to a distillation column packed with structured packing, said oxygen starting material being high purity oxygen obtained from a high purity oxygen preparation device using cryogenic distillation; and
    enriching said oxygen starting material containing heavy oxygen isotopes in at least one of oxygen molecules selected from the group consisting of $^{16}O^{17}O$, $^{16}O^{18}O$, $^{17}O^{17}O$, $^{17}O^{18}O$ and $^{18}O^{18}O$, by means of cryogenic distillation, wherein
    said distillation column comprises a condenser for cooling and liquefying a vapor output from said distillation column, and a reboiler for heating and vaporizing a liquid output from said distillation column, and a heating medium for exchanging heat with the output vapor and the output liquid in said condenser and said reboiler, said heating medium being circulated between said condenser and said reboiler and being at least one gas selected from the group consisting of nitrogen, oxygen, air, and an exhaust gas emitted from an air liquefying and separating unit provided with said distillation column,
    the density corrected superficial velocity in said distillation column is in the range between 0.8 and 1.8 m/s $(kg/m^3)^{1/2}$, and
    the distillation pressure in said distillation column is in the range between 1.1 and 2.5 bar.

18. A method of enrichment of heavy oxygen isotopes according to claim 17, comprising:
    using a unit consisting of, as said distillation column, three distillation columns (a first column, a second column and a third column);
    supplying a starting material oxygen to the interior of the first column from a feed section; supplying at least a part of liquid or vapor output from the bottom of the first column to the second column;

supplying at least a part of liquid or vapor output from the second column to the third column; and obtaining enriched vapor having a concentration of $^{16}O^{17}O$ of 10% or greater from the top of the third column.

19. A method of enrichment of heavy oxygen isotopes according to claim 17, comprising:

carrying out the distillation in such a way that a concentration peak of $^{16}O^{17}O$ is created at the middle of the second column, and a mixture of heavy oxygen isotopes containing $^{16}O^{17}O$ at a concentration of 1% or greater, $^{16}O^{18}O$ at a concentration of 90% or greater, and a remainder being mostly $^{16}O^{16}O$ is obtained from the bottom of the second column.

20. A method of enrichment of heavy oxygen isotopes according to claim 17, comprising:

carrying out the distillation in such a way that enriched liquid or vapor containing a concentration of $^{16}O^{18}O$ of 90% or greater is obtained from the bottom of the third column.

21. A method of enrichment of heavy oxygen isotopes according to claim 17 comprising:

using a plurality of distillation columns; and operating said plurality of distillation columns such that a maximum concentration of $^{17}O^{18}O$ appears in the middle section within the penultimate distillation column, when enriching in oxygen molecules containing heavy oxygen isotopes by means of performing said cryogenic distillation.

22. An apparatus for enrichment of heavy oxygen isotopes comprising:

at least one distillation column for enriching an oxygen starting material containing heavy oxygen isotopes in at least one oxygen molecule selected from the group consisting of $^{16}O^{17}O$, $^{16}O^{18}O$, $^{17}O^{17}O$, $^{17}O^{18}O$ and $^{18}O^{18}O$ by means of cryogenic distillation; and at least one isotope scrambler for increasing the concentration of at least one oxygen molecule selected from the group consisting of $^{16}O^{17}O$, $^{16}O^{18}O$, $^{17}O^{17}O$, $^{17}O^{18}O$ and $^{18}O^{18}O$ in a heavy oxygen isotope enriched material obtained from said distillation column by means of isotope scrambling.

23. An apparatus for enrichment of heavy oxygen isotopes according to claim 22, wherein said isotope scrambler is provided with an isotope exchange catalyst for promoting isotope exchange within said enriched material, and said isotope exchange catalyst contains at least one component or mixture thereof selected from the group consisting of tungsten, tantalum, palladium, rhodium, platinum, and gold.

24. An apparatus for enrichment of heavy oxygen isotopes according to claim 22, wherein said isotope scrambler is provided with an isotope exchange catalyst to promote isotope exchange of said enriched material, and said isotope exchange catalyst contains at least one component or mixture thereof selected from the group consisting of Ti-oxide, Zr-oxide, Cr-oxide, Mn-oxide, Fe-oxide, Co-oxide, Ni-oxide, Cu-oxide, Al-oxide, Si-oxide, Sn-oxide, and V-oxide.

25. An apparatus for enrichment of heavy oxygen isotopes according to claim 22, wherein the distillation column is packed with structured packing, and said structured packing is a promoting-fluid-dispersion structured packing which has a structure such that when a liquid descending in the distillation column and a vapor ascending in the distillation column make contact, the liquid and the vapor flow in mutually opposite directions over a surface of said structured packing along a main flow direction which is along a direction of a column axis, and, at the same time, mixing of the liquid and/or the vapor in a direction at right angles to said main flow direction is promoted and mass transfer occurs.

* * * * *

UNITED STATES PATENT AND TRADEMARK OFFICE
CERTIFICATE OF CORRECTION

PATENT NO. : 6,461,583 B1  Page 1 of 1
DATED : October 8, 2002
INVENTOR(S) : Shigeru Hayashida et al.

It is certified that error appears in the above-identified patent and that said Letters Patent is hereby corrected as shown below:

Title page, Item [54] and Column 1, lines 1 and 2,
"METHOD FOR ENRICHMENT OF HEAVY COMPONENT OF OXYGEN ISOTOPES", should read -- METHOD AND APPARATUS FOR ENRICHMENT OF HEAVY COMPONENT OF OXYGEN ISOTOPES --.

Signed and Sealed this

Twenty-sixth Day of August, 2003

JAMES E. ROGAN
*Director of the United States Patent and Trademark Office*